United States Patent
Hersch et al.

(10) Patent No.: US 10,899,161 B2
(45) Date of Patent: Jan. 26, 2021

(54) SYNTHESIS OF SUPERPOSTION SHAPE IMAGES BY LIGHT INTERACTING WITH SUPERPOSED LAYERS OF LENSLET GRATINGS

(71) Applicant: ECOLE POLYTECHNIQUE FEDERALE DE LAUSANNE (EPFL), Lausanne (CH)

(72) Inventors: Roger David Hersch, Epalinges (CH); Thomas Walger, Marseilles (FR); Valentin Flauraud, Allaman (CH); Juergen Brugger, Vufflens-la-Ville (CH); Theophane Besson, Fully (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 155 days.

(21) Appl. No.: 15/771,904

(22) PCT Filed: May 31, 2016

(86) PCT No.: PCT/IB2016/000743
§ 371 (c)(1),
(2) Date: Apr. 27, 2018

(87) PCT Pub. No.: WO2017/072566
PCT Pub. Date: May 4, 2017

(65) Prior Publication Data
US 2018/0311990 A1    Nov. 1, 2018

Related U.S. Application Data

(63) Continuation of application No. 14/703,017, filed on Oct. 27, 2015, now Pat. No. 10,286,716.

(51) Int. Cl.
*B42D 25/328* (2014.01)
*G02B 3/00* (2006.01)
(Continued)

(52) U.S. Cl.
CPC ......... *B42D 25/328* (2014.10); *B42D 25/324* (2014.10); *B42D 25/342* (2014.10);
(Continued)

(58) Field of Classification Search
CPC .. B42D 25/328; B42D 25/415; B42D 25/412; G02B 3/0018; G02B 3/0031; G02B 3/0043; G02B 30/23
See application file for complete search history.

(56) References Cited

U.S. PATENT DOCUMENTS 8,705,175 B1 * 4/2014 Lundgren ............ G02B 3/0031
359/619
10,286,716 B2   5/2019 Hersch et al.
2010/0308571 A1 * 12/2010 Steenblik ........... B42D 15/0073
283/72

FOREIGN PATENT DOCUMENTS

CN        1621248      6/2005
CN        1689050     10/2005
(Continued)

OTHER PUBLICATIONS

International Search Report for PCT/IB2016/000743 dated Aug. 17, 2016.

*Primary Examiner* — Mathieu D Vargot
(74) *Attorney, Agent, or Firm* — Christopher M. Scherer; DeWitt LLP

(57) ABSTRACT

The present invention describes methods and apparatuses for creating superposition shape images by superposed base and revealing layers of lenslet gratings. The superposition shape images form a message recognizable by a human observer or by an image acquisition and computing device such as a smartphone. The superposition shape images may be created by different superposition techniques ranging from 1D moiré, 2D moiré and level-line moiré superposition techniques to lenticular image and phase shift superposition
(Continued)

techniques. Moiré superposition techniques enable creating superposition shape images at different apparent depth levels. Applications comprise the protection of documents and valuable articles against counterfeits, the creation of eye-catching advertisements as well as the decoration of buildings and exhibitions.

20 Claims, 42 Drawing Sheets

(51) Int. Cl.
| | |
|---|---|
| *B42D 25/415* | (2014.01) |
| *B42D 25/42* | (2014.01) |
| *B42D 25/425* | (2014.01) |
| *B42D 25/43* | (2014.01) |
| *B42D 25/324* | (2014.01) |
| *B42D 25/351* | (2014.01) |
| *B42D 25/435* | (2014.01) |
| *B42D 25/44* | (2014.01) |
| *B42D 25/445* | (2014.01) |
| *G02B 30/23* | (2020.01) |
| *G02B 30/27* | (2020.01) |
| *B42D 25/342* | (2014.01) |
| *B42D 25/40* | (2014.01) |
| *D21H 21/48* | (2006.01) |
| *G02B 27/50* | (2006.01) |
| *G02B 27/60* | (2006.01) |
| *G06K 9/00* | (2006.01) |
| *G06K 9/62* | (2006.01) |
| *H04N 5/44* | (2011.01) |

(52) U.S. Cl.
CPC .......... *B42D 25/351* (2014.10); *B42D 25/40* (2014.10); *B42D 25/415* (2014.10); *B42D 25/42* (2014.10); *B42D 25/425* (2014.10); *B42D 25/43* (2014.10); *B42D 25/435* (2014.10); *B42D 25/44* (2014.10); *B42D 25/445* (2014.10); *D21H 21/48* (2013.01); *G02B 3/0006* (2013.01); *G02B 3/0018* (2013.01); *G02B 3/0031* (2013.01); *G02B 3/0043* (2013.01); *G02B 27/50* (2013.01); *G02B 27/60* (2013.01); *G02B 30/23* (2020.01); *G02B 30/27* (2020.01); *G06K 9/00442* (2013.01); *G06K 9/6215* (2013.01); *H04N 5/44* (2013.01)

(56) References Cited

FOREIGN PATENT DOCUMENTS

| | | |
|---|---|---|
| CN | 101010204 | 8/2007 |
| DE | 102006005000 | 8/2007 |
| TW | 424163 | 3/2001 |
| WO | 01/23943 | 4/2001 |
| WO | 03058291 | 7/2003 |
| WO | 2011082760 | 7/2011 |

* cited by examiner

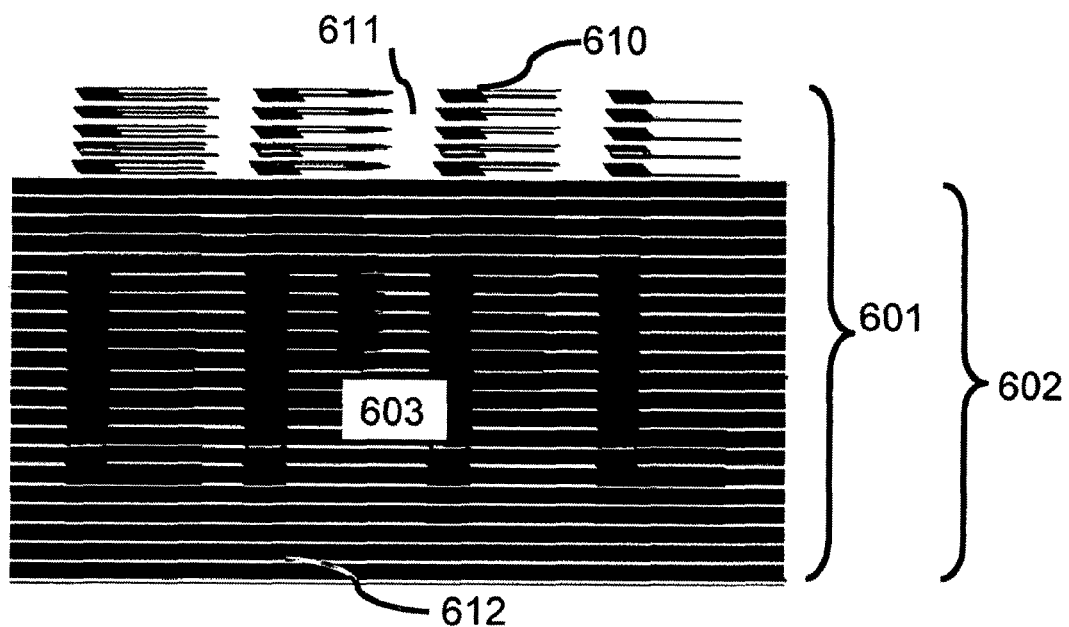
FIG. 6A
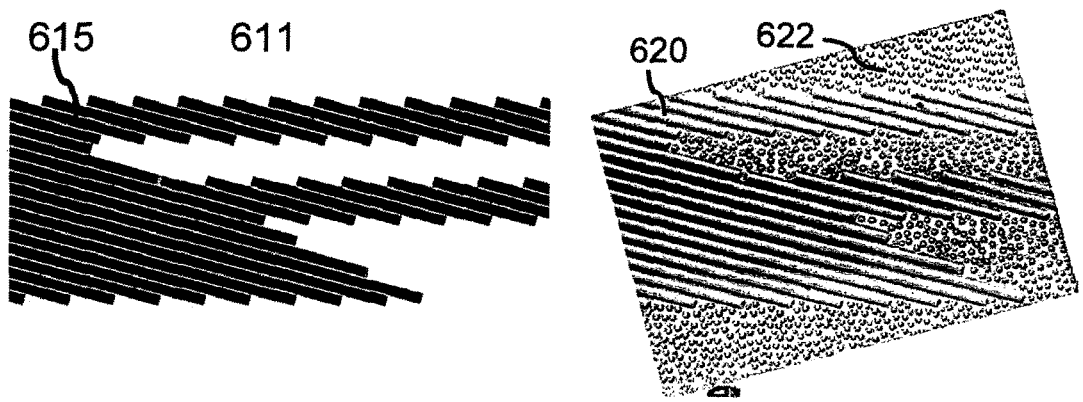
FIG. 6B
FIG. 6C

SYNTHESIS OF SUPERPOSTION SHAPE IMAGES BY LIGHT INTERACTING WITH SUPERPOSED LAYERS OF LENSLET GRATINGS

CROSS-REFERENCE TO RELATED APPLICATIONS

The present application is the U.S. national stage application of International Application No. PCT/IB2016/000743, filed May 31, 2016, which international application was published on May 4, 2017, as International Publication No. WO2017/072566. The International Application claims priority to U.S. patent application Ser. No. 14/703,017, filed Oct. 27, 2015, now U.S. Pat. No. 10,286,716, the contents of which are incorporated herein by reference in their entireties.

The present invention is related to the following US patents:

(a) U.S. Pat. No. 7,194,105, filed Oct. 16, 2002, entitled "Authentication of documents and articles by moiré patterns", inventors Hersch and Chosson, (category: 1D moiré);

(b) U.S. Pat. No. 7,751,608, filed 30 of Jun. 2004 entitled "Model-based synthesis of band moiré images for authenticating security documents and valuable products", inventors Hersch and Chosson (category: 1D moiré);

(c) U.S. Pat. No. 7,710,551, filed Feb. 9, 2006, entitled "Model-based synthesis of band moiré images for authentication purposes", inventors Hersch and Chosson (category: 1D moiré);

(d) U.S. Pat. No. 7,295,717, filed Oct. 30, 2006, "Synthesis of superposition images for watches, valuable articles and publicity", inventors Hersch, Chosson, Seri and Fehr, (categories: 1D moiré and level-line moiré);

(e) U.S. Pat. No. 7,305,105 filed Jun. 10, 2005, entitled "Authentication of secure items by shape level lines", inventors Chosson and Hersch (category: level-line moiré).

(f) U.S. Pat. No. 6,249,588 filed Aug. 28, 1995, entitled "Method and apparatus for authentication of documents by using the intensity profile of moiré patterns", inventors Amidror and Hersch (category 2D moiré).

(g) U.S. Pat. No. 6,819,775, filed Jun. 11, 2001, entitled "Authentication of documents and valuable articles by using moiré intensity profiles", inventors Amidror and Hersch (category 2D moiré).

(h) U.S. Pat. No. 7,058,202 filed Jun. 28, 2002, entitled "Authentication with built-in encryption by using moiré intensity profiles between random layers", inventor Amidror (category 2D random moiré).

(i) U.S. Pat. No. 8,351,087 filed Jun. 15, 2009, entitled "Authentication with built-in encryption by using moiré parallax effects between fixed correlated s-random layers", inventors Amidror and Hersch (category random 1D and 2D moiré).

In patents (a) to (g) and (i), inventor Hersch is also inventor in the present patent application. Patents (a) to (i) are herein incorporated in their entirety by reference.

BACKGROUND OF THE INVENTION

The related patents cited above provide authentication methods and devices for preventing counterfeits of both security documents and valuable articles and at the same time offer new means for increasing their attractiveness and aesthetics.

In the present application, we present a new technique for synthesizing dynamically evolving superposition shape images where the image formation process results from the relative spatial layouts of the contributing layers of lenslet gratings. The relative spatial layouts of the layers of lens gratings yield superposition shape images that may have a certain visual similarity with the superposition shape images produced by existing layer superposition methods such as 1D-moiré, level-line moiré, phase shift methods, lenticular methods and 2D moiré methods. However, since lenslet gratings can be created at a much higher resolution than printed gratings they offer a higher protection against counterfeits and at the same time they allow to authenticate documents by viewing the superposed lenslet gratings in transparency mode.

Phase Shift Techniques

Phase shift effects have been used in the prior art for the authentication of documents. For example, thanks to the phase change effect, it is possible to make visible a hidden pattern image encoded within a document (see background of U.S. Pat. No. 5,396,559 to McGrew, background of U.S. Pat. No. 5,901,484 to Seder, U.S. Pat. No. 5,708,717 to Alasia and U.S. Pat. No. 5,999,280 to Huang). When a revealing layer formed of a grating of transparent lines or of an array of cylindrical lenslets is superposed on such a document, the pre-designed latent image becomes clearly visible. This phase effect has the particularity that the latent image does not move. When moving the revealing layer on top of the base layer, the latent image foreground becomes alternatively dark and bright. Phase sampling techniques comprising screen element density, form, angle position, size and frequency variations are described in U.S. Pat. No. 6,104,812 to Koltai et. al. McCarthy and Swiegers teach in U.S. Pat. No. 7,916,343 that by applying a vertical phase shift on a horizontal line grating according to the darkness of an original image, one creates a modified grating potentially capable of hiding the latent image. The latent image is revealed by superposing the original grating on top of the modified grating.

1D-Moiré Techniques (Mainly U.S. Pat. Nos. 7,751,608 and 7,710,551)

1D-moiré synthesizing methods, also called band moiré image synthesizing methods are characterized by equations that relate a base layer layout comprising base bands made of vertically compressed instances of a 1D moiré image, a revealing layer layout comprising a grating of sampling lines and the 1D moiré layout resulting from the superposition of the base and revealing layers. The 1D moiré image shapes are a geometric transformation of the shapes embedded within each band of the base band grating. This geometric transformation comprises always an enlargement in one dimension, and possibly a rotation, a shearing, a mirroring, and/or a bending transformation. 1D-moiré synthesizing methods enable creating a base band grating and a revealing line grating that yield upon translation or rotation of the sampling position of the revealing line grating on the base band grating a displacement of the 1D moiré image shapes.

Shape Level Line Moiré Synthesizing Techniques (Mainly U.S. Pat. No. 7,305,105)

Shape level line moirés occur in a superposition image when a base layer comprising a line grating locally shifted according to the elevation of a spatially laid out shape elevation profile is superposed with a revealing layer comprising the unshifted sampling line grating. The layer with the locally shifted line grating embeds the shape elevation profile generated from an initial, preferably bilevel motif shape image (e.g. typographic characters, words of text, symbols, logo, ornament). By modifying the relative superposition phase of the sampling revealing layer grating in superposition with the base layer (e.g. by a translation or rotation), one may observe as shape level line moiré successions of level lines of the shape elevation profile evolving dynamically between the initial motif shape boundaries (shape borders) and shape foreground centers, respectively shape background centers, thereby growing and shrinking. The movement of shape level lines across the motif shape creates visually attractive pulsing motif shapes, for example pulsing symbols such as a pulsing heart. Shape level line techniques have also been published in December 2014 in "S. Chosson, R. D. Hersch, Beating Shapes Relying on Moiré Level Lines, ACM Transactions on Graphics (TOG), Vol. 34 No. 1, November 2014, Article No. 9, 1-10.

Lenticular Image Synthesizing Techniques

Lenticular image synthesizing methods are well described in the background sections of patents U.S. Pat. No. 8,284, 452 to Blum, U.S. Pat. No. 7,255,979 to Weiss and Pilosso, U.S. Pat. No. 5,924,870 to Brosh and Gottfried and U.S. Pat. No. 5,519,794 to Sandor and Meyers. A lenticular image consists of an ordered sequence, matched to a lenticular frequency, of a plurality of images broken down into bands or strips, which are viewed through an array of cylindrical lenslets (lenticular lenses). The period of the grating of cylindrical lenslets is equal to the strip width multiplied by the number of the contributing of images.

Let us call the phase-shift techniques, 1D moiré techniques, shape level line moiré techniques and lenticular image synthesizing techniques "one-dimensional line-oriented" layer superposition techniques. Let us call 2D periodic moiré or 2D random moiré synthesizing techniques "two-dimensional" superposition techniques.

2D Moiré Techniques 2D moiré techniques are based on the moiré intensity profile that is generated by the superposition of a specially designed 2D base layer dot-screen and a revealing layer formed of a 2D array of transparent dots or of spherical microlenses (see U.S. Pat. No. 6,249,588 to Amidror and Hersch, filed Aug. 28, 1995). The base layer dot-screen consists of a lattice of tiny dots, and is characterized by three parameters: its repetition frequency, its orientation, and its dot shapes. When the revealing layer is laid on top of the base layer dot-screen, when both of them have been designed in accordance with 2D moiré layout techniques, there appears in the superposition a highly visible repetitive moiré pattern of a predefined intensity profile shape, whose size, location and orientation gradually vary as the superposed layers are rotated or shifted on top of each other. As an example, this repetitive moiré pattern may comprise any predefined letters, digits or other symbols (such as the country emblem, the currency, etc.). The base layer dot-screen may include dots of gradually varying sizes and shapes, and can be incorporated (or dissimulated) within a variable intensity halftoned image such as a portrait, landscape, or decorative motif, which is generally different from the motif generated by the moiré effect in the superposition. Embodiments of 2D moiré techniques include a revealing array of microlenses superposed with base layer images formed of the combination of antireflection and partially reflecting structures (see U.S. Pat. No. 8,027,093, filed Oct. 4, 2010, inventors Commander et al.). They also include as base layer a planar array of image icons and as revealing layer a planar array of image icon focussing elements (see U.S. Pat. No. 7,333,268, filed Nov. 22, 2004, inventors Steenblik et al.).

Random Moiré 2D and 1D Techniques

U.S. Pat. No. 7,058,202 to Amidror teaches that the superposition of two specially designed correlated random or pseudorandom 2D dot-screens yields a single instance of a moiré intensity profile which consists of single instance of the moiré shape whose size, location and orientation gradually vary as the superposed layers are rotated or shifted on top of each other. U.S. Pat. No. 8,351,087 to Amidror and Hersch teaches a compound layer that displays a dynamically moving single moiré shape instance. This compound layer is formed of the superposition of a base layer and a revealing layer with a gap between them. The layer elements are laid out at s-random locations, the s-random locations of the revealing layer elements being derived from the s-random locations of the base layer elements. The base layer element locations and the revealing layer element locations are therefore strongly correlated. The s-random locations are determined by applying pseudo-random perturbations or displacements to a periodic set of locations. When tilting the compound layer, the superposition of said s-random base and revealing layers yields a single moiré shape instance, that dynamically varies in its size or orientation and/or moves along a trajectory determined by the respective layouts of the base and revealing layers. Layouts are available in which the moiré shape moves along a direction substantially perpendicular to the tilting direction. The base layer may form a halftone image by having its elements large in dark areas and thin in bright areas. It is possible to conceive a moiré shape that is buried and hidden within background random noise, so that it is not visible when the compound layer is not tilted, and it only appears and becomes visible upon tilting the compound layer.

Stereoscopic Depth Perception of Moiré

Elements of theory about stereoscopic vision can be found in the paper by E. Hibbard et al., "On the Theory and Application of Stereographics in Scientific Visualization", published in the book "From object modelling to advanced visual communication" edited by S. Coquillard, W. Strasser and P. Stucki, Springer Verlag (2004), pp 178-196. The paper "The moiré magnifier" by M C Hutley, R Hunt, R F Stevens and P Savander published in "Pure and Applied Optics: Journal of the European Optical Society Part A Vol. 3 No 2, pp 133-142 already points to the possibility that moiré effects can be seen in stereoscopic vision. The paper by J. Huck, "Moiré patterns and the illusion of depth", published at the Intl. Conf. of the International Society of Arts, Mathematics and Architecture (ISAMA), June 2004 indicates how to compute the position and period of the moiré light intensity profile resulting from two vertical layers of vertical straight line gratings separated by a given gap and illuminated from behind. U.S. Pat. No. 7,333,268 to R. A. Steenblick, M. J. Hurt and G. R. Jordan describes for the case of 2D moirés when a moiré is in front and when a moiré is in the back of the superposed 2D layers. In the present disclosure, we show how to calculate and synthesize 1D moiré shapes having a desired perceived depth when viewed stereoscopically by a human.

Prior Art Microlens and Lenticular Lens Superposition Methods

U.S. Pat. No. 7,931,305 to Tompkin and Schilling teaches the creation of a transparent window incorporating microlens fields on both sides of the window. The system may behave as an individual macroscopic lens. Depending on parameters such as lens spacing and lens diameter, various optical effects are obtained. Items of information may be obtained by having different regions with different lens spacing parameters. Optically, these different regions become apparent to the viewer. In contrast to the present invention, U.S. Pat. No. 7,931,305 does not allow to conceive predefined superposition images having a predefined dynamic behavior, such as moving moiré shapes, shapes with level lines travelling from their center to their borders and vice-versa or dynamically moving shapes formed of successively visible shape instances.

U.S. Pat. No. 8,705,175 B1 to Lundgen and Sarda, filed Mar. 14, 2013, priority Apr. 11, 2012, teaches a method of producing a two-sided lenticular film that exhibits an illusion of stripes embedded within the film.

Prior Art Supersposition Image Synthesizing Techniques

In the prior art, phase-shift techniques, 1D or 2D moiré techniques, either repetitive or random, shape level line moiré techniques and lenticular image synthesizing techniques assume that the base layer information is printed or patterned into the base layer along longitudinal 1-dimensional structures such as bands or as 2-dimensional array structures and that a revealing layer is made of a line-oriented 1-dimensional array or respectively of a 2-dimensional array sampling the base layer. This sampling revealing layer is made of transparent lines or of cylindrical lenslets (lenticular lenses) for the 1D case or of substantially spherical lenses for the 2D case. In phase shift techniques, the base layer information comprises, at given locations, base layer structures shifted by a fraction of the revealing layer sampling line period. In 1D moiré techniques, the base layer information comprises the base bands, each base band incorporating base band shapes obtained by a linear or non-linear geometric transformation of the desired 1D moiré shapes. In 2D moiré techniques, the base layer information comprises juxtaposed dot areas containing dot shapes obtained by a linear or non-linear geometric transformation of the desired 2D moiré shapes. In shape level line moiré techniques, the base layer information comprises a line grating or a grating of dither bands locally shifted in proportion to the elevation profile at the current position. In lenticular image synthesizing techniques, the base layer information comprises the bands representing sections of the contributing images. Embodiments include the creation of a compound made of the revealing layer on one side and of the base layer on the other side of a substrate having a given thickness. When tilting this compound, the revealing layer sampling elements sample different parts of the base layer bands and the superposition image evolves dynamically, according to the implemented superposition image synthesizing technique.

In the present disclosure, we propose for both one-dimensional line-oriented and for two-dimensional layer superposition techniques, repetitive or random, to replace the base layer printing or patterning presented in the prior art by the placement of one-dimensional light concentrating lenslets (e.g. cylindrical lenslets) in the background areas of the base layer shapes. Base layer lenslets may be created on one side of a substrate by a roll-to roll-process simultaneously with the creation of the revealing layer sampling lenslets on the other side of the substrate, thus avoiding shift and rotational inaccuracies between the base and revealing layers.

SUMMARY OF THE INVENTION

The present invention aims at creating a superposition shape image that shows a recognizable message with the superposition of a base layer comprising lenslet gratings and a revealing layer comprising a lenslet grating. The superposition shape image is created with a superposition technique selected from the set of 1D moirés, 2D moirés, random moiré, level line moiré, lenticular image, phase shift and stereoscopic depth synthesizing techniques. Each superposition technique has its own mathematical basis relating the revealing layer grating layout parameters to the base layer grating layout parameters, especially the revealing layer period and orientation and the base layer period and orientation. Depending on the considered superposition technique, the revealing layer is either formed of a 1D grating of substantially cylindrical lenslets or by a 2D grating of substantially spherical lenslets. The base layer comprises foreground and background shapes derived from the foreground and background of the superposition shape image. For example, in case of a 1D moiré, the base layer shapes are a geometrical transformation of the superposition shape image formed by the moiré.

In order to create superposable revealing and base layer lenslet gratings, one needs to determine the position of the individual surfaces defining the layout of the lenslet gratings according to the selected superposition technique and the desired superposition shape image, for both the base and the revealing layers. With the surfaces specifying the layout of the lenslet gratings, it becomes possible to fabricate the lenslet gratings by applying techniques such as lithography, laser writing, etching, reflow and embossing.

In case that the base and revealing layer lenslet gratings form a fixed setup, and when the setup is illuminated from behind or is shown in front of light reflecting surface, tilting the setup yields a visible dynamically evolving superposition shape image that is easy to recognize. In case of a 1D or 2D moiré, the dynamically evolving superposition shape image is characterized mainly by a displacement. In case of a level line moiré, it is characterized by lines of constant intensity or color laid out along the level lines of the elevation profile of the superposition shape. These constant intensity or color lines evolve across successive level lines between the superposition shape boundaries and the shape foreground and background centers. In case of a lenticular image, the dynamically evolving superposition shape is formed of a succession of related sub-images and in case of a phase shift superposition technique it is formed by an inversion of intensity or by a switch between colors.

In order to provide an additional protection against counterfeits, it is also possible to apply geometrical transformations to both the base and the revealing layers. This yields revealing and base layer shapes having a curvilinear layout. In case of a 1D moiré, the base layer is generated according to a geometric transformation derived from the specific transformation of the revealing layer and a desired layout of the 1D moiré expressed by a corresponding moiré layer geometric transformation. In case of a level line moiré having the same appearance as the level line moiré created with a rectilinear revealing layer, the base layer is generated according to the same specific geometric transformation as the revealing layer and then the elevation profile is incorporated by vertical shifts of the base layer surfaces proportional to the elevation profile. In case of a curvilinear level line moiré being geometrically transformed according to the specific transformation of the revealing layer, the base layer is first shifted in proportion to the elevation profile and then generated according to the same specific transformation as the revealing layer.

In the case of a level line moiré, the array of revealing layer surfaces specifying the layout of the revealing layer lenslet array is an array of revealing layer transparent lines. The arrays of surfaces forming the base layer foreground shapes specifying the layout of the base layer lenslet gratings are arrays of base layer transparent lines, arrays of rectangles or arrays of disks. In the case of base layer transparent lines, the fabricated base layer lenslet gratings have substantially the same period as the fabricated revealing layer lenslet grating. In the case of arrays of rectangles or arrays of disks, the fabricated lenslet gratings have a substantially smaller period compared with the period of the revealing layer lenslet grating. The base layer background may be left without lenslet gratings or filled with randomly positioned microlenses of sizes that are randomly selected within a given size interval, and are substantially smaller than the period of the revealing layer grating.

In the case of superposed base and revealing layer lenslet gratings that form a fixed setup, with the revealing layer lenslet grating having a vertical orientation, the eyes of an observer see different views of the base lenslet gratings. These different views create a parallax effect allowing to perceive the superposition shape image as an image composed of shapes having different apparent depths. The superposition shape image may form two messages, one at a certain depth level and the second one at a different depth level. When tilting the setup, the messages may move in inverse directions and at different apparent depth levels.

One may also create base layer lenslet gratings that when viewed alone show a halftone image and when viewed in superposition with the revealing layer show a visible and recognizable message enabling to authenticate the base layer. The halftone image may be formed of any variable intensity image such as landscapes, flags, vehicles, faces, persons, dresses, luxury articles, watches, fruits, trees, logos, instruments, utility objects, planes, rockets, weapons, etc.

In the case of a level line moiré, when the illumination of the fixed setup comprises spatially varying colors, the level lines will have colors that are similar to the colors present in the illumination. The illumination with the different colors may be realized with a large display, with colored bulbs or with colored light emitting diodes (LEDs). As a decorative feature, one may include several LEDs within a led package. By driving the LEDs individually, i.e. by having an executable program setting their respective emission intensities and by varying these intensities, one may create level line moirés with colors that evolve across the color space at successive time intervals.

On a setup formed of superposed base layer lenslet gratings and of a revealing layer lenslet grating, the superposition shapes form the recognizable message. These superposition shapes are formed by the sampling action of the revealing layer lenslet grating on the plane on which the base layer lenslet gratings concentrate the incoming light. The recognizable message moves dynamically when changing the observation angle or the observation location in respect to the superposed lenslet gratings. The recognizable message can be formed of text, numbers, graphical symbols, typographical characters, numerals, logos, and spatial codes such as barcodes and QR codes.

A smartphone, tablet or laptop computer may capture the superposition shapes forming a visible message and verify its authenticity with authentication software operable for recognizing the message and for comparing its signature with signatures located in its memory, or by sending the visible message or its signature to a remote server located on the Internet and receiving a reply indicating whether the visible message is authentic or not.

An apparatus for producing superposable revealing layer grating and base layer lenslet gratings that show superposition shapes forming a recognizable message comprises a computer with a software module interacting with the user, interacting with other computers or reading instructions from a file in order to select a superposition technique from the set of 1D moirés, 2D moirés, random moiré, level line moiré, lenticular image, phase shift and stereoscopic depth synthesizing techniques. On this computer, the same or a different software module is operable for synthesizing the layout of the base layer lenslet gratings and the layout of the revealing layer lenslet grating according to the selected superposition technique. The apparatus further comprises means to expose and develop resist structures laid out according to the layout of the lenslet gratings, heating means operable to apply a reflow process to the exposed and developed resist structures, means to create molds containing the negatives of the reflowed resist structures, a roll-to-roll device incorporating the molds to create the lenslet gratings, UV curable material pressed by the roll-to-roll device into the molds, UV illumination means operable to cure the material in the molds and possibly a system to cut and eject the cured material forming the lenslet gratings.

In case a fixed setup of base and revealing layer lenslet gratings is to be produced, one roll-to-roll device creates the base layer lenslet gratings on one side of a substrate and a second roll-to-roll device creates the revealing layer lenslet grating on the other side of the substrate, in registration with the base layer lenslet gratings. As an alternative, a single roll-to-roll device may create at the same time the base layer lenslet gratings on one side of a substantially transparent substrate and the revealing layer gratings on the other side of the substrate at the same location.

Optionally, an additional polymer having an index of refraction lower than the one of the lenslet gratings may be deposited and hardened on top of the cured material forming the lenslet grating. This additional polymer creates a flat surface. This can be carried out both for the base and revealing layer lenslet gratings. Then, one may create a fixed setup looking like a flat piece of plastic, but capable of showing dynamically evolving superposition shapes.

Further fabrication methods comprise polymer jetting devices working like ink-jet printers, possibly located into closed enclosures enabling programmable heating and UV curing. For large size setups of lenslet gratings, it is also possible to directly print the base and revealing layer lenslet gratings by describing them as 3D surface models, converting the surface description into 3D printer head movements and printing these models with a substantially transparent plastic material. Such medium to large size setups of lenslet gratings have a high decorative value and may be used for luxury articles, advertisement, exhibitions and in amusement parks.

The proposed superpositions of revealing and base layers of lenslet gratings offer a strong protection against counterfeits, since these gratings cannot be produced without sophisticated equipment allowing precise lithography and reflow operations. Moiré superposition techniques are very sensitive to small deviations in layout and superposition. Therefore, a superposition shape image forming a recognizable message cannot be reproduced by counterfeiters without introducing serious deformations. In addition, the revealing layer grating of lenslets may have a curved layout such as a cosinusoidal layout. Without knowing the parameters of the corresponding layout, faithful reproduction is extremely difficult and time-consuming Finally, one or both layers of lenslet gratings may each be encapsulated by a transparent material layer such as a polymer having a lower index of refraction than the index of the lenslets. The encapsulating layer has a flat interface with the air and hides therefore the layout of the encapsulated base lenslet grating. Such an encapsulation makes it very difficult for a counterfeiter to recover the orientation, size and layout of the lenslet gratings. A unauthorized replication of a setup comprising encapsulated base and revealing layer lenslet gratings is therefore extremely difficult to achieve.

The shape image created by superposed layers of lenslet gratings forms a recognizable message that dynamically evolves in synchronization with the movement of an observer. Since it is the movement of the human observer's eyes that drives the evolution of the message, there is an immediate feedback. Such a feedback is unusual and strongly attracts the attention of the observer. Several persons may simultaneously observe the superposed layers of lenslet gratings. Every person will see from a different spatial position a slightly different instance of the dynamically evolving message.

In addition to providing a protection against counterfeits, the presented fixed setups of revealing and base layer lenslet gratings yield superposition shape images that have a high esthetical and decorative value and may also be attractive for luxury products such as watches, smartphones, perfumes, expensive drinks, for clothes such as a dress, a skirt, a blouse, a jacket, shawls and pants as well as in bikes and cars. Superposed revealing and base layer lenslet gratings may also be used for advertisement, for the decoration of buildings, for showing surprising messages on exhibition walls, and in amusement parks.

BRIEF DESCRIPTION OF THE DRAWINGS

FIG. 6A shows a rectilinear 1D moiré obtained by superposition of the base band layer and the revealing layer;

FIG. 6B shows a part of the base layer 610 populated by small oblique rectangles defining the layout of the cylindrical lenslets;

FIG. 6C shows a view under the microscope of the same area as in FIG. 6B, after fabrication of the base layer lenslet gratings;

DETAILED DESCRIPTION OF THE INVENTION

Figure 1:
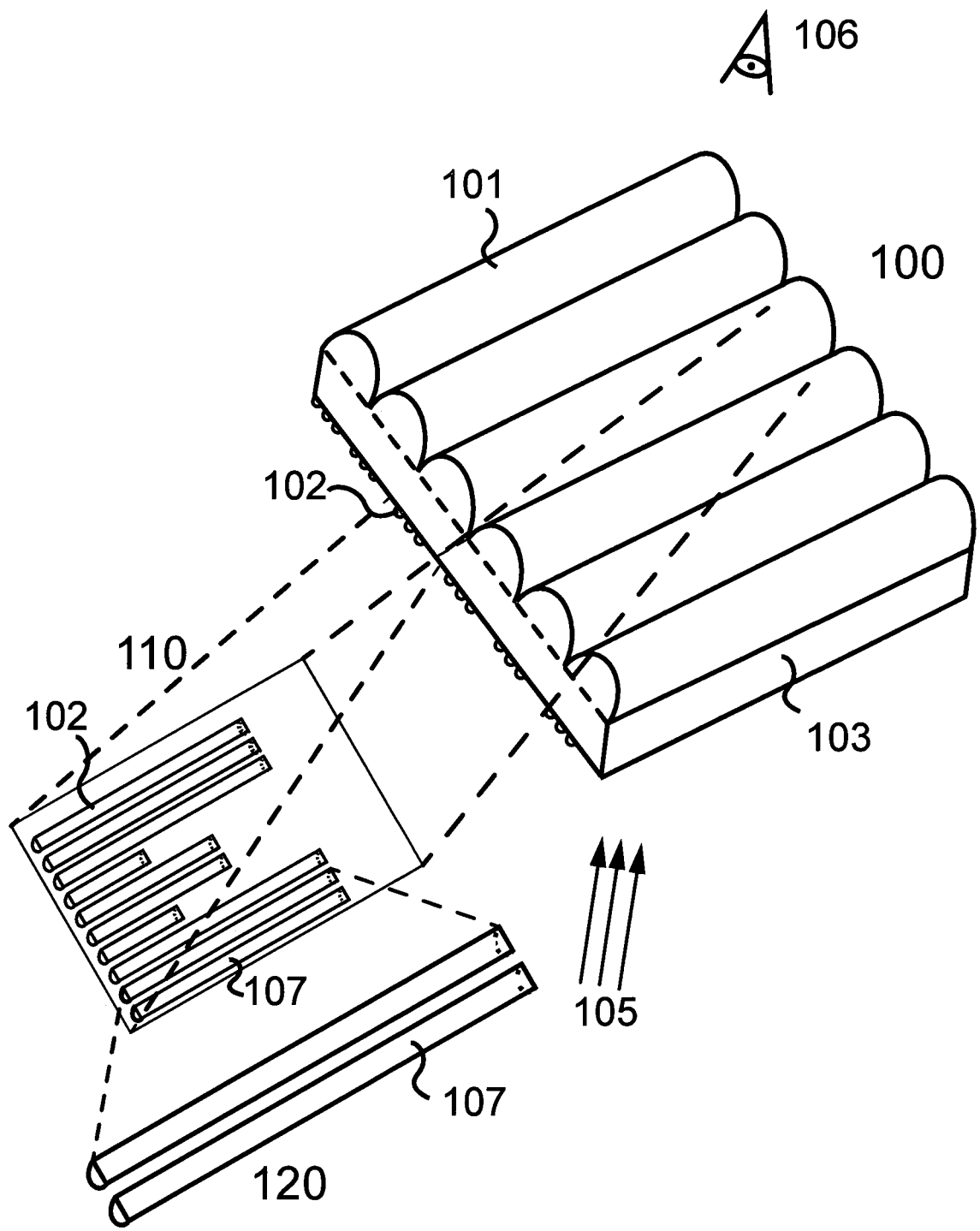
FIG. 1 shows a multi-lenslet imaging setup made of a revealing layer 100 with a cylindrical lenslet grating having a large repetition period and a base layer 110 whose foreground base layer shapes are filled with a grating of cylindrical lenslets 102 having a small period.

The superposition images generated by the phase-shift techniques, 1D and 2D moiré techniques, shape level line moiré techniques and lenticular image synthesizing techniques result from sampling a base layer comprising foreground and background shapes by a revealing layer made of an array of lenslets. The present invention aims at replacing the base layer printing or patterning techniques used for producing the base layer foreground and background shapes known from the prior art by populating the foreground or background areas of the base layer with substantially cylindrical lenslet gratings.

For the phase-shift techniques, the 1D moiré techniques, a category of shape level-line moiré embodiments and the lenticular image synthesizing techniques, the cylindrical base layer lenslets have a substantially smaller replication period than the replication period of the cylindrical lenslets forming the 1-dimensional revealing layer sampling lenslet grating. For the 2D moiré technique, the base layer cylindrical lenslets have a substantially smaller replication period than the period of the revealing layer 2-dimensional grating of spherical sampling lenslets.

For another category of shape level line moiré embodiments, the base layer cylindrical lenslets should have substantially the same replication period as the revealing layer grating of cylindrical lenslets.

Vocabulary

In the present application, we use the term "cylindrical lenslets" or "1D lenslets" as a generic term for lenslets whose cross-section are e.g. a section of a circular disk or a section of a parabola and that follow straight or curvilinear lines. A grating of cylindrical lenslets may cover a region of the plane. Between each lenslet of a grating of cylindrical lenslets, there may be no space or a small space. The period of such a grating is defined as the repetition period its cylindrical lenslets. Gratings of cylindrical lenslets are often fabricated from a description of longitudinal rectangles by applying lithographic and reflow techniques. A "longitudinal rectangle" is defined as a relatively long and thin quadrilateral having a constant width. Cylindrical lenslets following a long straight or curvilinear path are fabricated from a description of "longitudinal stripes" of constant width.

We use the term "spherical lenslets", "spherical lenslet grating" or "2D lenslet grating" as a generic term for lenslets that may fill the space in a repetitive 2D manner, e.g. as a regular 2D array. Their shape may be spherical, aspherical or partly spherical and partly non-spherical.

The term "multi-lenslet setup" refers to a fixed setup comprising superposed base and revealing layer gratings. In general, the revealing layer grating (FIG. 17, 143) and the base layer gratings (FIG. 17, 174) are parallel and have in common a plane on which the revealing layer grating samples the light concentrated by the base layer lenslet gratings (FIG. 3, 303, FIG. 17, 147).

In general, we use the term "revealing layer lenslet grating" in the singular form for the revealing layer (e.g. FIG. 8, 801) and "base layer lenslet gratings" in the plural form because the base layer comprises many base layer micro-shapes (e.g. FIG. 4B, 404, 405, 406) that are each covered by a lenslet grating. However, it is possible to have several revealing layer lenslet gratings on the same revealing layer.

We use the term "recognizable message" for the message that is generated as a superposition shape image by the superposed base and revealing layer lenslet gratings. "Recognizable" means that either a human being or a computing system is capable of recognizing the message, being it a picture with recognizable elements such as a flag, a face, a house, a forest, a horse, be it a string of letters such as a number or a code formed of numbers and letters, be it a 1D or 2D barcode, or be it a QR-code recognizable by a computer or a smartphone.

We use the term smartphone for a computing device incorporating a camera and being connected to a server for information exchange. Commercially available tablet or laptop computers may also perform the same actions as the smartphone.

Multi-Lenslet Setup with Large Revealing Layer Lenslet Periods and Small Base Layer Lenslet Periods FIG. 1 illustrates a multi-lenslet setup 100 comprising the revealing layer cylindrical lenslet grating 101 on top of a substantially transparent substrate 103. On the other side of the transparent substrate, the base layer comprises a cylindrical lenslet grating 102 forming the foreground of a vertically compressed letter "E" (110). The base layer lenslets have their cylindrical parts on the back side (102, 107) of the setup. This setup may be observed by looking 106 from the front side of the revealing layer lenslet grating 101. The incoming light 105 irradiates the setup from the backside, i.e. from the base layer lenslet gratings. Part 100 of the figure represents the multi-lenslet imaging setup, part 110 an enlargement of one of the replicated lenslet gratings forming a base layer base band (see Section "Creating 1D moiré with the multi-lenslet setup) and part 120 an enlargement of a part of the base layer grating comprising two cylindrical lenslets.

Figure 2:
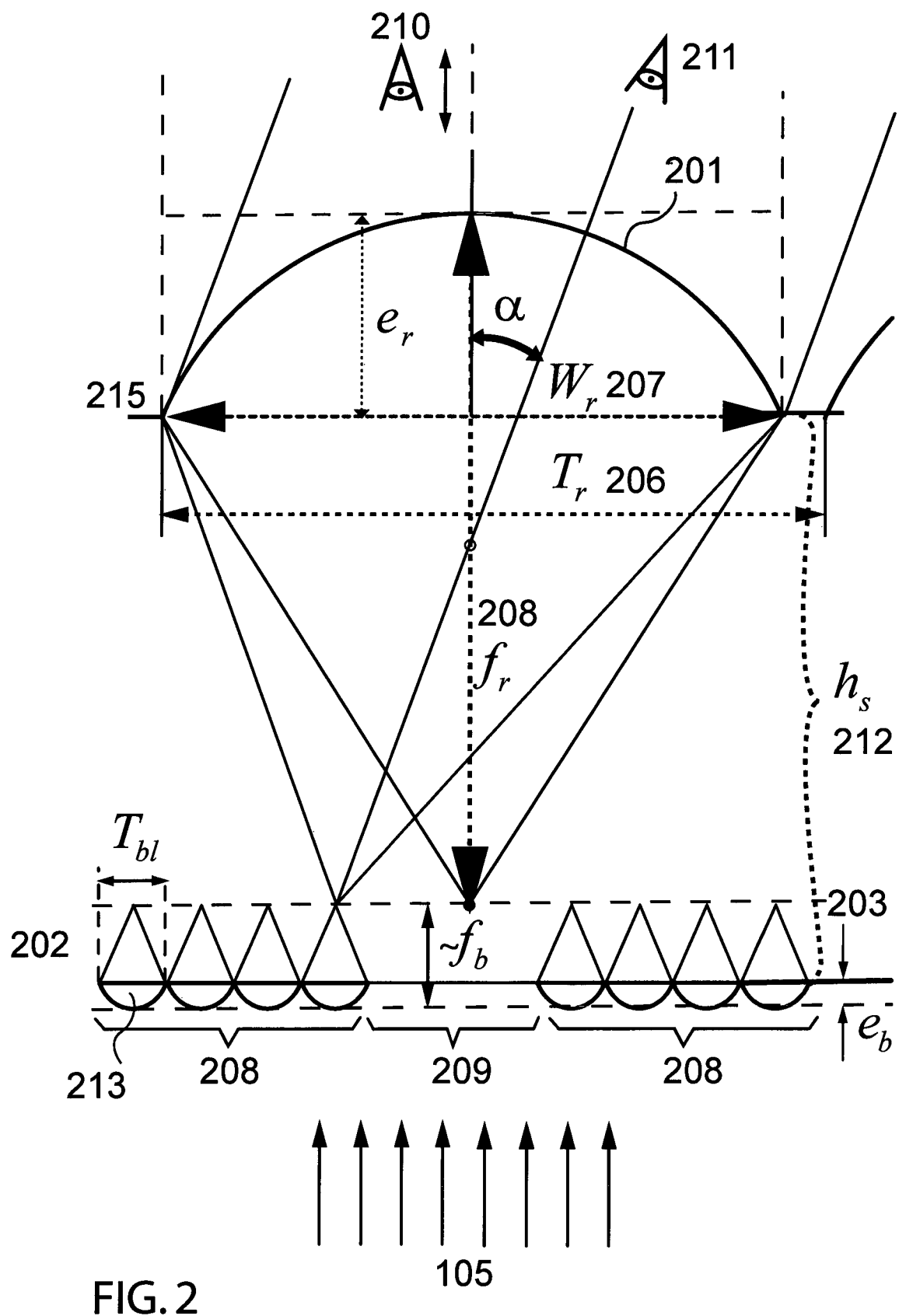
FIG. 2 shows a cross-section through the revealing and base layer gratings of lenslets having respectively large and small replication periods.

FIG. 2 illustrates a cross-section 201 through either a cylindrical lens (for line oriented superposition effects) or a spherical lens (for a 2D moiré) being part of the revealing layer. This revealing layer is superposed with base layer lenslet gratings 208 shown as cross-sections across the base layer 202. The plane 203 is the focal plane of the revealing layer lenslets on which the base layer cylindrical lenslets concentrate the incident light. The revealing layer cylindrical or spherical lenslet is repeated at a period $T_r$ (206). Its width is $W_r$ (207) and its focal length is $f_r$ (208). In the present example, the cylindrical lenslets 213 forming the base layer 202 cover the base layer foreground shape 208 and do not cover the base layer background shape 209. These lenslets have a period $T_{bl}$ and have a focal length $f_b$ which, in the case of a 1D moiré, 2D moiré and of lenticular images, are considerably smaller than the revealing layer cylindrical lens period $T_r$ and focal length $f_r$, respectively. Between the revealing layer lenslets 201 and the base layer with or without lenslets 202 there is a substantially transparent substrate whose thickness $h_s$ (212) is related to the sum of the focal lengths of the revealing and the base layer lenslets minus the lens heights $e_r$ and $e_b$ (see FIG. 2), i.e. $h_s \approx f_r + f_b - e_r - e_b$.

The observer located at a normal viewing distance from the revealing layer may view the multi-lenslet imaging device formed of the revealing and base layers from one angle (e.g. perpendicularly, see 210) or from another angle (e.g. angle α, see 211). By tilting this multi-lenslet imaging device, the revealing layer lenslets sample the base layer either at a location where the base layer lenslets are present or at a location where they are absent. Regions with lenslets create a bright texture differentiating themselves from the regions without lenslets. This differentiation is at the base of the superposition images viewed by the observer. When tilting the device in respect to the observer, the revealing layer lenslets scan their focal plane 203 close to the base layer, thereby propagating the light intensities created by the presence or the absence of the base layer lenslets onto the observer's eyes.

Multi-Lenslet Setup with Similar Revealing Layer and Base Layer Periods.

The superposition of an array of revealing layer lenslets having a large period and of an array of base layer lenslets having a small period is adequate for the 1D and the 2D moiré synthesizing methods, for some of the level line methods, for some of the phase shift synthesizing methods and for the lenticular image synthesizing methods. In respect to some other level line moiré and phase shift synthesizing technologies, the revealing layer cylindrical lenslets and the base layer cylindrical lenslets shall have the same period, or an integer multiple of that period, but are in some portions of the superposition image shifted one in respect to the other.

Figure 3:
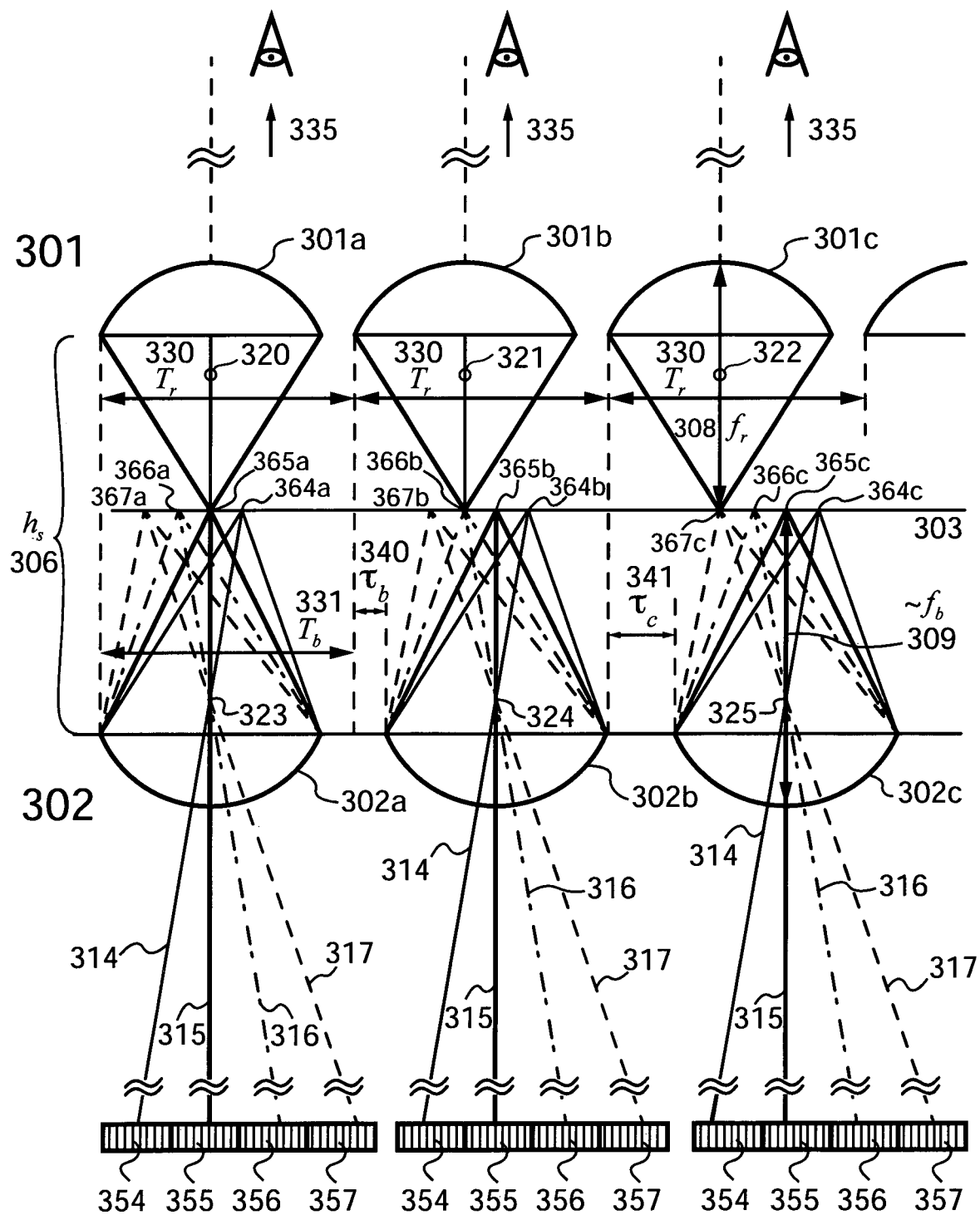
FIG. 3 shows a cross-section through revealing and base layer gratings of lenslets having the same replication periods.

FIG. 3. shows schematically a multi-lenslet imaging setup where the revealing layer lenslets have a period $T_r$ (330) and a focal length $f_r$ (308) and where the base layer lenslets have the same period $T_b = T_r$ (331) and a focal length $f_b$. The focal plane 303 is defined by the focal length of the revealing layer lenslets. The base layer lenslets concentrate the light on the focal plane of the revealing layer lenslets. The base layer lenslets need not necessarily focus the light on the focal plane sampled by the revealing layer lenslets. Their distance 309 to the focal plane can be different from $f_b$ by up to ±20%. A simple concentration of the incident light is sufficient. The observer 335 is located at a certain distance from the front of the setup, typically 35 cm, when the setup is located on a security document or a valuable article.

A strong visual effect is obtained by illuminating the multi-lenslet imaging device with spatially varying intensities or colors, for example a display or LEDs (light emitting diodes) showing red 354, green 355, blue 356 and white 357 colors. The corresponding light rays 314, 315, 316 and 317 concentrated by the base lenslet grating 302 illuminate in the focal plane 303 of the revealing layer lenslets portions 364a, 365a, 366a, 367a for lenslet 302a, portions 364b, 365b, 366b, 367b for lenslet 302b, portions 364c, 365c, 366c, 367c for lenslet 302c etc. . . . . . Instead of these 4 distinct colors, continuous or non-continuous intensity and/or color variations also create a strong visual effect.

In phase shift and level line moiré methods, some of the base layer lenslets are shifted in respect to the revealing lenslets. For example, the base layer lenslet 302a with center at position 323 is in phase with the revealing layer lenslet 301a with center at position 320. But the base layer lenslet 302b with center at position 324 is shifted by $\tau_b$ (340) in respect to revealing layer lenslet 301b with center at position 321. The base layer lenslet 302c with center at position 325 is shifted by $\tau_c$ (341) in respect to revealing layer lenslet 301c with center at position 322. When the base layer lenslet is in phase, illuminated region 365a is observed by the observer as the color 355 (green in the present example) sampled by the revealing layer lenslet 301a. When the base layer lenslets are out of phase, e.g. lenslet 302b with center 324 is at relative phase $\tau_b/T_b$ (340), a different part of the illuminated focal plane is sampled by the corresponding revealing layer lenslet 301b, here region 366b of the focal plane, illuminated by portion 356 of the illuminating light. As a further example, lenslet 302c is at phase $\tau_c/T_b$ and revealing layer lenslet 301c samples region 367c of the focal plane illuminated by portion 357 of the illuminating light. As illuminating light, light coming through a window may also be convenient, by having green portions from the trees and the grass, gray and yellow portions from buildings and blue portions from the sky. Light reflected from a variable intensity and variable color background such as a wall is also suitable. Light emitted by several LEDs illuminating the lenslet setup from behind also provides excellent visual effects. In addition, by using electronically driven multi-LED devices, i.e. several LEDS in a single package that emit different colors such as red, green and blue, one may create visually appealing colors varying over time by pulse-width modulation of the individual colored LEDs. With separate commands of the different packages of LEDs, one may obtain moiré level lines that in addition have smoothly evolving colors both spatially and over time.

Reinforcing the Contrast of the Base Layer by Diffusing Microlenses.

Figure 4A:
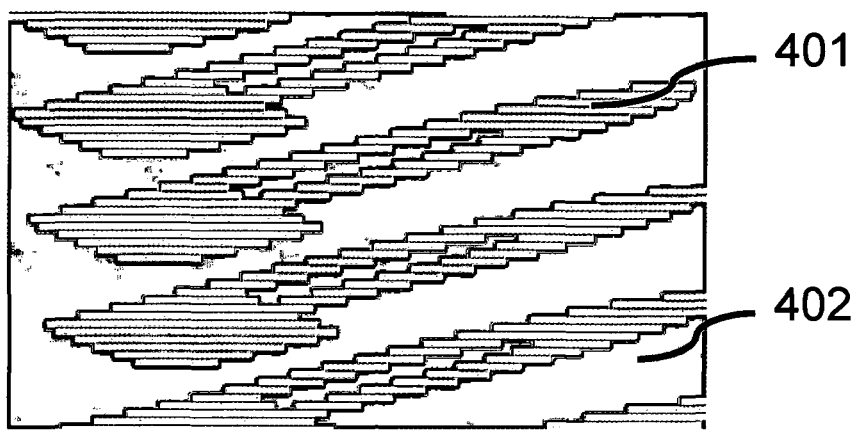
FIG. 4A shows a base layer where the arrays of rectangles indicate the foreground area of the base layer shapes on which cylindrical lenslet gratings will be placed and where the background is left empty.
Figure 4B:
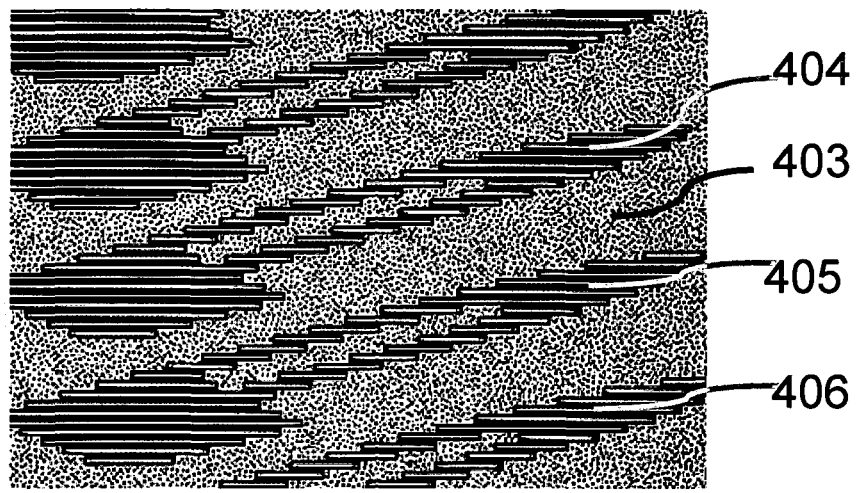
FIG. 4B shows the same base layer as FIG. 4A, but with the produced base layer lenslet gratings 404, 405, 406 at the positions of the rectangle arrays and with the background filled with diffusing microlenses 403.
Figure 4C:
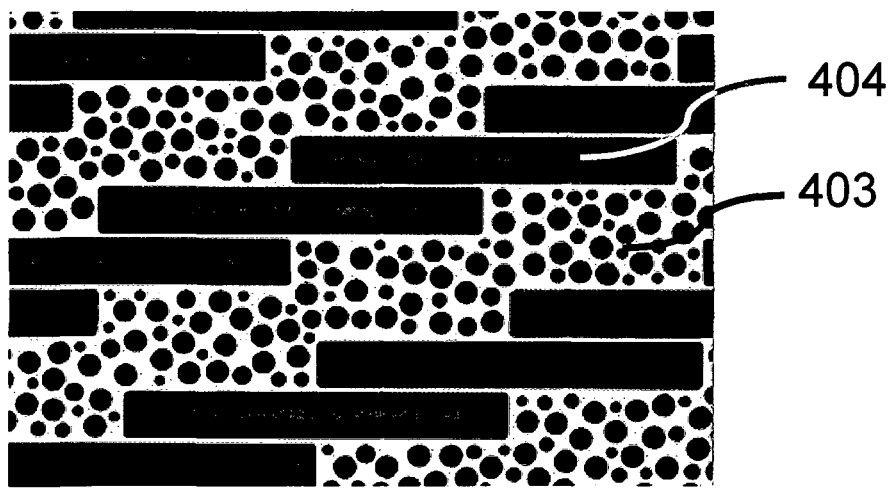
FIG. 4C shows an enlarged view of FIG. 4B.

A light diffusing behavior in regions where the base layer lenslets are absent (e.g. FIG. 4A, 402) can be achieved by placing small lenses 403 randomly across the regions forming the background of the base layer shape. These diffusing microlenses, line-oriented (1D) such as small segment cylindrical lenses or two-dimensional (2D) such as spherical or aspherical lenses should have a focal length significantly different from the cylindrical lenslets 401 present in the base layer. By randomly positioning and varying the size and therefore the focal length of these diffusing microlenses, one creates a light diffusing effect that considerably enhances the contrast between base layer shape foreground regions and base layer shape background regions. As an example, FIG. 4A shows the layout of the foreground regions 401 with the thin rectangular areas specifying the locations of the cylindrical lenses and the empty background regions 402. FIG. 4B shows the same views under a microscope where the cylindrical lenslets 404 form lenslet gratings that cover the foreground regions. Background regions are covered with the randomly positioned diffusing microlenses 403. FIG. 4C shows an enlargement of a part of FIG. 4B.

Let us describe embodiments of the present invention for the 1D moiré synthesizing techniques, lenticular image synthesizing techniques, and for the level line moiré synthesizing techniques.

Creating 1D Moiré with the Multi-Lenslet Imaging Setup

U.S. Pat. No. 7,710,551 (inventors Hersch and Chosson) discloses a "1D moiré image layout computation method" allowing the computation of the direction and the speed in which 1D moiré image shapes move when the revealing layer samples, when tilting the setup, successive locations of the superposed base layer. Formula (1) to (5) describe according to U.S. Pat. No. 7,710,551 (inventors Hersch and Chosson) the mathematics used for computing the layouts of the base layer, given the layouts of the revealing layer and of the moiré layer.

Figure 5A:
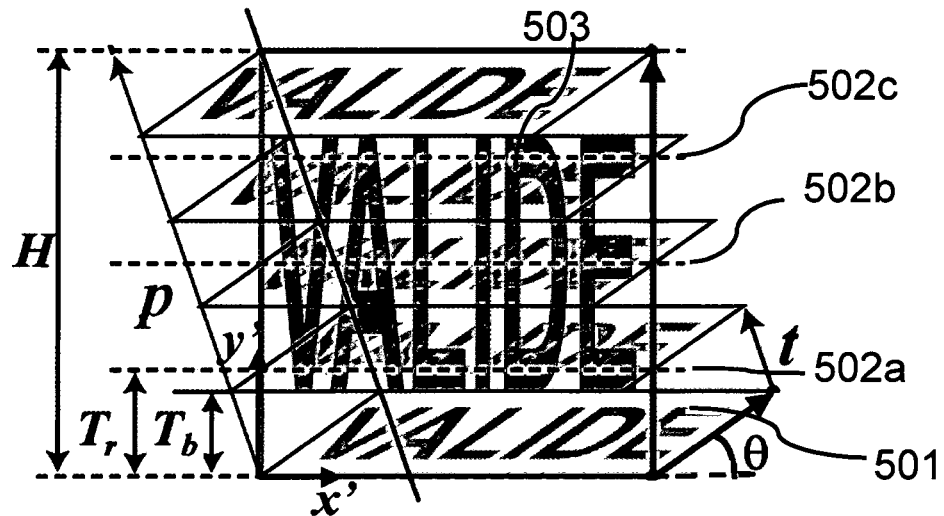
FIG. 5A shows for the 1D moiré the base layer formed of base bands 501 and the revealing layer sampling lines 502a, 502b, 502c as well as the resulting moiré shape 503.
Figure 5B:
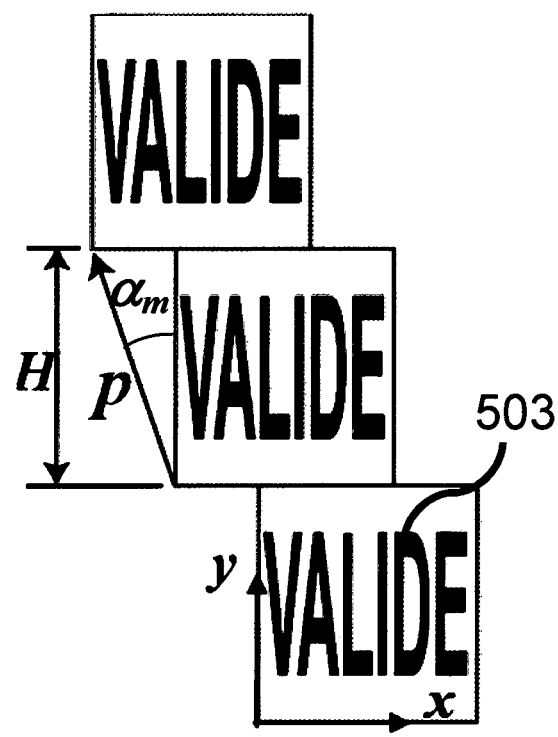
FIG. 5B shows the succession of 1D moiré shapes 503 obtained by the superposition of the base and the revealing layers.

Relying on the example of FIGS. 5A and 5B, let us first give the relationship between base band coordinates and moiré coordinates for a rectilinear moiré, i.e. a moiré defined as a linear transformation of the replicated base bands. Base band 501 of base band period $T_b$ with oblique base band letter shapes "VALIDE" is replicated by integer multiples of vector $t=(t_x, t_y)$ across the base layer to form the base band grating. The corresponding moiré shapes 503 "VALIDE" are obtained by the revealing layer sampling lines 502a, 502b, 502c, . . . having period $T_r$ sampling the base bands successively at different locations. The vertical component $t_y$ of base band replication vector t is equal to the base band period, i.e. $t_y=T_b$. The moiré space coordinate (x,y) in function of the base space coordinates (x',y') is:

$$\begin{bmatrix} x \\ y \end{bmatrix} = \begin{bmatrix} 1 & \frac{t_x}{T_r - T_b} \\ 0 & \frac{T_r}{T_r - T_b} \end{bmatrix} \begin{bmatrix} x' \\ y' \end{bmatrix} \quad (1)$$

Equation (1), with matrix $B=[1 \; t_x/T_r-T_b; \; 0 \; T_r/T_r-T_b]$ expresses the linear relationship between base band space coordinates (x',y') and moiré space coordinates (x,y).

By inserting the components $t_x$, $t_y$ of base band replication vector t as (x',y') into Eq. (1), and equating $t_y=T_b$, one obtains the moiré replication vector $p=(p_x, p_y)$. This calculation shows that the moiré replication vector p is the base band replication vector t multiplied by $T_r/(T_r-T_b)$.

The moiré height H is equal to the vertical component $p_y$ of the moiré replication vector p, i.e. $H=p_y$. Therefore, $$H = \frac{T_r \cdot T_b}{T_r - T_b} \quad (2)$$

A designer can freely choose his moiré image height H and the direction of its movement $\alpha_m$ by defining replication vector $p=(p_x, p_y)$, with $p_y=H$ and $p_x=-H \tan \alpha_m$ and solve Eq. (1) for t using also Eq. (2). This yields the base band replication vector $$t=p(T_b/H). \quad (3)$$

After selecting a suitable value for the revealing layer period $T_r$, an imaging software module can then linearly transform a moiré image defined in the moiré coordinate space (x,y) into a base band defined in the base layer coordinate space (x',y') by applying the inverse of Eq. (1), i.e.

$$\begin{bmatrix} x' \\ y' \end{bmatrix} = \begin{bmatrix} 0 & \frac{T_r - T_b}{T_r} \\ 1 & -\frac{t_x}{T_r} \end{bmatrix} \begin{bmatrix} x \\ y \end{bmatrix} \quad (4)$$

Let us now show how to generate a curvilinear moiré starting from a rectilinear moiré. One may specify the layout of a desired curvilinear 1D moiré image as well as the rectilinear or curvilinear layout of the revealing layer and the 1D moiré layout model is able to compute the layout of the base layer.

The layout of the 1D moiré image in the transformed space is expressed by a geometric transformation $M(x_t,y_t)$ which maps the transformed moiré space locations $(x_t,y_t)$ back to original moiré space locations (x,y). The layout of the revealing line grating in the transformed space is expressed by a geometric transformation $G(x_t,y_t)$ which maps the transformed revealing layer space locations $(x_t,y_t)$ back into the original revealing layer space locations (x',y'). The layout of the base band grating in the transformed space is expressed by a geometric transformation $H(x_t,y_t)$ which maps the transformed base band grating locations $(x_t,y_t)$ back into the original base band grating locations (x',y'). Transformation $H(x_t,y_t)$ is a function of the transformations $M(x_t,y_t)$ and $G(x_t,y_t)$.

Let us define the transformations M, G, and H as $M(x_t,y_t)=(m_x(x_t,y_t), m_y(x_t,y_t))$, $G(x_t,y_t)=(x, g_y(x_t,y_t))$, and $H(x_t,y_t)=(h_x(x_t,y_t), h_y(x_t,y_t))$. According to the publication by R. D. Hersch and S. Chosson, Band Moiré Images, Proc. SIGGRAPH 2004, ACM Trans. on Graphics, Vol. 23, No. 3, 239-248 (2004), the transformation of the moiré $M(x_t,y_t)$ is the following function of the transformations of the base layer $H(x_t,y_t)$ and of the revealing layer $G(x_t,y_t)$:

$$x = m_x(x_t, y_t) = h_x(x_t, y_t) + (h_y(x_t, y_t) - g_y(x_t, y_t)) \cdot \frac{t_x}{T_r - t_y} \quad (5)$$

$$y = m_y(x_t, y_t) = h_y(x_t, y_t) \cdot \frac{T_r}{T_r - t_y} - g_y(x_t, y_t) \cdot \frac{t_y}{T_r - t_y}$$

where $T_r$ is the period of the revealing line grating in the original space and where $(t_x, t_y)=(t_x, T_b)$ is the base band replication vector in the original space.

Then base layer transformation $H(x_t,y_t)$ is deduced from Eq. (5) as follows when given the moiré layer transformation $M(x_t,y_t)$ and the revealing layer transformation $G(x_t,y_t)$ according to $$h_x(x_t, y_t) = (g_y(x_t, y_t) - m_y(x_t, y_t)) \cdot \frac{t_x}{T_r} + m_x(x_t, y_t) \quad (6)$$

$$h_y(x_t, y_t) = g_y(x_t, y_t) \cdot \frac{T_b}{T_r} + m_y(x_t, y_t) \cdot \frac{T_r - T_b}{T_r}$$

Therefore, given the moiré layout and the revealing layer layout, one obtains the backward transformation allowing to compute the base layer layout. The moiré having the desired layout is then obtained by the superposition of the base and revealing layers.

Example A: Rectilinear 1D Moiré Image "EPFL" Formed of Revealing and Base Layer Lenslets FIG. 6A shows schematically an example of a rectlinear moiré image 603 formed of the superposition of base layer base bands 601 with foreground shapes 610 (black) and background shapes 611 (white) and a revealing layer 602 formed of an array of sampling lines 612. The revealing layer period $T_r$ is 400 µm, the base band period $T_b=t_y$ is 364 µm and the moiré height is according to formula (2) H=4.044 mm. The transparent sampling lines 612 show the positions of the centerlines on which the cylindrical lenslets of the revealing layer are placed. FIG. 6B is an enlarged view of a part of FIG. 6A (compressed letter "F") and shows the layout of the base layer rectangle array 615 for producing the grating of cylindrical oblique lenslets forming the base layer foreground shapes 610. FIG. 6C shows a realization of the layout shown in FIG. 6B with a picture of the actual base layer lenslet grating 620 laid out according to the layout 610 and along the obliquely laid out rectangle array 615. The base layer lenslet grating has a period of $T_{bl}=27$ µm and a lenslet width $W_{bl}=25$ µm. The base layer background shape 611 is populated with randomly placed 2D lenses 622 having a width between 8 µm to 12 µm and focal lengths between 20 µm and 30 µm. Note that the obliquely laid out base layer lenslet grating 620 creates sharper moiré shapes.

Figure 7A:
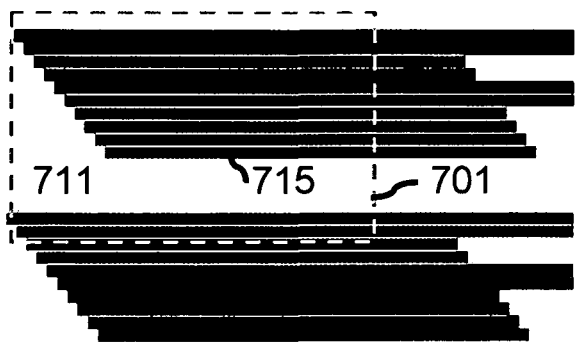
FIG. 7A shows another embodiment of base layer area 610 in FIG. 6A, with the rectangle array 712 defining the layout of a horizontally laid out lenslet grating 720.
Figure 7B:
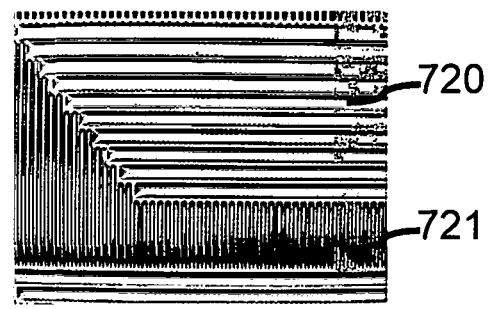
FIG. 7B shows under the microscope rectangular area 701 (dashed border) embodied by a horizontal lenslet grating 720 for the base layer foreground area and a vertical lenslet grating 721 for the base layer background area.

FIG. 7A shows an alternative base layer layout for the small compressed "F" 610 of FIG. 6A. FIG. 7B shows a picture of a region 701 of the corresponding implemented base layer lenslet grating seen under a microscope. The foreground 610 is populated with a horizontally laid out lenslet grating, laid out according to the rectangle array 715 and realized with the lenslet grating 720 (period $T_{bl}=27$ µm). The background 711 is populated by a vertically laid out lenslet grating 721 with a period of approximately one third the period of the horizontally laid out foreground lenslet grating. Since the background lenslet grating has a focal length much smaller than the focal length of the foreground lenslet array, the light traversing it will be diffuse at the depth of the focal plane of the revealing layer lenslet array. In contrast, the light traversing the foreground lenslet grating will be concentrated into the focal plane of the revealing layer lenslet grating. This statement is valid both for base layer background shapes populated with small spherical lenslets or populated with small cylindrical lenslets. The different light concentration behavior of foreground and background base layer lenslet gratings yields the contrast that enables revealing the superposition images (1D moiré, 2D moiré, 2D random moiré, lenticular images).

Figure 8:
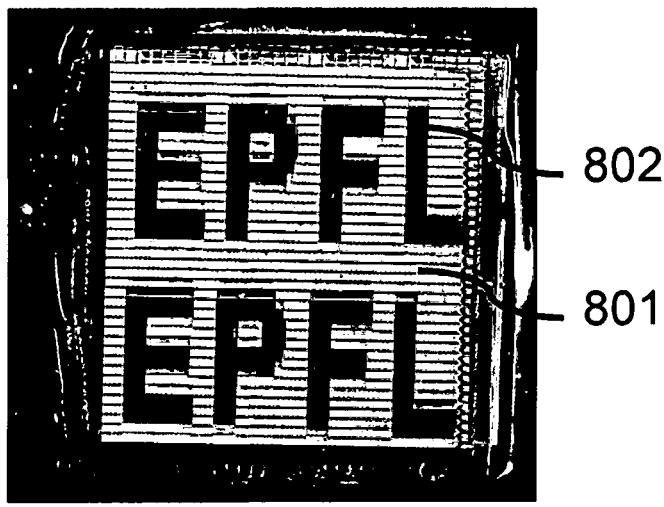
FIG. 8 shows a photograph of the fixed setup of base and revealing layer lenslets, with the revealing layer lenset grating 801 and the resulting moiré shape image "EPFL" 802.
Figure 9:
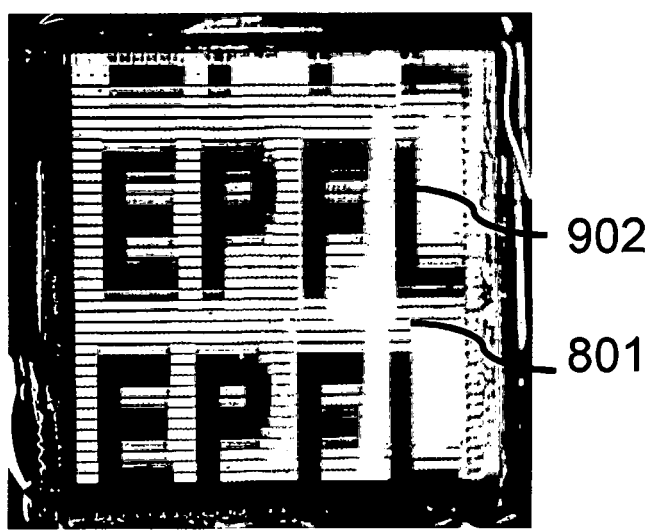
FIG. 9 shows the same device as in FIG. 8, but after tilting it vertically: the moiré shapes have moved to a lower position 902.

FIG. 8 shows a photograph of a device formed of two lenslet layers, with the "EPFL" moiré shape 802 formed of the superposition of the cylindrical base layer lenslets partly shown schematically in FIG. 7A and of the cylindrical revealing layer lenslets 801. The revealing layer lenslet array has a lenslet period of 400 µm, with a lenslet width of 385 µm and a gap of 15 µm between individual lenslets. FIG. 9 is a photograph of the same device as in FIG. 8, but viewed from a slightly different angle. The "EPFL" moiré shape 902 in FIG. 9 has moved vertically in respect to the "EPFL" moiré shape 802 shown in FIG. 8.

In order to prevent counterfeiters from creating duplicates of the base layer lenslet foreground and background surfaces by surface duplication methods, and/or to protect the base layer lenslets against abrasure, one may encapsulate it into another material having a lower index of refraction than the lenlets' material, e.g. an index of refraction of 1.4 for a lenslet material of index of refraction of 1.5. Compared with lenslets in ambiant air, the encapsulating material increases the focal length of the lenslets calculated according to formula (12), where the index of refraction of the encapsulating material has to be inserted as $n_m$.

Example B. Circular Band Moiré Image and Rectilinear Revealing Layer

Figure 10A:
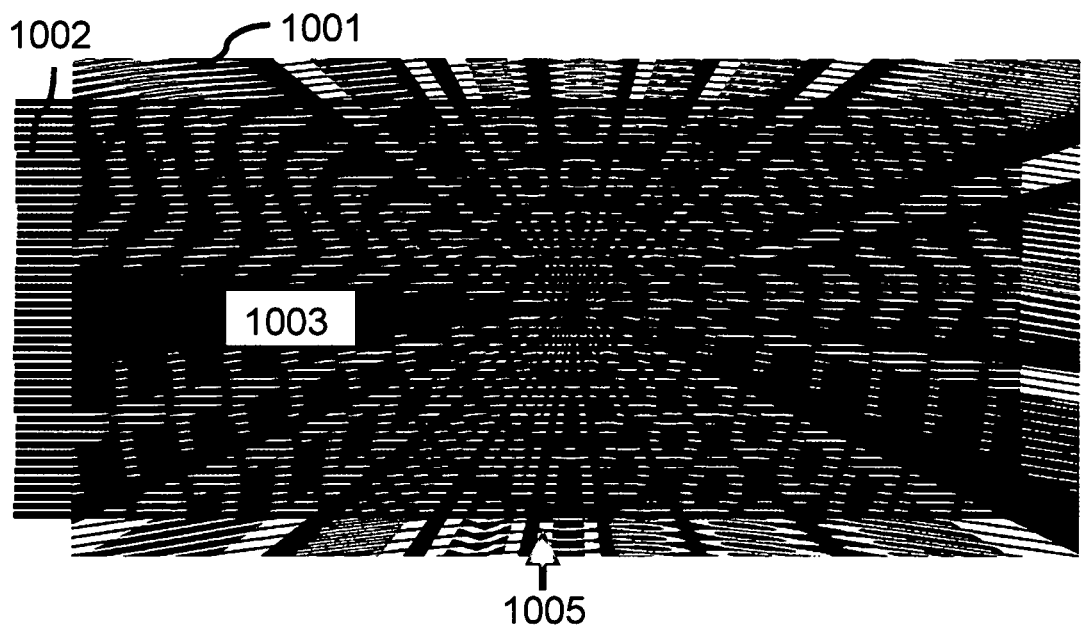
FIG. 10A shows a circularly laid out 1D moiré image obtained by superposition of a geometrically transformed base layer and a rectilinear revealing layer.

In the present example, we choose a circularly laid out moiré image and also freely choose the revealing layer layout. The desired reference circular moiré image layout is given by the transformation mapping from transformed moiré space back into the original moiré space, i.e.

$$m_x(x_t, y_t) = \frac{\pi - \operatorname{atan}(y_t - c_y, x_t - c_x)}{2\pi} w_x \quad (7)$$

$$m_y(x_t, y_t) = c_m \sqrt{(x_t - c_x)^2 + (y_t - c_x)^2}$$

where constant $c_m$ expresses a scaling factor, constants $c_x$ and $c_y$ give the center of the circular moiré image layout in the transformed moiré space, $w_x$ expresses the width of the original rectilinear reference band moiré image and function a tan (y,x) returns the angle α of a radial line of slope y/x, with the returned angle α in the range ($-\pi <= \alpha <= \pi$). The corresponding desired reference circular moiré image is shown in FIG. 10A, 1003 and appears as the message "VALID OFFICIAL DOCUMENT". We take as revealing layer a rectilinear layout identical to the original rectilinear revealing layer, i.e. $g_y(x_t, y_t) = y_t$ (1002). By inserting the curvilinear moiré image layout equations (7) and the revealing layer layout equation $g_y(x_t, y_t) = y_t$ into the band moiré layout model equations (6), one obtains the deduced curvilinear base layer layout equations $$h_x(x_t, y_t) = \left(y_t - c_m \sqrt{(x_t - c_x)^2 + (y_t - c_y)^2}\right) \frac{t_x}{T_r} + \quad (8)$$

$$\frac{\pi - \operatorname{atan}(y_t - c_y, x_t - c_x)}{2\pi} w_x$$

$$h_y(x_t, y_t) = c_m \sqrt{(x_t - c_x)^2 + (y_t - c_y)^2} \cdot \frac{T_r - t_y}{T_r} + y_t \frac{t_y}{T_r}$$

These curvilinear base layer layout equations express the geometric transformation from transformed base layer space to the original base layer space. The corresponding curvilinear base layer in the transformed space is shown in 1001. The resulting moiré image formed of the superposition of the base layer (1001) and of the revealing layer (1002) is shown in 1003. When the revealing layer 1002 is moved vertically over the base layer 1001, the corresponding circular moiré image patterns move radially and change their shape correspondingly. When moving towards the exterior of the circular moiré, the letters become wider.

Figure 10B:
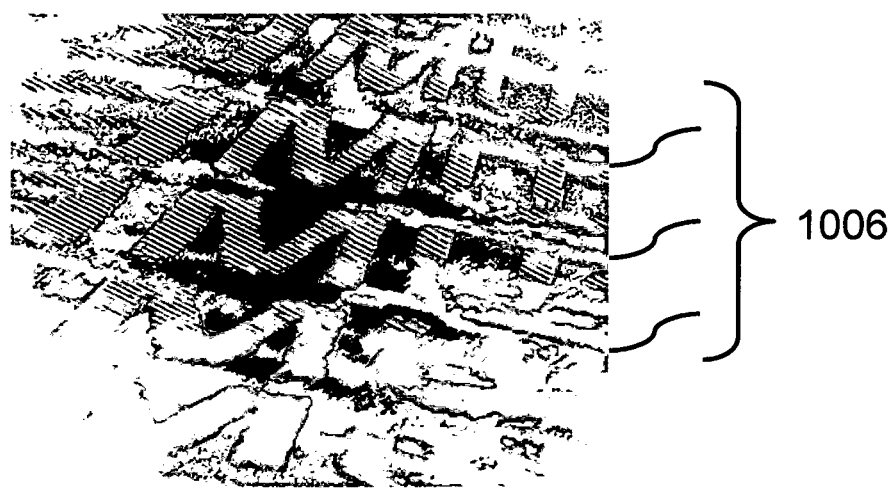
FIG. 10B shows a photograph of the view from a microscope of a part of the fixed setup comprising base and revealing layer lenslet gratings, fabricated according to the layout of the base and revealing layers of FIG. 10A.
Figure 11:
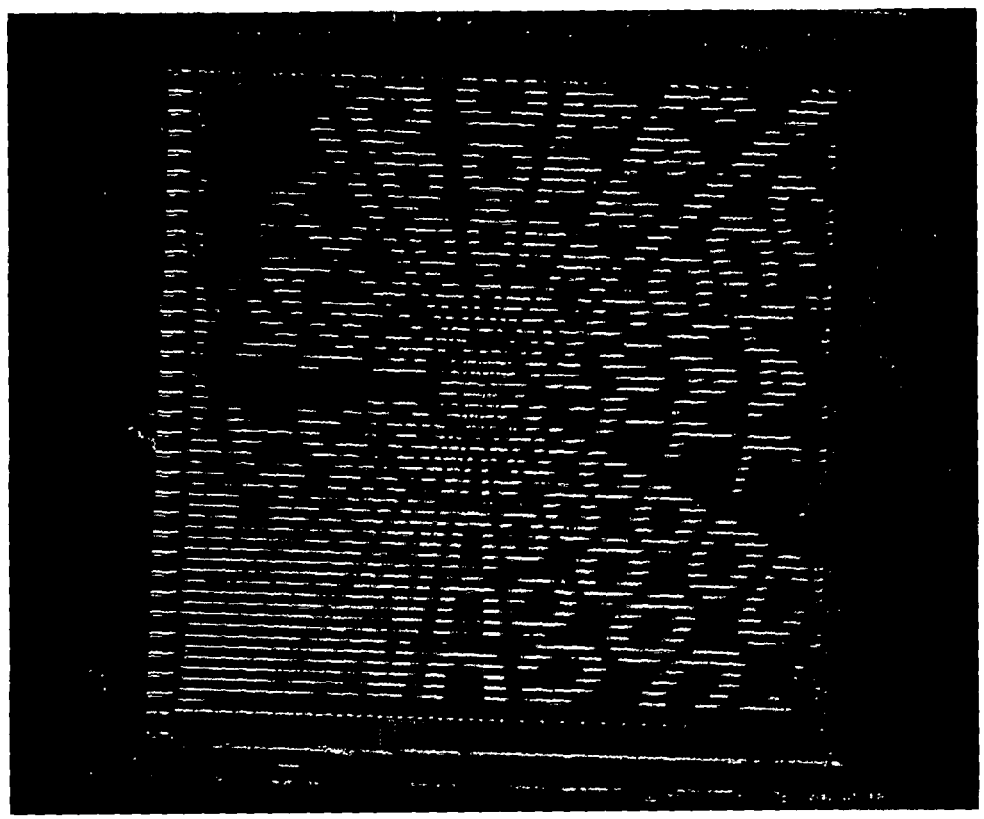
FIG. 11 shows a photograph of the fixed setup comprising base and revealing layer lenslet gratings laid out according to FIG. 10A, yielding the desired circular moiré shapes.

Let us consider example B embodied as a setup formed of two superposed layers of lenslet gratings according to Section "Multi-lenslet imaging setup with large revealing layer periods and small base layer periods". FIG. 10B shows a photograph of a microscopic enlargement of part of the base layer lenslets 1005 forming the base layer letters "UME." as embodiment of the lower central part of the base layer of FIG. 10A (1001). When superposed with a grating of rectilinear revealing layer sampling lines 1002, embodied by the cylindrical lenslet grating appearing as slightly oblique lines in FIG. 10B (1006), the circular moiré shape image appears. This moiré shape image is schematically shown in FIG. 10A (1003) and also shown as a photograph in FIG. 11 when embodied as the setup formed of the superposed base and revealing layers of lenslet gratings.

Example C. Curvilinear Moiré Shape Image and Cosinusoidal Revealing Layer

Figure 12:
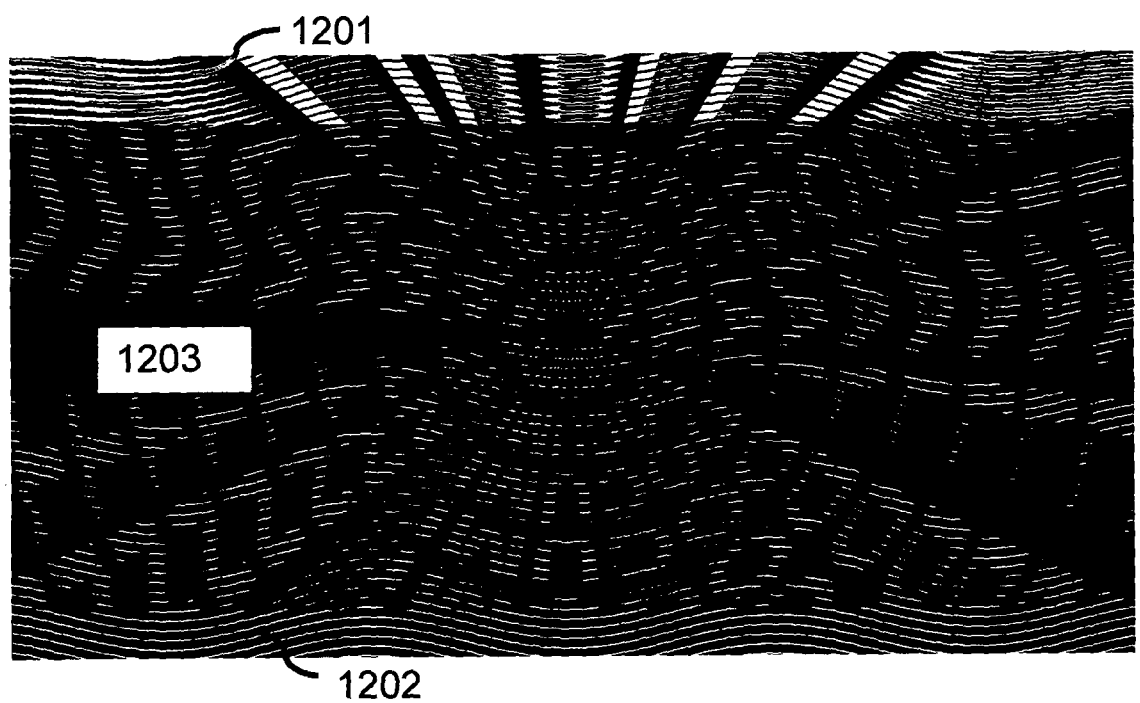
FIG. 12 shows a circularly laid out 1D moiré image obtained by superposition of a geometrically transformed base layer and a cosinusoidal geometrically transformed revealing layer.

Let us now take a curvilinear revealing layer and still generate the same desired curvilinear moiré image as in the previous example B. As example, we take as curvilinear revealing layer a cosinusoidal layer whose layout is obtained from the rectilinear revealing layer by a cosinusoidal transformation $$g_y(x_r, y_r) = y_r + c_1 \cos(2\pi x_r / c_2) \quad (9)$$

where constants $c_1$ and $c_2$ give respectively the amplitude and period of the cosinusoidal transformation. The corresponding cosinusoidal revealing layer is shown in FIG. 12, 1202. By inserting the curvilinear moiré image layout equations (7) and the curvilinear revealing layer layout equation (9) into the band moiré layout model equations (6), one obtains the deduced curvilinear base layer layout equations $$h_x(x_t, x_t) = \left(y_t + c_1 \cos\left(\frac{2\pi x_t}{c_2}\right) - c_m \sqrt{(x_t - c_x)^2 + (y_t - c_y)^2}\right) \cdot \frac{t_x}{T_r} + \quad (10)$$

$$\frac{\pi - \operatorname{atan}(y_t - c_y, x_t - c_x)}{2 \cdot \pi} \cdot w_x$$

$$h_y(x_t, x_t) = c_m \sqrt{(x_t - c_x)^2 + (y_t - c_y)^2} \cdot \frac{T_r - t_y}{T_r} +$$

$$\left(y_t + c_1 \cos\left(\frac{2\pi x_t}{c_2}\right)\right) \cdot \frac{t_y}{T_r}$$

These curvilinear base layer layout equations express the geometric transformation from the transformed base layer space to the original base layer space. The corresponding curvilinear base layer is show in 1201. The superposition of the curvilinear base layer 1201 and curvilinear revealing layer 1202 yields moiré image 1203. When the revealing layer 1202 is moved vertically over the base layer 1201, the corresponding circular moiré image patterns move radially and change their shape correspondingly, as in the example shown in FIGS. 12 and 13. Let us consider example C embodied as a setup formed of two superposed layers of lenslets according to Section "Multi-lenslet imaging setup with large revealing layer periods and small base layer periods". The base layer grating of lenses is placed at all foreground areas ("white" areas in FIGS. 10A, 12 and 13) of the base layer, in a similar manner as in FIG. 10B. These foreground areas act as a mask for the base layer gratings of lenslets. The revealing layer grating of lenslets is formed of cylindrical lenslets following the cosinusoidal transparent ("white" in FIG. 12) lines 1202 of the revealing layer.

Figure 13:
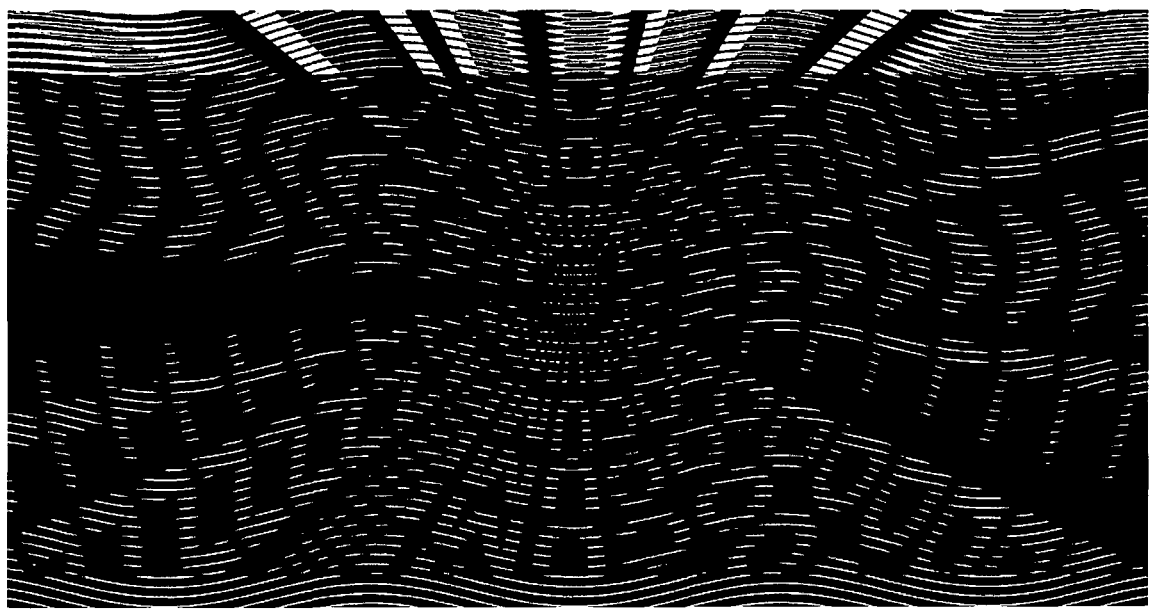
FIG. 13 shows the same base and revealing layers as FIG. 12, but with the revealing layer sampling a different position of the base layer, yielding a radial displacement of the circular moiré shapes.

FIG. 13 shows that a slight displacement of the sampling locations of the revealing layer cylindrical lenslets obtained by a vertical shift of the revealing layer, or in case of a fixed setup obtained by tilting, yields a radial displacement of the revealed circular message. In FIG. 13, the message "VALID OFFICIAL DOCUMENT" has moved radially in respect to its position in FIG. 12.

Dynamically Moving 1D and 2D Moiré Shapes Seen in Three Dimensions Thanks to the Human Stereoscopic Vision When creating a setup with vertically laid out revealing layer sampling lines, each eye of the observer sees at each position a slightly different sampling of the base layer, i.e. each eye sees a slightly different moiré image. Due to their slightly different sampling phase, these moiré images are slightly displaced one in respect to another and yield, thanks to human stereoscopic vision, an image having a certain depth.

Figure 14:
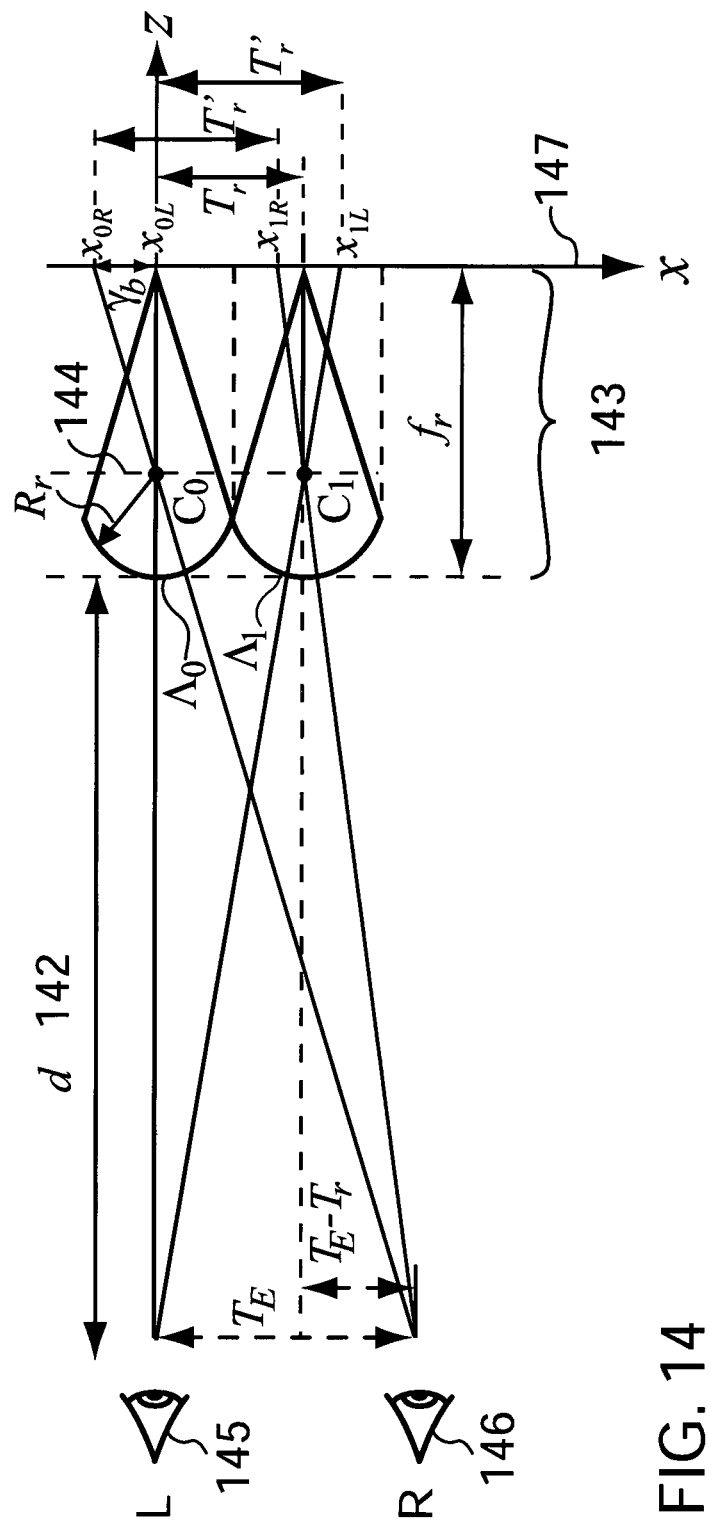
FIG. 14 shows the geometry used for calculating the offset between the moiré shape seen by the left eye and the moiré shape seen by the right eye.
Figure 17:
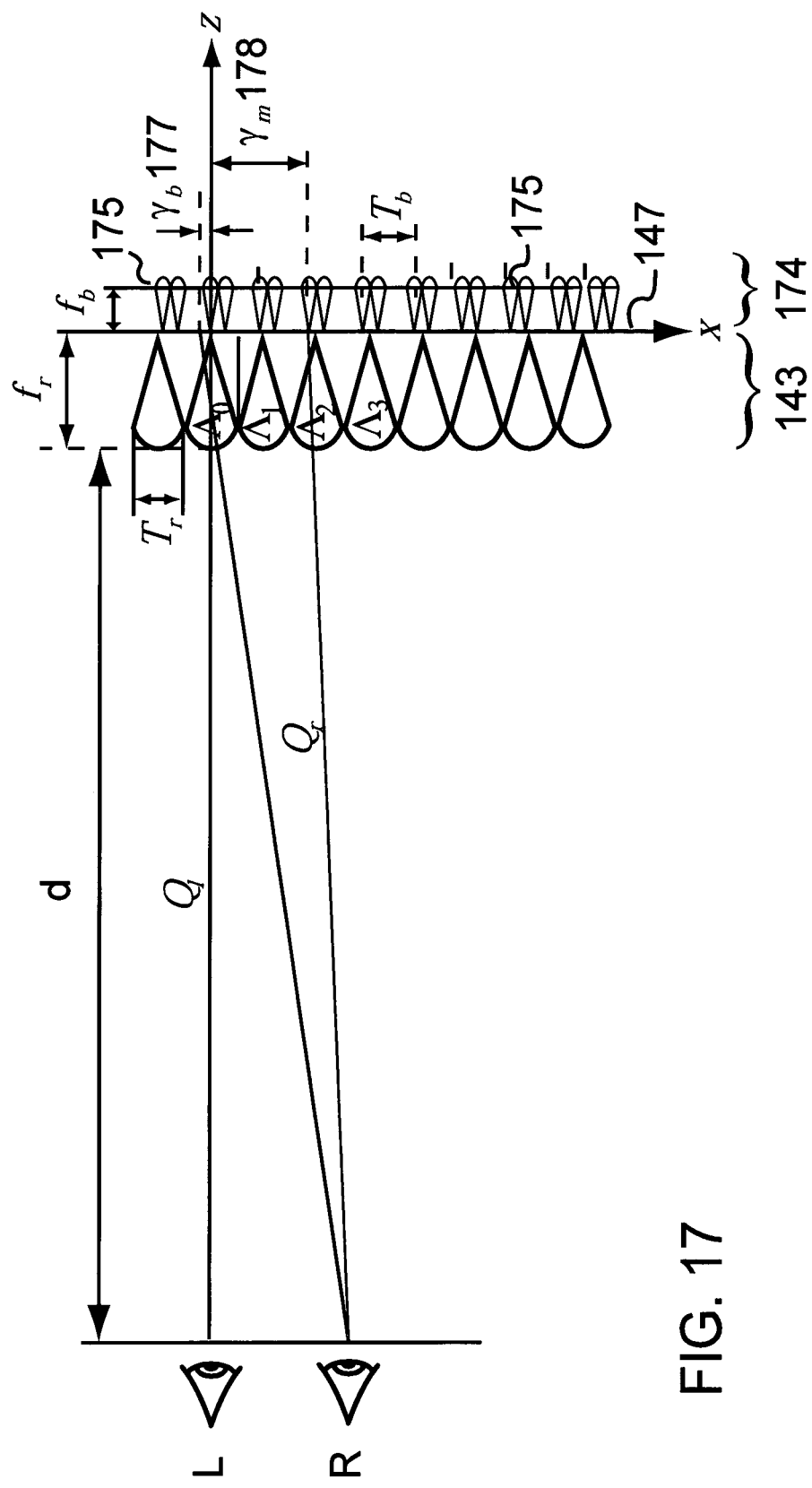
FIGS. 17 and 18 are helpful in calculating the apparent depth of the moiré shape view.

FIG. 14 shows schematically the geometry used for calculating the offset between a moiré shape seen by the left eye ("L") and a moiré shape seen by the right eye ("R"). This moiré offset, also called disparity, determines the apparent depth of the moiré shape. The space $T_E$ between the left eye 145 and right eye 146 is generally around 63 mm We assume a viewing distance d (142, e.g. 360 mm) from the eyes to the setup. The setup comprises a revealing layer 143 formed of a 1D grating of lenticular lenslets of replication period $T_r$ and of a base layer 174 (see FIG. 17, showing the same view as FIG. 14, at a different enlargement) formed of gratings of small cylindrical lenslets (FIG. 17, 175). As shown in FIG. 14, the left eye (L) views the base layer across revealing layer lenslet $\Lambda_0$ at position $x_{0L}=x=0$ and across lenslet $\Lambda_1$ at position $x_{1L}$. The right eye (R) views the base layer across lenslet $\Lambda_0$ at position $x_{0R}=-\gamma_b$ and across lenslet $\Lambda_1$ at position $x_{1R}$.

The horizontal difference $\gamma_b$ (difference along the x-axis), also called base layer disparity, between the base layer spots $x_{0L}$ and $x_{0R}$ observed by the left and the right eyes respectively through lenslet $\Lambda_0$ is according to the geometry of FIG. 14

$$g_b = \frac{T_E}{d+R_r}(f_r - R_r) \quad (11)$$

where $R_r$ is the lenslet curvature radius. For a circular lenslet section, curvature radius $R_r$ is defined by the well-known relation giving the focal length as a function of the curvature radius and the index of refraction of the used material:

$$f_r = R_r \frac{n_{lens}}{n_{lens} - n_m} \quad (12)$$

where $n_{lens}$ is the index of refraction of the lens material and $n_m$ is the index of refraction of the surrounding medium, in the case of air, $n_m = 1$.

Through lens $\Lambda_0$ the right eye (R) views position $$x_{0R} = -g_b = -\frac{T_E}{d+R_r}(f_r - R_r) \quad (13)$$

Through lenslet $\Lambda_1$ the right eye (R) views position $x_{1R}$ which is $$x_{1R} = T_r - \frac{T_E - T_r}{d+R_r}(f_r - R_r) \quad (14)$$

Through lenslet $\Lambda_2$ the right eye (R) views position $x_{2R}$ which is $$x_{2R} = 2T_r - \frac{T_E - 2T_r}{d+R_r}(f_r - R_r) \quad (15)$$

The positional x-increment from one revealing layer lenslet $\Lambda_i$ to the next $\Lambda_{i+1}$ is therefore $$Dx_r = T_r + \frac{T_r}{d+R_r}(f_r - R_r) = \frac{dT_r + T_r R_r + T_r f_r - T_r R_r}{d+R_r} = T_r \frac{d+f_r}{d+R_r} \quad (16)$$

This x-increment $\Delta x_r$ is identical to the projected revealing layer period $T'_r$. According to FIG. 14, the projected revealing layer period $T'_r$, also called "apparent revealing layer period", is obtained by projecting revealing layer period $T_r$ from the plane 144 connecting the central points $C_0, C_1, C_2, \ldots$ of the revealing layer lenses onto the focal plane 147 of the revealing layer lenses. Namely, $$\frac{T'_r}{T_r} = \frac{(d+f_r)}{d+R_r} \Rightarrow T'_r = T_r \frac{(d+f_r)}{d+R_r} \quad (17)$$

By comparing Eq. (16) and Eq. (17), one can easily verify that indeed, $\Delta x_r = T'_r$.

Let us now deduce the relative positions of the moiré shapes seen by the left and right eyes. Thanks to stereoscopic fusion, the offset between the moiré shapes seen by the left and right eyes yields the perception of depth.

Figure 15:
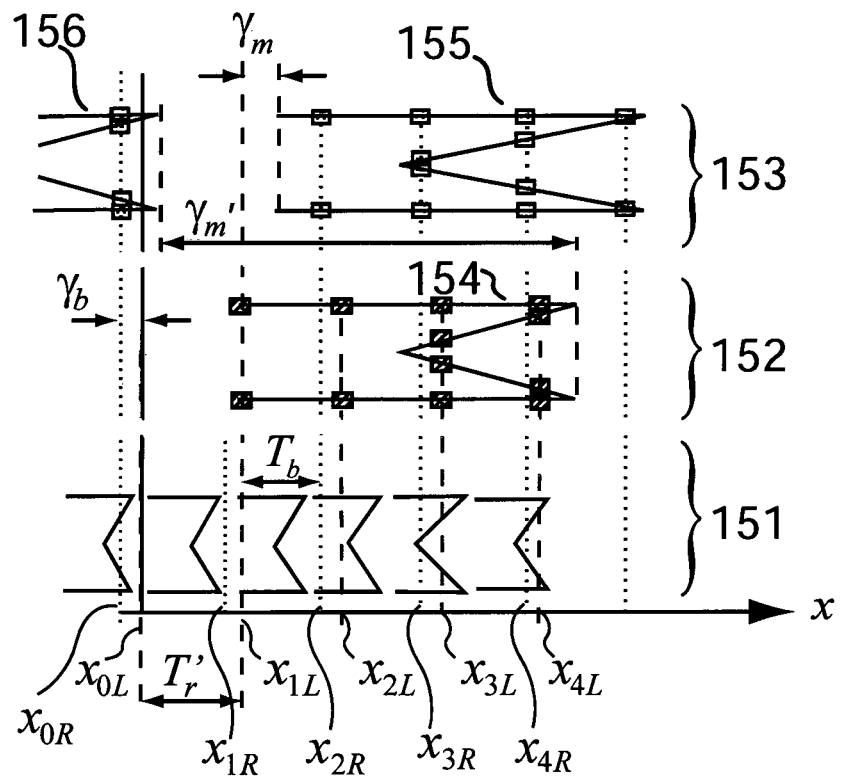
FIG. 15 shows schematic views of the base layer 151, of the moiré shape seen by the left eye 152 and of the moiré shape seen by the right eye 153, with the apparent revealing layer period being larger than the base layer period.

FIG. 15 shows the setup from above (x-y plane), with separately the base layer 151, the moiré shape seen by the left eye 152 and the moiré shape seen by the right eye 153 for the case where the base layer band period (the period of repetition of the small "M" in FIG. 15) is smaller than the apparent revealing layer period, i.e. $T'_r > T_b$. We assume that the left eye is in front of the setup, on the z-axis perpendicular to the setup at position x=0. The vertical dashed lines $x_{0L}, x_{1L}, x_{2L}, x_{3L}, x_{4L} \ldots$ are the sampling lines of the revealing layer lenslet grating when looked upon from the left eye. The vertical dashed lines $x_{0R}, x_{1R}, x_{2R}, x_{3R}, x_{4R} \ldots$ are the sampling lines of the revealing layer lenslets when looked upon from the right eye. By sampling the base layer shapes (here small letters "M", each one inscribed within a base band), the sampling lines seen by the left eye create the moiré shapes 152 that appear to the left eye and the sampling lines created by the right eye create the moiré shapes 153 that appear to the right eye.

Let us now calculate the apparent height of the moiré seen by the left or the right eye. The moiré shape is produced by the revealing layer sampling lines projected onto the focal plane. The period of these projected revealing layer sampling lines is $T'_r$. According to Eq. (2) the apparent height H' of the moiré is $$H' = \frac{T_b \times T'_r}{T'_r - T_b} \quad (18)$$

We can consider the moiré height H' to be the moiré height apparent to the eyes in the case of a revealing layer array of cylindrical lenslets sampling a base layer formed of vertical base bands, where the base band shapes are defined by small cylindrical lenslet gratings (e.g. 620 in FIG. 6C). Apparent moiré height H' is calculated in the same manner as the classical moiré height without gap between revealing layer and base layer, but using as revealing layer period the revealing layer period projected onto the focal plane (Eq. (17)).

Let us now calculate the offset $\gamma_m$ (also called disparity) between the moiré shape seen by the left eye and the moiré shape seen by the right eye. Due to the position of the right eye (FIG. 14, 146), there is an offset between the base band locations $x_{iL}$ sampled by the revealing layer lenslets when seen from the left eye and the base band locations $x_{iR}$ sampled when seen from the right eye. At $x_{OL}=0$ for the left eye, the corresponding offset $x_{OR}=-\gamma_b$ for the right eye is computed according to Eq. (11). It corresponds to a phase within the revealing layer period of $\phi_r=\gamma_b/T'_r$. This means that by shifting the revealing layer by phase $\phi_r$, we bring the moiré seen by the left eye and the moiré seen by the right eye onto the same position. Therefore, the offset $\gamma_m$ between the moiré seen respectively by the left and right eyes is the ratio $\phi_r$ of the apparent moiré height H'. We obtain $$\gamma_m = \phi_r H' = \frac{\gamma_b}{T'_r} \frac{T_b \cdot T'_r}{(T'_r - T_b)} = \frac{\gamma_b \cdot T_b}{T'_r - T_b} \quad (19)$$

Figure 16:
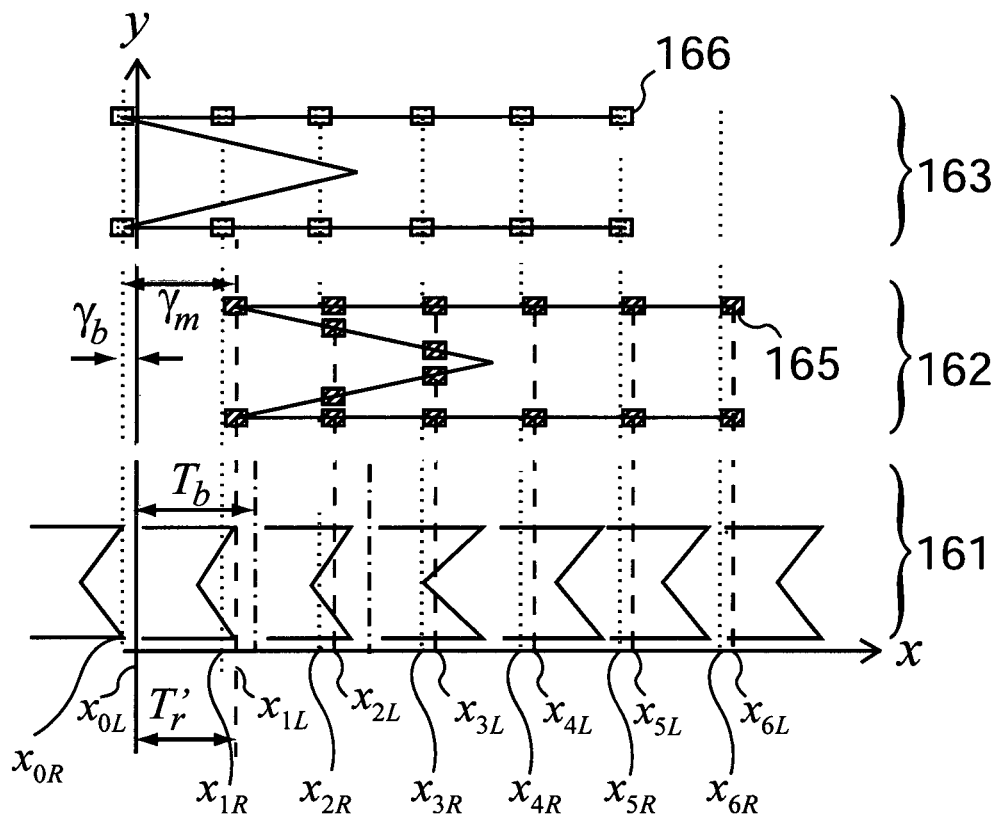
FIG. 16 shows similar representations as in FIG. 15, but with the base layer period being larger than the apparent revealing layer period.

FIG. 16 shows the same elements as FIG. 15, with separately the base layer 161, the moiré shape seen by the left eye 162 and the moiré shape seen by the right eye 163 but for the case where the base layer band period is larger than the revealing layer period, i.e. $T_b > T'_r$. Observe that in this case, the layout of the base layer shape (letter M upright in positive x-direction) is inversed in respect to the layout of the moiré shape (letter upright in negative x-direction). This is expressed in formula (18) by the negative apparent moiré height H', resulting from the fact that $T'_r - T_b$ is negative. Formula (19) also yields a negative offset $\gamma_m$.

By inserting Eq. (11) into Eq. (19), we obtain the moiré offset $\gamma_m$ as a function of the base layer period $T_b$, projected revealing layer period $T'_r$, focal length $f_r$ of the revealing layer lenslets and viewing distance d.

$$\gamma_m = \frac{\frac{T_E}{d+R_r}(f_r - R_r) \cdot T_b}{T'_r - T_b} = \frac{T_E \cdot T_b}{(T'_r - T_b)} \cdot \frac{(f_r - R_r)}{(d + R_r)} \quad (20)$$

Figure 18:
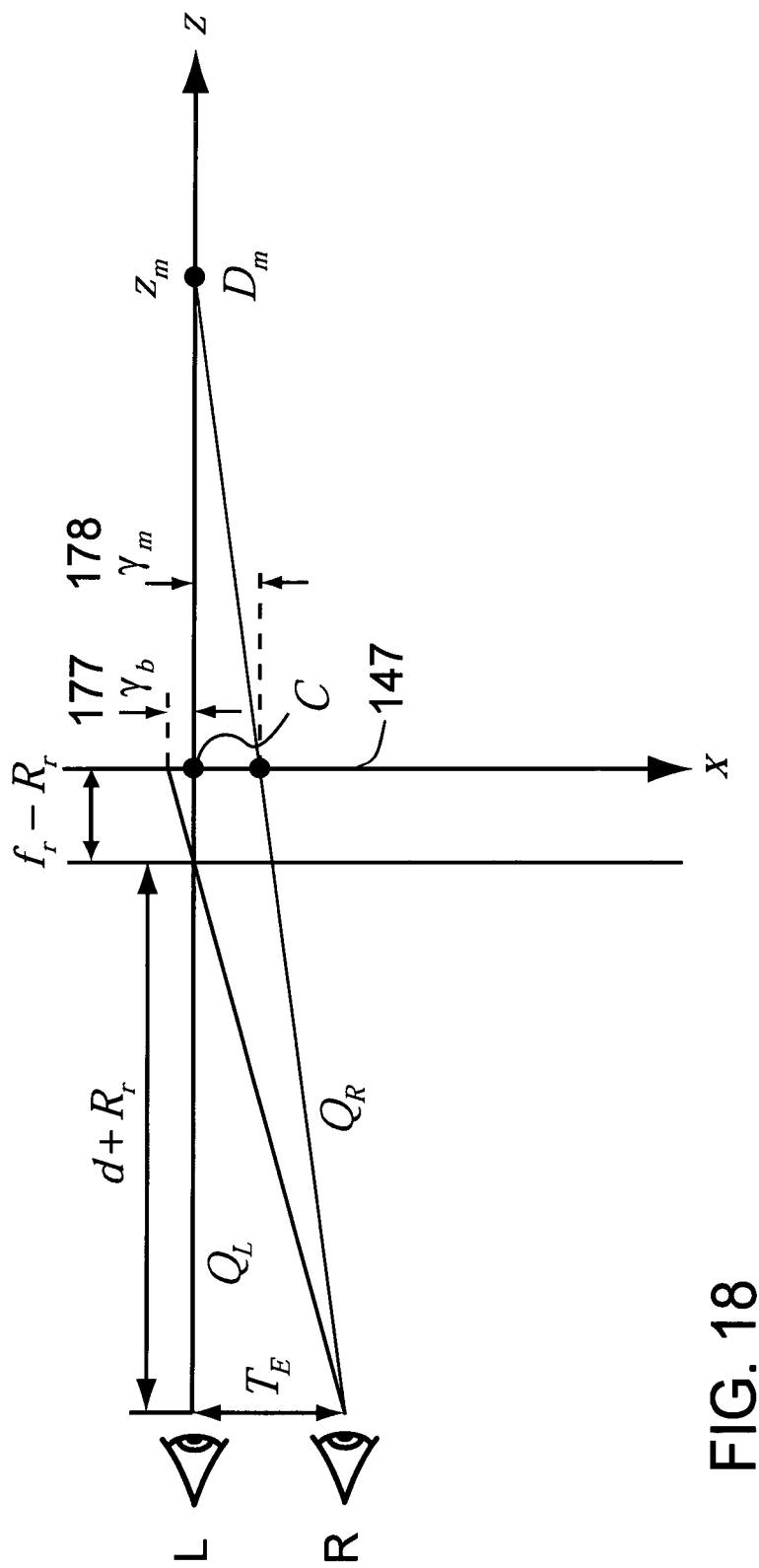

With the help of FIGS. 17 and 18, we can now calculate the apparent depth of the moiré. The moiré shape offset $\gamma_m$ 178 indicates the position where the right eye, thanks to ray $Q_R$, sees exactly the same position within the moiré shape as the left eye with ray $Q_L$, at position x=0. The intersection of rays $Q_R$ and $Q_L$ yields the apparent depth position D. located at depth $z=z_m$.

By considering the triangle formed of the left eye, right eye and depth position $D_m$, and the similar triangle formed by the origin of the x-z coordinate plane (center of curvature C of the revealing layer lenslet), the intersection of ray $Q_R$ with the x-axis and depth position $D_m$, we obtain $$\frac{z_m}{z_m + d + R_r + f_r - R_r} = \frac{z_m}{z_m + d + f_r} = \frac{g_m}{T_E} \quad (21)$$

Solving for the apparent moiré depth $z_m$ yields $$z_m = \frac{g_m(d + f_r)}{T_E - g_m} = \frac{d + f_r}{\frac{T_E}{g_m} - 1} \quad (22)$$

By inserting Eq. (20) into Eq. (22), we obtain for the apparent moiré depth $$z_m = \frac{g_m(d + f_r)}{T_E - g_m} = \quad (23)$$

$$\frac{\frac{T_E \times T_b}{(T'_r - T_b)} \times \frac{(f_r - R_r)}{(d + R_r)}(d + f_r)}{T_E - \frac{T_E \times T_b}{(T'_r - T_b)} \times \frac{(f_r - R_r)}{(d + R_r)}} = \frac{T_b(f_r - R_r)(d + f_r)}{(T'_r - T_b)(d + R_r) - T_b(f_r - R_r)}$$

Since in the general case, the viewing distance d is large in respect to the focal length, the simplified formula becomes $$z_m = \frac{T_b(f_r - R_r)(d + f_r)}{(T'_r - T_b)(d + R_r) - T_b(f_r - R_r)} @ \quad (24)$$

$$\frac{T_b(f_r - R_r)}{(T'_r - T_b) - \frac{T_b(f_r - R_r)}{(d + f_r)}} @ \frac{T_b(f_r - R_r)}{(T'_r - T_b)}$$

When the apparent revealing layer period is smaller than the base layer period, i.e. $T'_r < T_b$, according to Eq. (23) or Eq. (24), the apparent depth is negative and the resulting moiré shapes float in front of the setup made of the two lenslet layers at a distance being expressed as a negative apparent depth value.

Figure 19A:
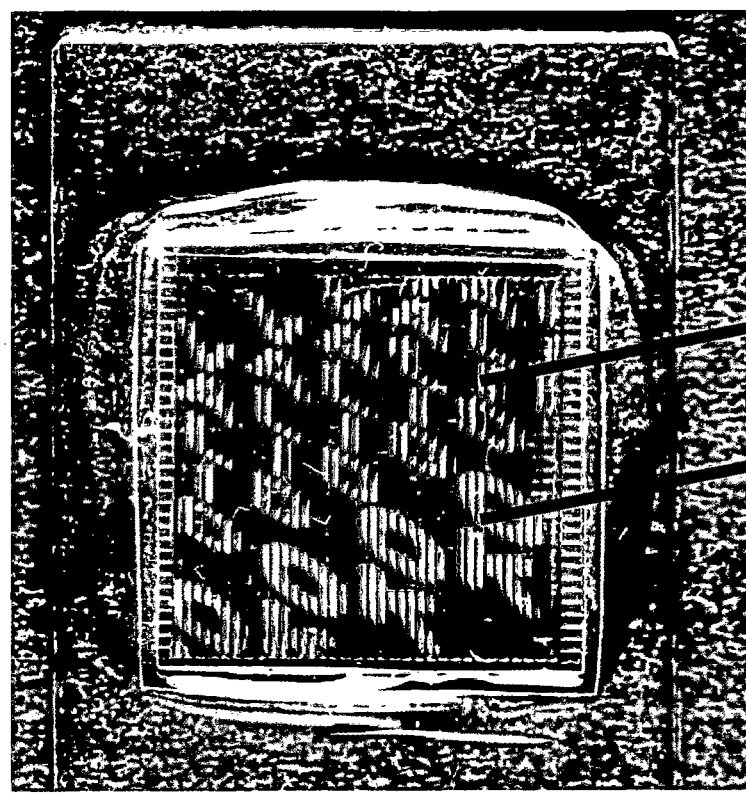
FIGS. 19A and 19B show the same setup of base and revealing layer lenslet gratings at two different horizontal tilt angles, yielding different relative positions of the "VALID" and the "OK" moiré shapes.
Figure 19B:
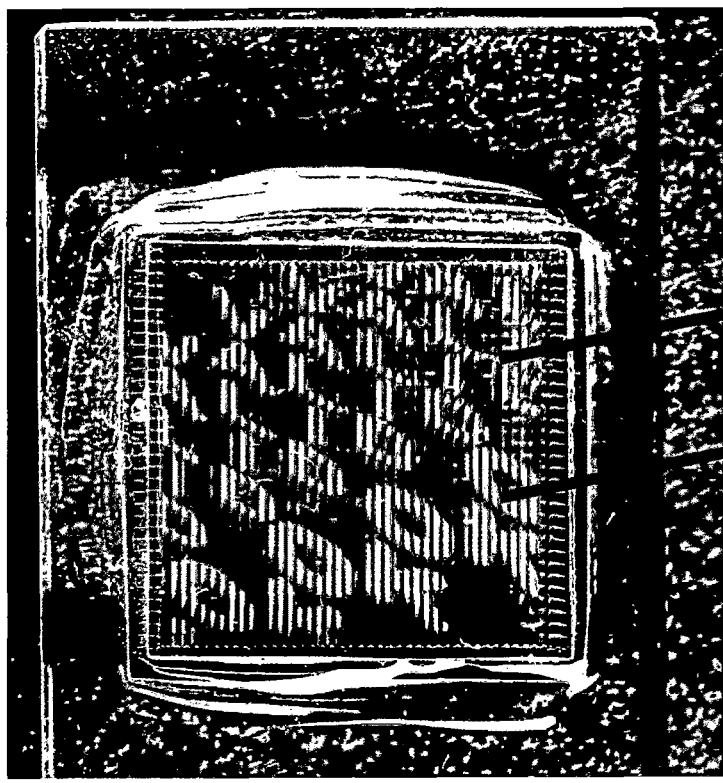

As an example, we consider a security design with two different moirés, a first one with the "VALID" letters (FIG. 19A, 191 and FIG. 19B, 193) and a second one with the "OK" letters (FIG. 19A, 192 and FIG. 19B, 194). The "OK" moiré moves in a direction opposite to the direction of the "VALID" moiré. The setup with the base and revealing layer lenslet gratings is fixed on a glass plate. When tilting the setup horizontally by a small angle, both the "OK" moiré shape and the "VALID" moiré shape move in opposite directions, as shown by FIGS. 19A and 19B.

The moiré shapes shown in FIGS. 19A and 19B are also examples for stereo moiré vision. Let us first consider the first set of moiré shapes with the "VALID" letters 191 or 193. Its parameters are the following: a revealing layer period $T_r=0.4$ mm, a base layer period $T_b=0.353$ mm, a focal length $f_r$ of 1.2 mm, a viewing distance d=500 mm and according to Eq. (12) a radius of curvature $R_r=0.4$ mm With Eq. (23) we obtain a calculated depth $z_m$ of 6.01 mm, i.e. the moiré shapes viewed by superposed revealing and base lenslet layers have an apparent depth of 6 mm They seem to float behind the setup made of the two lenslet layers.

The second set of moiré shapes with the "OK" letters 192 or 194 has the same parameters as the "VALID" moiré, but with a base layer period $T_b=0.446$ mm, which is larger than the revealing layer period $T_r=0.4$ mm With Eq. (23) we obtain a calculated depth $z_m$ of −7.79 mm, i.e. the moiré shapes viewed by superposed revealing and base lenslet layers have an apparent depth of −7.8 mm They seem to float in front of the setup made of the two lenslet layers.

Interestingly, in the general case, according to Eq. (23), when the viewing distance d is much larger than both the focal length $f_r$ and the base layer period $T_b$, i.e., $d \gg f_r$ and $d \gg T_b$, the apparent depth is largely independent of the viewing distance d. When the viewing distance is changed for example in the range between 50 cm and 30 cm, the apparent depth remains substantially constant. In addition, when the base layer period $T_b$ comes closer to the apparent revealing layer period $T'_r$, the moiré sizes H and H' increase and the apparent depth $z_m$ also increases.

Creating 2D Moirés with the Multi-Lenslet Imaging Setup

The theory regarding the analysis and synthesis of 2D moiré images is known, see the following publications:

- M. C. Hutley, R. Hunt, R. F. Stevens and P. Savander, "The moiré magnifier", Pure and applied Optics, Vol. 3, 133-142 (1994).
- H. Kamal, R. Völkel, J. Alda, Properties of the moiré magnifiers, Optical Engineering, Vol. 37, No. 11, pp. 3007-3014 (1998).
- I. Amidror, The theory of the moiré phenomenon, Vol. 1, Section 4.4, pp. 96-108 (2009)
- I. Amidror, R. D. Hersch, Fourier-based analysis and synthesis of moirés in the superposition of geometrically transformed periodic structures, Journal of the Optical Society of America A, Vol. 15, No. 5, May 1998, 1100-1113.

The sampling of a 2D array of micro-shapes (FIG. 20A, 2000) by an array of tiny holes 2001 or by a 2D array of microlenses yields 2D moiré shapes 2007 formed of enlarged and rotated instances of the micro-shape 2003. We use here the formulation obtained by S. Chosson in his PhD thesis "Synthèse d'images moiré" (in English: Synthesis of moiré images), EPFL Thesis 3434, 2006, pp. 111-112, referenced hereinafter as [Chosson 2006]. The denominations are similar as for the 1D moirés described in Section "Creating 1D moiré with the multi-lenslet imaging setup".

The layout of the 2D moiré image in the transformed space is expressed by a geometric transformation $M(x_t,y_t)$ which maps the transformed moiré space locations $(x_t,y_t)$ back to original moiré space locations $(x,y)$. The layout of the 2D revealing array in the transformed space is expressed by a geometric transformation $G(x_t,y_t)$ which maps the transformed revealing array space locations $(x_t,y_t)$ back into the original revealing layer array space locations $(x',y')$. The layout of the 2D array of micro-shapes in the transformed space is expressed by a geometric transformation $H(x_t,y_t)$ which maps the transformed 2D micro-shape array locations $(x_t,y_t)$ back into the original 2D micro-shape array locations $(x',y')$.

A desired rectilinear or curvilinear 2D moiré image layout is specified by its moiré height $H_y$ and width $H_x$ in the original coordinate space $(x',y')$ and by its geometric transformation $M(x_t,y_t)$. A desired revealing layer layout of the 2D sampling array is specified by the period $T_{rx}$ along the x-coordinate and $T_{ry}$ along the y-coordinate of its elements in the original space $(x',y')$ and by its geometric transformation $G(x_t,y_t)$. The base layer layout of the 2D array of micro-shapes is specified by the period $T_{bx}$ along the x-coordinate and $T_{by}$ along the y-coordinate of its elements in the original space $(x',y')$ and by its calculated geometric transformation $H(x_t,y_t)$. Having specified the desired 2D moiré image layout, the layout of the 2D sampling revealing layer, and the size of the micro-shapes in the original space, then according to [Chosson 2006], the base layer geometric transformation $H(x_t,y_t)$ is obtained as function of the transformations $M(x_t,y_t)$ and $G(x_t,y_t)$.

Let us define the transformations M, G, and H as $M(x_t,y_t)=(m_x(x_t,y_t), m_y(x_t,y_t))$, $G(x_t,y_t)=(g_x(x_t,y_t), g_y(x_t,y_t))$, and $H(x_t,y_t)=(h_x(x_t,y_t), h_y(x_t,y_t))$. Then, according to [Chosson 2006] transformation $H(x_t,y_t)$ is obtained by computing $$\frac{h_x(x_t, y_t)}{T_{bx}} = \frac{m_x(x_t, y_t)}{H_x} + \frac{g_x(x_t, y_t)}{T_{rx}} \quad (25)$$

-continued $$\frac{h_y(x_t, y_t)}{T_{by}} = \frac{m_y(x_t, y_t)}{H_y} + \frac{g_y(x_t, y_t)}{T_{ry}}$$

Figure 21:
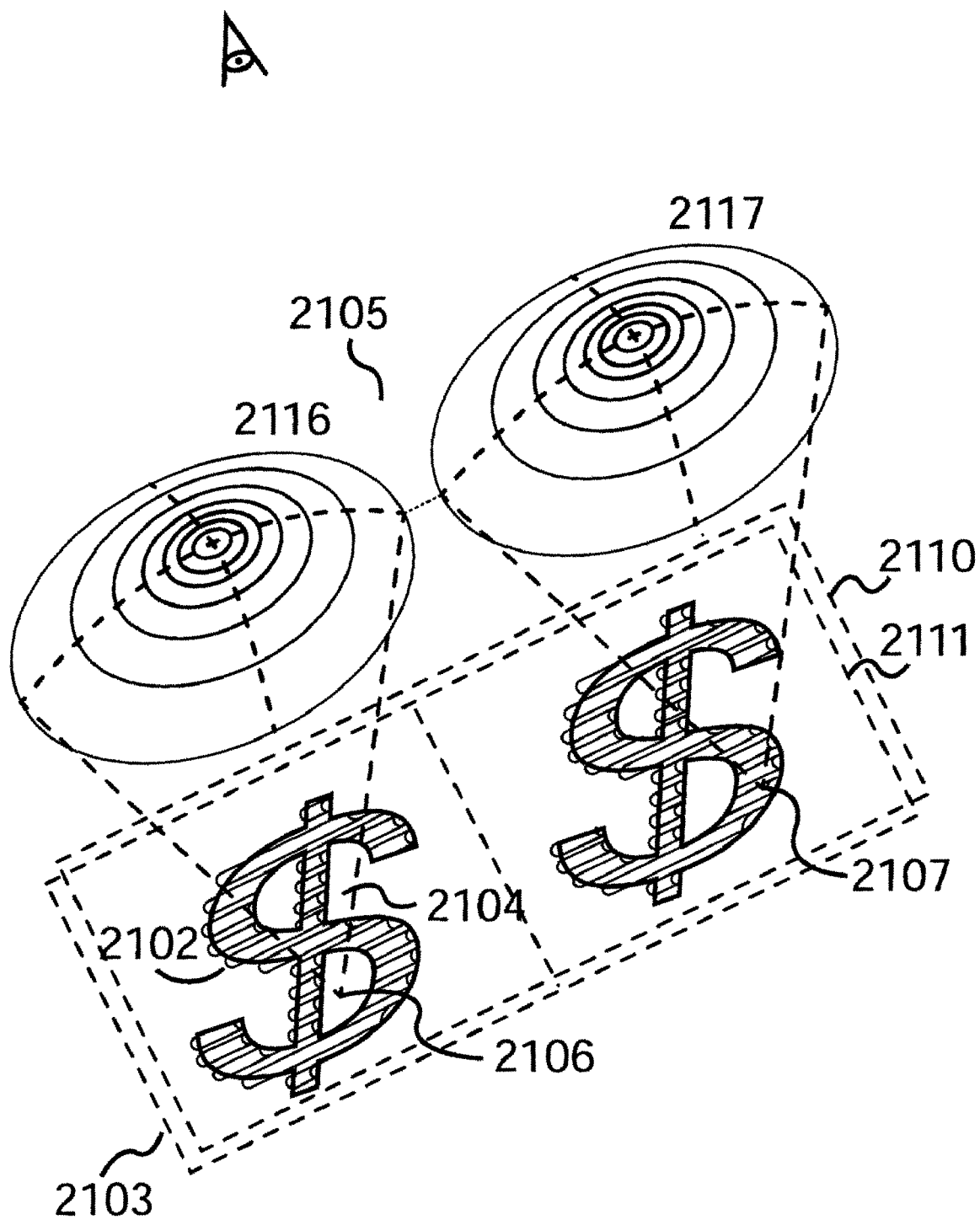
FIG. 21 shows schematically a detailed view of the revealing layer lenses sampling the base layer micro-shapes that are embodied with gratings of cylindrical lenslets concentrating the light from behind.

In the present invention, the revealing layer is embodied by a 2D array of lenslets, shown schematically by two lenslets in FIG. 21, 2105 and the base layer by a 2D array of virtual micro-shapes shown schematically by two "$" signs 2103, created by having a 1D array of cylindrical lenslets 2102 covering the foreground of each micro-shape. Note that each microlens samples a different position within the virtual micro-shapes of the base layer. For example, from a given observation position, microlens 2116 samples position 2106 within the background of the micro-shape whereas microlens 2117 samples position 2107 within the foreground of the micro-shape. The background of the virtual micro-shapes 2002 may be embodied by no lenses or by randomly located small microlenses 2022 diffusing the incoming light (see Section "Reinforcing the contrast of the base layer by diffusing microlenses").

Figure 20A:
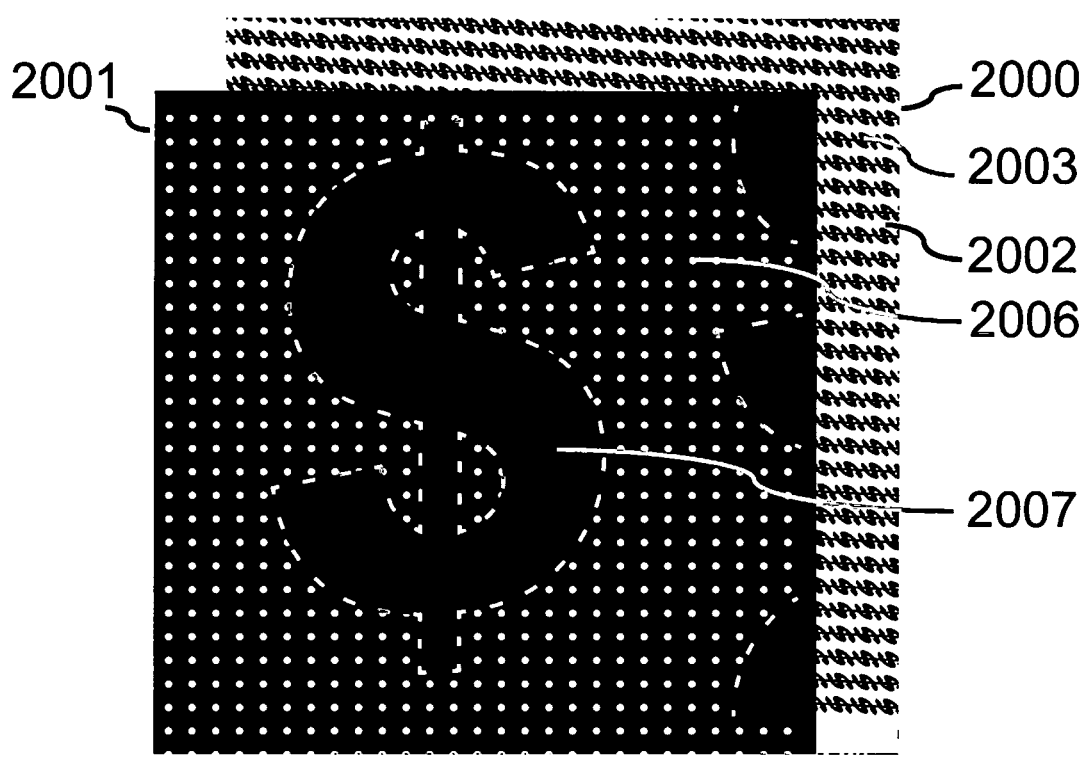
FIG. 20A shows a base layer formed of a 2D array of micro-shapes sampled by a revealing layer made of a 2D array of microholes yielding one instance of a 2D array of "$" moiré shapes.
Figure 20B:
FIG. 20B shows a photograph of an enlarged portion of a realization of the base and revealing layers shown in FIG. 20A, with the foreground of the micro-shapes covered with gratings of small cylindrical lenslets and with their background covered with randomly placed small spherical microlenses.

FIG. 20A shows the base layer 2000 and revealing layer 2001 auxiliary digital images used to create the base layer embodied by arrays of small size 1D cylindrical lenslets (FIG. 20B, 2023) and the revealing layer embodied by 2D lenslets whose size is of the same order of size as the size of the 2D base layer micro-shapes. FIG. 20B shows a photograph of a microscopic view focussed on the base layer ("S" signs with foreground 2023 and background 2022) with the revealing layer microlenses 2024 appearing thanks to backlight illumination of the microscope. The resulting 2D moiré shape 2007 represents the enlarged, rotated and sheared dollar sign 2003. The revealing layer lenslets of the 2D lenslet grating are centered at the holes 2006 of the revealing layer. In the base layer, the gratings of small size 1D cylindrical lenslets 2023 cover the foreground shapes 2003 of the virtual 2D array of micro-shapes. The background 2002 of the virtual micro-shapes is covered by randomly placed microlenses 2022 having random sizes e.g. between 8 μm to 12 μm, i.e. a diameter considerably smaller than the repetition period of 27 μm of the lenslets forming the base layer lenslet gratings.

Figure 22:
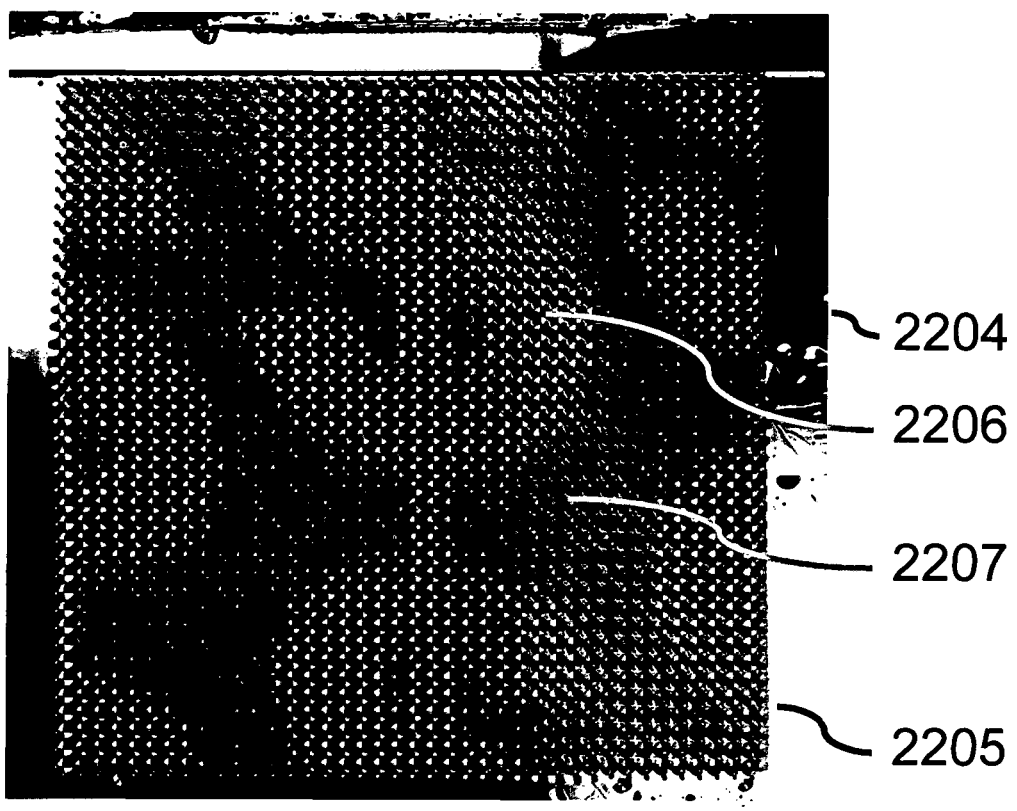
FIG. 22 shows a photograph of a 2D moiré setup formed of base and revealing layer gratings of lenslets.

FIG. 22 shows a photograph of an embodiment of the 2D moiré multi-lenslet setup, consisting of a thin glass plate 2204. On the back side of this thin glass plate the base layer is pasted, which is embodied by 1D gratings of cylindrical lenslets yielding the virtual micro-shapes. On the front side of the glass plate, the 2D revealing layer lenslet grating 2205 is pasted. The resulting moiré foreground shapes 2206 and moiré background shapes 2207 are clearly visible. The dollar sign moves vertically when tilting the setup horizontally, i.e. rotating it slightly around a vertical axis and moves diagonally (at −45 degrees) when tilting the setup vertically, i.e. rotating it slightly around a horizontal axis. The base layer 1D gratings of cylindrical lenslets covering the foreground of the virtual microimages have a lenslet repetition period of 16 μm. The revealing layer 2D lenslet repetition periods are 400 μm horizontally and vertically.

According to [Chosson 2006], for non-curvilinear moiré, i.e. for rectilinear moiré, the equation bringing moiré layer coordinates into base layer coordinates by an affine transformation is the following:

$$\begin{bmatrix} x'' \\ y'' \end{bmatrix} = \frac{1}{(T_{rx} + v_{2x}) \cdot (T_{ry} + v_{1y}) - v_{1x} \cdot v_{2y}} \quad (26)$$

Figure 23:
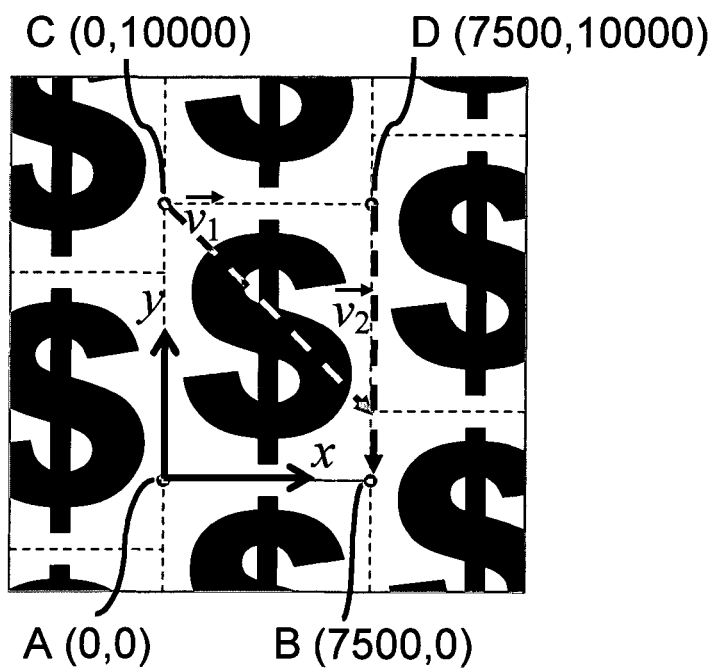
FIG. 23 shows the layout of a desired moiré shape array and FIG. 24 shows the corresponding layout of the base layer micro-shape array.
Figure 24:
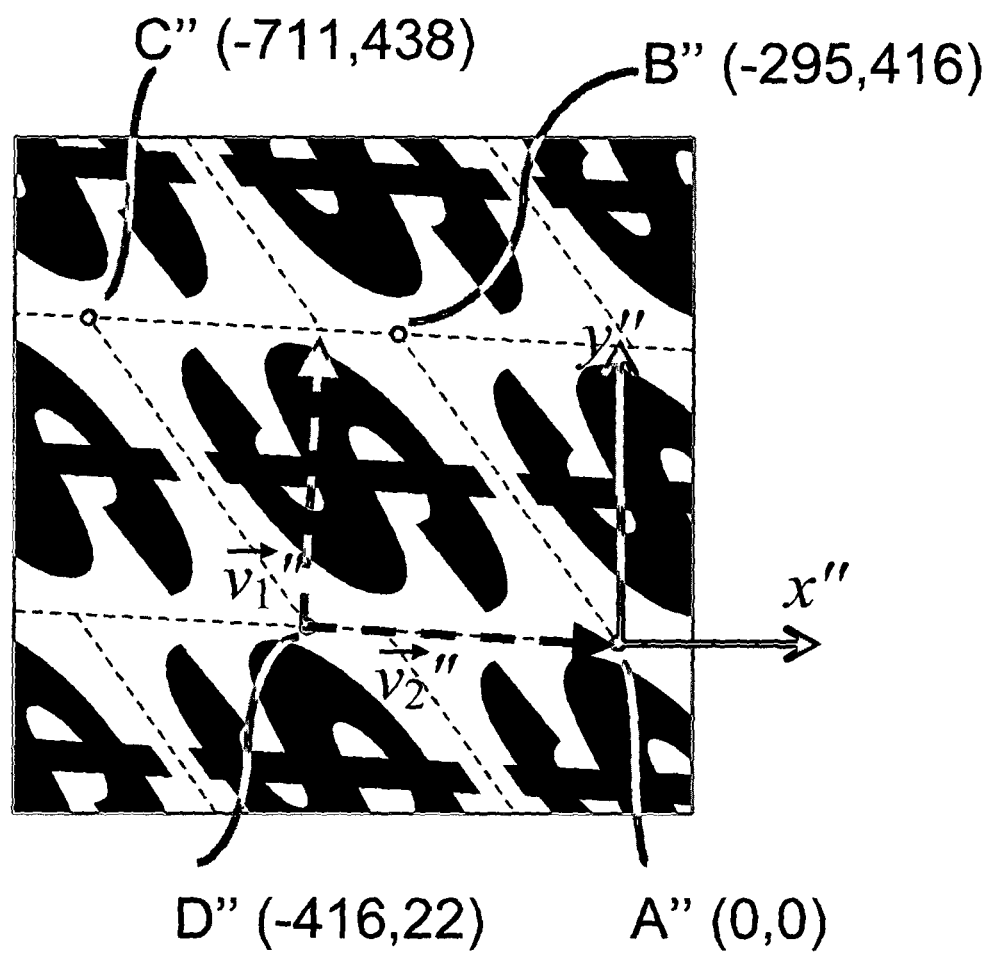

-continued $$\begin{bmatrix} T_{rx} \cdot (T_{ry} + v_{1y}) & -v_{1x} \cdot T_{rx} \\ -v_{2y} \cdot T_{ry} & T_{ry} \cdot (T_{rx} + v_{2x}) \end{bmatrix} \begin{bmatrix} x \\ y \end{bmatrix}$$

where $\vec{v} = (v_{1x}, v_{1y})$ is defined as a first moiré displacement vector and $\vec{v}_2 = (v_{2x}, v_{2y})$ is defined as a second displacement vector and where $T_{rx}$ and $T_{ry}$ are the revealing layer horizontal and vertical periods. As an example, FIG. 23 gives the coordinates of the desired moiré layout. The desired moiré displacement vectors are $\vec{v}_1 = (7500, -7500)$ and $\vec{v}_2 = (0, -10000)$. Inserting the coordinates of the moiré vertices A, B, C, D shown in FIG. 23 as (x,y) into Equation (26) yields the coordinates of the corresponding base layer vertices A", B", C", D" shown in FIG. 24. Therefore, for the two desired moiré displacement vectors, and for given revealing layer periods, one may calculate the base layer position x", y" corresponding to positions x, y in the moiré image. By inserting the moiré displacement vectors $\vec{v}_1$ and $\vec{v}_2$ into Eq. (26), one obtains the corresponding base tile replication vectors $\vec{v}_1$ and $\vec{v}_2$", see FIG. 24.

By inversion of formula (26), one obtains the affine transformation mapping base layer coordinates x", y" into moiré layer coordinates x, y:

$$\begin{bmatrix} x \\ y \end{bmatrix} = \begin{bmatrix} \frac{T_{rx} + v_{2x}}{T_{rx}} & \frac{v_{1x}}{T_{ry}} \\ \frac{v_{2y}}{T_{rx}} & \frac{T_{ry} + v_{1y}}{T_{ry}} \end{bmatrix} \begin{bmatrix} x'' \\ y'' \end{bmatrix} \qquad (27)$$

By scanning the base layer (x", y") at successive x" and y" coordinates, scanline by scanline, the computer program finds according to Eq. (27) the corresponding locations x, y within the moiré image, reads at each location the intensity or color and copies it back into the current base layer location (x", y"). This enables creating the corresponding base layer 2D array of virtual micro-shapes. The foreground of these virtual micro-shapes is then used as a mask for fabricating the 1D array of cylindrical lenses.

Curvilinear moiré layouts described by a geometrical transformation M(x,y) may be produced by further applying the transformation H(x,y) described in Eq. (25) to the base layer array of virtual micro-shapes.

Level-Line Moirés Embodied by the Multi-Lenslet Imaging Setup

U.S. Pat. No. 7,305,105 "Authentication of secure items by shape level lines" to Chosson and Hersch (also inventor in present invention), filed Jun. 10, 2005, incorporated herein by reference, teaches how to create a moiré representing a freely chosen shape as successions of moiré level lines travelling from shape foreground and shape background skeletons to the shape boundaries and vice-versa. The dynamically evolving level lines produced by a revealing layer grating sampling successive locations of a base layer grating create the impression of a beating shape.

Similar information as in U.S. Pat. No. 7,305,105 is presented in the publication by S. Chosson and R. D. Hersch, Beating Shapes Relying on Moiré Level Lines, ACM Transactions on Graphics, Vol. 34, No. 1, Article 9, 10 pages+two page Appendix, published in December 2014. Level line moirés rely on the principle stating that the level lines of an elevation profile appear as moiré lines in the superposition of a base layer embodied by a line grating whose lines are shifted by an amount substantially proportional to the elevation and of a revealing layer embodied by the unshifted line grating. We convert the bilevel shape that represents the outline of the desired moiré shape into an elevation profile. This elevation profile is conceived with the goal of producing strong intensity or color variations at the shape boundaries and of incorporating level lines that yield shapes similar to the original bilevel shape.

The elevation profile level lines are revealed as moiré when superposing the revealing line sampling grating on top of the synthesized base layer line grating incorporating the spatially dependent line shifts. Upon relative displacement of the locations sampled by the revealing layer on the base layer, the moving succession of moiré level lines creates the impression of beating shapes.

As mentioned in Section "Multi-lenslet imaging setup with similar revealing layer and base layer periods", the revealing layer is embodied by an array of cylindrical lenslets and the base layer is also embodied by an array of cylindrical lenslets of a similar period, but shifted in respect to the revealing layer lenslets according to the elevation profile.

When an observer moves in respect to an illuminated multi-lenslet imaging setup formed of the base and revealing layer lenslet gratings, level lines of the colors of the light sources move inwards and outwards from the shape centers towards their boundaries and from the shape boundaries towards the shape background centers.

A same geometric transformation applied to both the base and the revealing layers yields the same moiré shape that would be obtained without geometric transformation. This enables creating cylindrical lenslet arrays whose axes follow a spatial path given by a function, e.g. a cosinusoidal function defined by its period and amplitude.

By using a band-like dither array shifted according to the elevation profile instead of simple shifted lines and by dithering an original variable intensity image, we create locally shifted base layer halftone lines of variable thickness embedding the elevation profile and at the same time forming a halftoned instance of the original variable intensity image. To create halftone lines of variable thicknesses by cylindrical lenslets, one may cover the foreground area of the variable width halftone lines forming the base layer by oblique base layer cylindrical lenslet gratings whose lenslets have a small repetition period, in a similar manner as was carried out for 1D moiré shapes in Section "Creating 1D moiré with the multi-lenslet imaging setup", see Example A, FIGS. 6A, 6B, and 6C with base layer cylindrical lenslet grating 620.

Figure 25A:
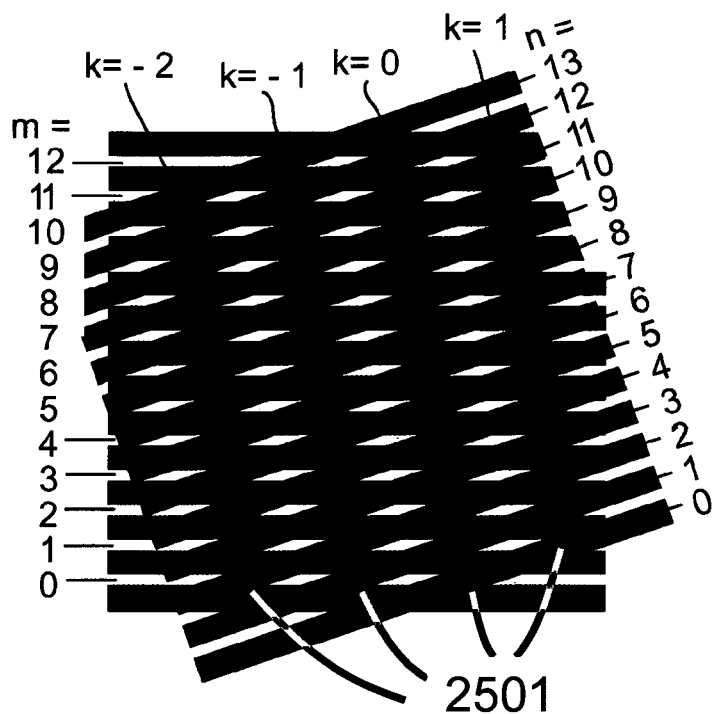
FIG. 25A shows base and revealing layer rectilinear thick line gratings and FIG. 25B shows the same gratings but geometrically transformed.
Figure 25B:
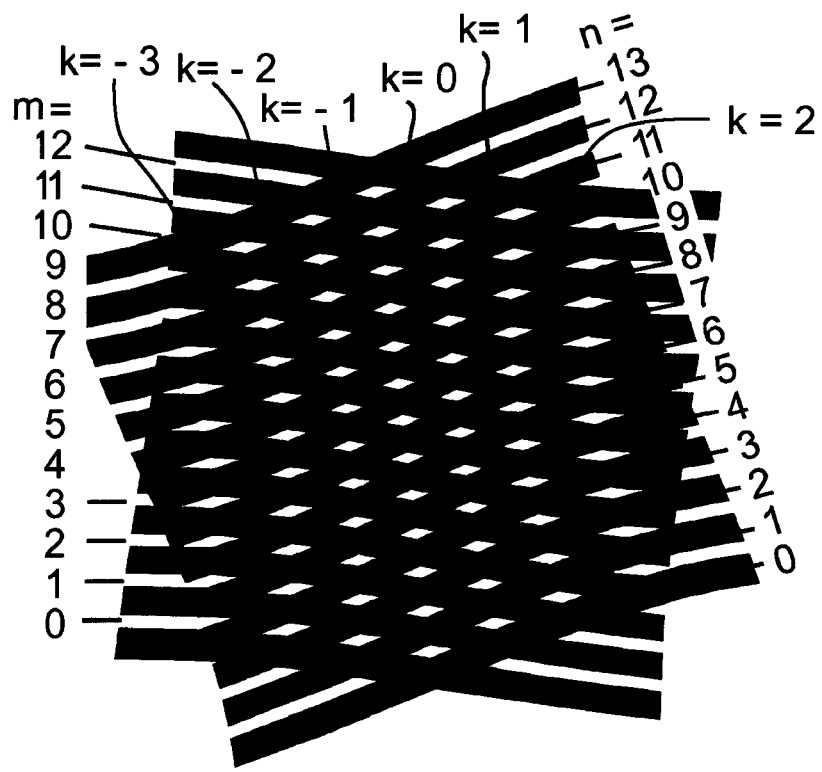

With the known concept of indicial equations, we can deduce in a very simple manner the curvilinear moiré fringes resulting from the superposition of a curvilinear base layer line grating e.g. embodied by a first base grating of cylindrical lenses and a possibly curvilinear revealing layer line grating, e.g. embodied by a second revealing grating of cylindrical lenses. The moiré fringes formed by the superposition of indexed line families form a new family of indexed lines whose equation is deduced from the equation of the base and revealing layer line families, see the book by I. Amidror, The Theory of the Moiré Phenomenon, Vol. 1: Periodic Layers, $2^{nd}$ edition, section 11.2, Springer, pp. 353-360 (2009). FIGS. 25A and 25B show the oblique black base layer lines with indices n=0, 1, 2, 3, . . . , the transparent horizontal revealing layer lines with indices m=0, 1, 2, 3, 4, ... and the moiré fringe lines with indices k=−3, −2, −1, 0, 1.

The moiré fringe lines comprise dark moiré lines connecting the intersections of dark oblique and transparent horizontal revealing layer lines. As shown in FIGS. 25A and 25B, each dark moiré line is characterized by an index k which can be expressed by the subtraction of the revealing layer line index minus the base layer line index $$k = m - n \tag{28}$$

The centerlines of the thick lines of the base layer form a line grating parametrized by the integer values of the base layer line index n. This line grating is expressed by $$\psi(x,y) = n \cdot T_b \tag{29}$$

where $\psi(x,y)=0$ expresses the implicit equation of either a straight or of a curvilinear line and where $T_b$ defines the line period. For example, in the case of a straight line grating of orientation θ as in FIG. 25A we have $$y \cos\theta - x \sin\theta = n \cdot T_b \tag{30}$$

where $T_b$ is the perpendicular distance between successive lines.

In the general case, the revealing line grating is expressed by $$\Phi(x,y) = m \cdot T_r \tag{31}$$

where $\Phi(x,y)$ expresses the implicit equation of the revealing layer lines in the target space and where $T_r$ is the period of the corresponding rectilinear horizontal revealing line grating in the original space. For example, a horizontal revealing line grating is expressed by $$y = m \cdot T_r \tag{32}$$

Thanks to equation (28), and by expressing indices n and m according to Eqs. (29) and (31) as functions of x and y, the implicit equation of the moiré fringe lines becomes $$\frac{\Phi(x, y)}{T_r} - \frac{\Psi(x, y)}{T_b} = k \tag{33}$$

For example, in the case of the superposition of the oblique rectilinear base layer grating having angle θ and of a horizontal revealing line grating as shown in FIG. 25A, the moiré fringe line Eq. (33) becomes $$\frac{y}{T_r} - \frac{y\cos\theta - x\sin\theta}{T_b} = k \tag{34}$$

and, by rearranging $$y \cdot (T_b - T_r \cos\theta) + x \cdot T_r \sin\theta = k \cdot T_r \cdot T_b \tag{35}$$

Equation (35) fully describes the family of moiré fringe lines (FIG. 25A, 2501). Integer values of k correspond to the centerlines of the "thick lines" forming the moiré fringe lines and real values of k correspond to lines located within bands whose boundaries are formed of the moiré center lines.

Let us describe in more details the level line moiré. Level line moirés enable visualizing the level lines of an elevation function G(x,y) by superposing a base layer grating whose horizontal lines are vertically shifted according to the elevation function G(x,y) and a horizontal revealing layer grating having the same line period as the base layer grating. We consider the case where both the revealing layer grating and the base layer grating have the same period, i.e. $T = T_r = T_b$.

The base layer grating is described by the line family $$y - G(x,y) = n \cdot T \tag{36}$$

With a horizontal revealing line grating y=m T of the same period T as the base layer grating, we obtain according to Eq. (33) the equation of the moiré fringe lines $$\frac{y}{T} - \frac{y - G(x, y)}{T} = k \implies G(x, y)/T = k \tag{37}$$

Therefore, the revealed moiré fringe lines form the level lines of elevation function G(x,y).

Let us consider non-linear geometrical transformations applied to both the base and revealing layer line gratings. For example, FIG. 25B shows the result of applying different non-linear geometrical transformations to the gratings of FIG. 25A. The moiré lines can still be indexed by k=m−n and Eq. (33) describing the resulting moiré layout remains valid. Here also we consider the case where both the revealing layer grating and the base layer grating have the same period, i.e. $T = T_r = T_b$.

We consider a geometric transformation y'=Q(x,y) mapping the target space (x,y) containing the curvilinear base and revealing line gratings back into the original space (x',y') containing the rectilinear horizontal base and revealing line gratings. Since the original untransformed rectilinear base and revealing line gratings are horizontal, the geometric transformation is completely defined by y'=Q(x,y).

We obtain the revealing layer's curvilinear line grating in the target space by traversing all discrete pixel locations (x,y) of the target space, finding their corresponding locations (x'=x, y'=Q(x,y)) in the original space, obtaining their intensities, respectively colors and accordingly, setting the intensities, respectively colors, of the corresponding target space pixels. We obtain the base layer's curvilinear line grating in the target space in a similar manner by applying the geometric transformation to obtain original space locations (x'=x, y'=Q(x,y)), then locating the shifted positions y'−G(x,y), obtaining their intensities, respectively colors and setting accordingly the intensities, respectively colors, of the corresponding target space pixels.

By applying the geometric transformations to the revealing and base layers, we obtain their respective layouts $\Phi(x,y)=Q(x,y)$ and $\psi(x,y)=Q(x,y)-G(x,y)$. Inserting these layouts into Eq. (32), yields the moiré line family $$\frac{Q(x, y)}{T} - \frac{Q(x, y) - G(x, y)}{T} = k \implies \frac{G(x, y)}{T} = k \tag{38}$$

Eq. (38) shows that when applying a same geometric transformation to the base and the revealing layers, one obtains as moiré fringes the level lines of elevation function G(x,y). Geometric transformations comprise several freely choosable parameters, which can be used as keys to construct many different pairs of matching base and revealing layer gratings. This is important for document security applications.

Construction of Level Line Moirés

Figure 26A:
FIG. 26A gives an example of bilevel shapes.
Figure 26C:
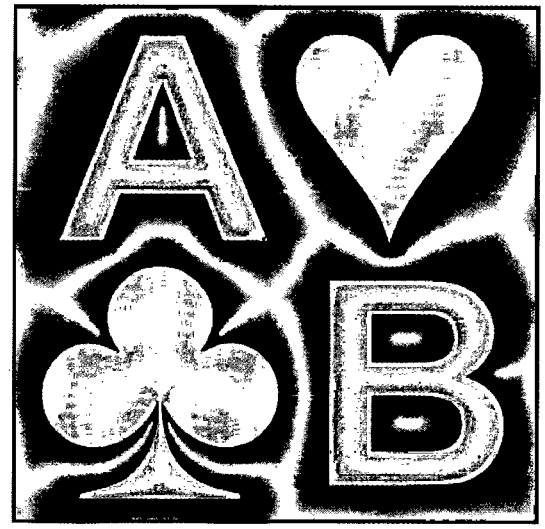
FIG. 26C shows the corresponding computed elevation profile.
Figure 26B:
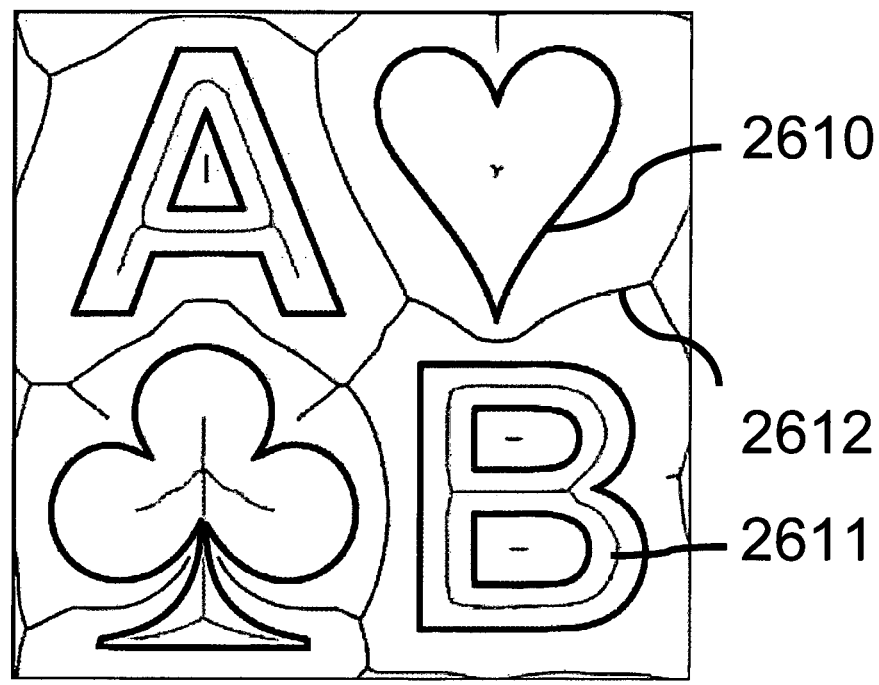
FIG. 26B shows the boundaries, foreground and background skeletons of these bilevel shapes.

In order to produce a level line moiré, we start with a bilevel shape as shown in FIG. 26A. By computing the skeletons of the foreground and background shapes (see G. G. Sanniti Di Baja, E. Thiel, Skeletonization algorithm running on path based distance maps, Image and Vision Computing Vol. 14, 47-57, 1996), we obtain an intermediate skeleton representation, FIG. 26B of the bilevel image. Then, by a distance transform, we establish the relative distance $d_{krel}$ of each pixel (x,y) in the interval between the shape boundary 2610 and its respective skeleton (foreground skeleton 2611 or background skeleton 2612), i.e., $d_{krel}$ expresses the relative distance of pixel (x,y) to its respective skeleton on a scale between 0 and 1. We then map the relative distances $d_{krel}$ onto elevations. Clearly visible moiré shapes with a high gradient or a discontinuity at their shape boundary are obtained by assigning to foreground shapes the elevations between 0.5 and 1 and to background shapes the elevations between 0 and 0.5. In more general terms, foreground and background elevation values are $$h_f(x,y) = h_{fs} - f(d_{krel}(x,y))(h_{fs} - h_{fc}), \text{ and}$$

$$h_b(x,y) = h_{bs} - f(d_{krel}(x,y))(h_{bs} - h_{bc}) \quad (39)$$

respectively, where $h_{fs}$ and $h_{bs}$ are the elevation values of the foreground and background skeletons respectively, and where $h_{fc}$, and $h_{bc}$ are the elevation values at the foreground and background shape boundaries, respectively. Function $f(d_{krel}(x,y)) = d_{krel}(x,y)^\gamma$ provides either directly the relative distance ($\gamma$=1) or a power function of the relative distance between a point and its skeleton. By applying a subsequent optional low-pass filtering step, the elevation discontinuities at the shape boundaries can be smoothed out. This helps in making the local line grating shifts induced by the elevation profile less visible.

Figure 27A:
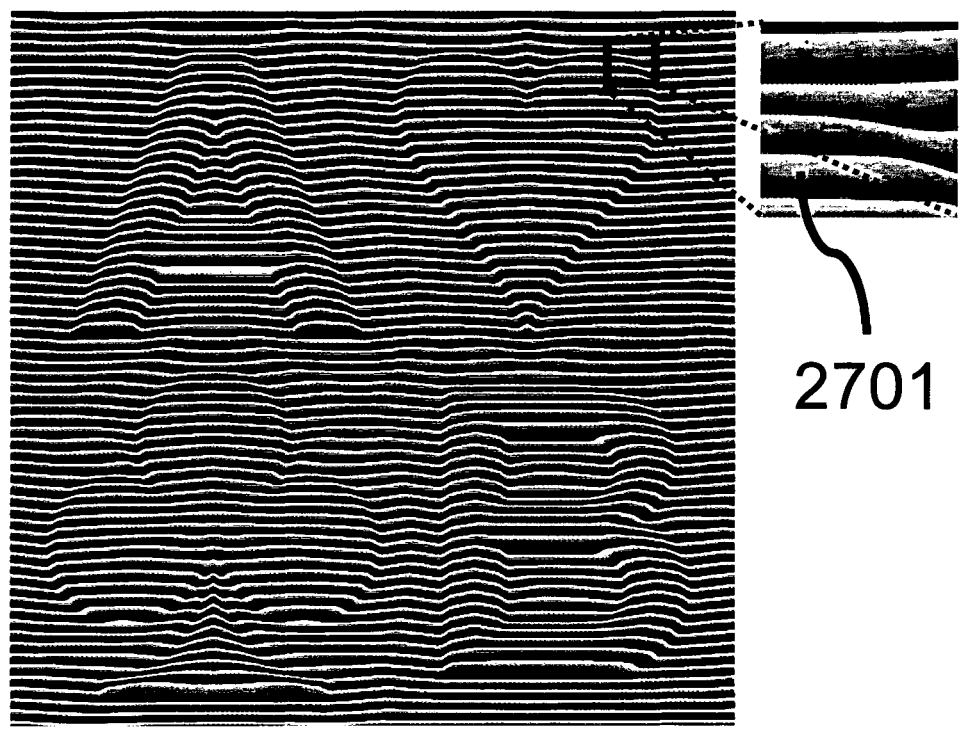
FIG. 27A shows a base layer made of gray bands shifted vertically according to the elevation profile shown in FIG. 26C.
Figure 27B:
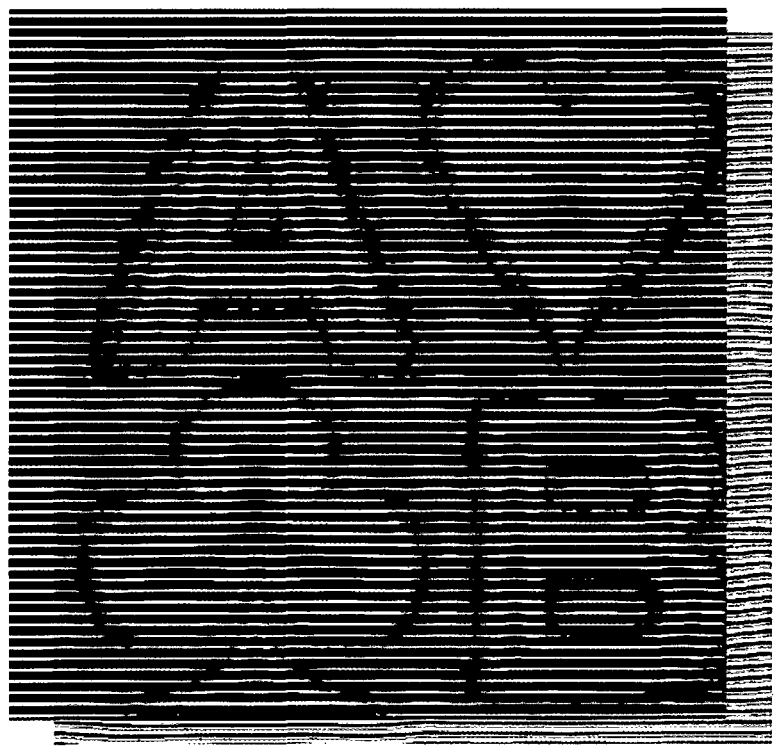
FIG. 27B shows the level line moiré shapes obtained by superposing a sampling revealing layer on top of the vertically shifted gray bands.

In order to illustrate the synthesis of level line moiré, we use a 1D grating of bands as base layer. Each band is formed of an intensity gradient (FIG. 27, 2701) perpendicular to the band orientation. At each location, this grating of bands is vertically shifted in proportion to the elevation at the corresponding location. The resulting shifted base layer is shown in (FIG. 27A). A one period maximal shift corresponds to the maximum of the elevation profile. In order to obtain a faster displacement of the moiré, one may choose to have a maximal shift corresponding to one and a half, two or more periods of the base layer line grating. By superposing the sampling revealing layer grating on top of the shifted base layer line grating, one obtains the moiré shapes formed by the level lines of the elevation profile (FIG. 27B).

Figure 28A:
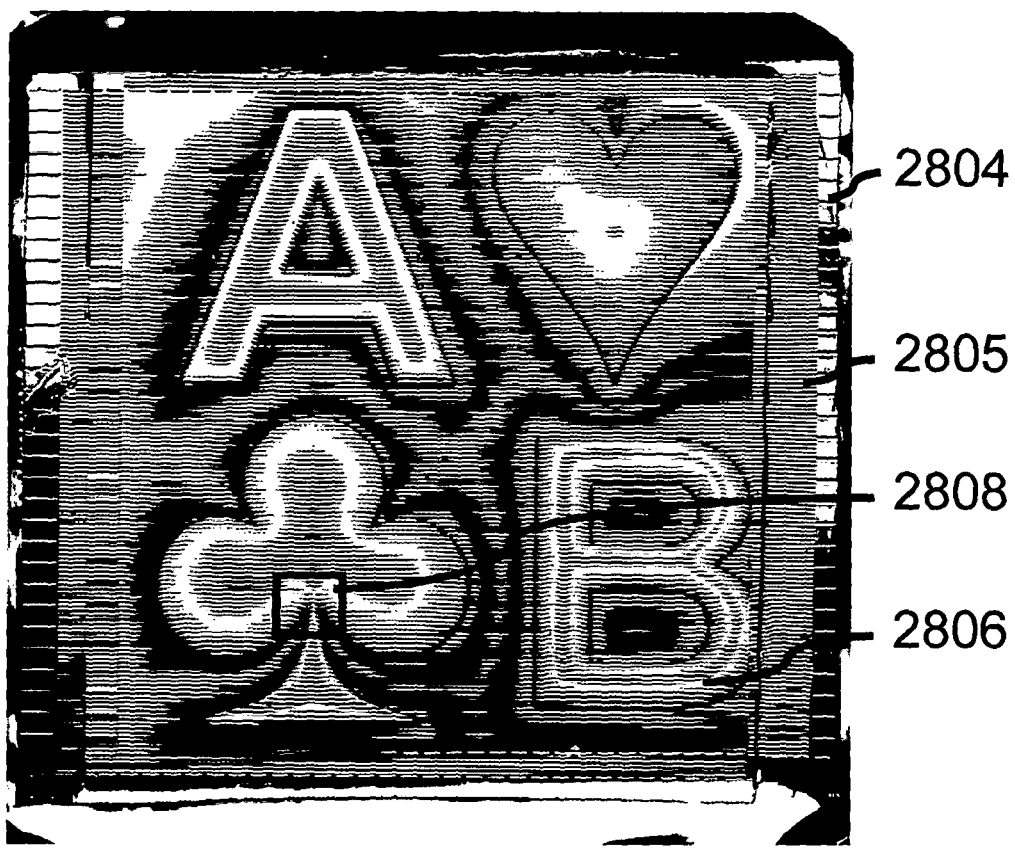
FIG. 28A shows a photograph of the setup obtained by laying out the cylindrical lenslets into the base layer along the same paths as the gray bands and by replacing the rectilinear revealing layer sampling line array with a grating of rectilinear cylindrical lenslets of the same period.

In one embodiment, the base layer is formed of a 1D grating of cylindrical lenslets centered on the shifted bands having substantially the same period as the unshifted 1D grating of cylindrical lenslets forming the revealing layer. FIG. 28A shows a photograph of an embodiment of the level line moiré multi-lenslet setup. This setup consists of a thin glass plate 2804 on whose back side the base layer embodied by the 1D grating of partially shifted cylindrical lenslets is pasted and on whose front side the non shifted 1D grating of cylindrical lenslets 2805 is pasted. The resulting moiré level lines 2806 are clearly visible as constant intensity lines located between the foreground or background shape skeletons and the moiré shape boundaries.

Figure 28B:
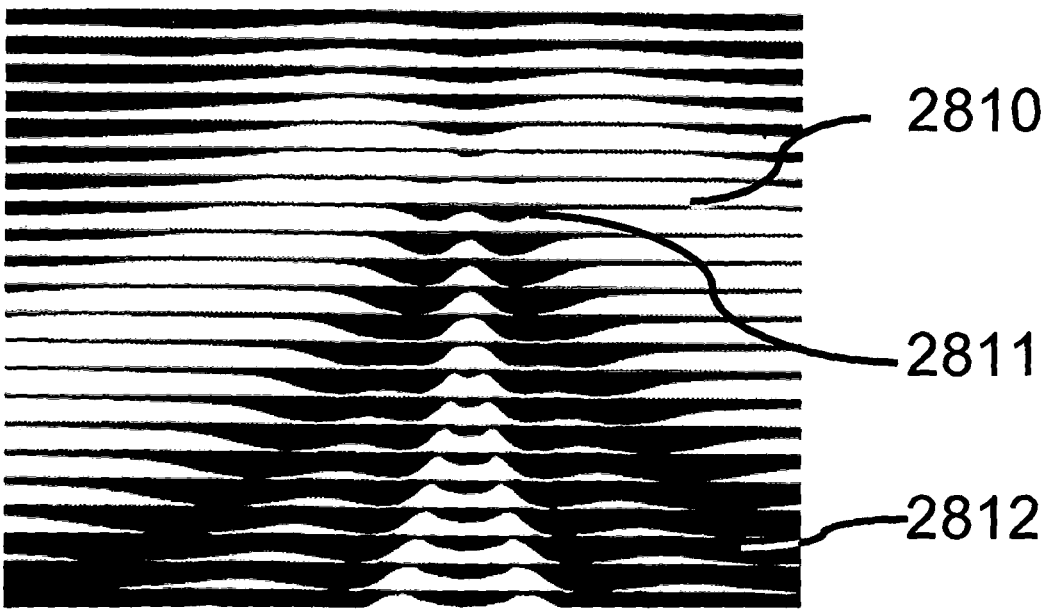
FIG. 28B shows an enlargement of the black square region 2808 of FIG. 28A.

FIG. 28B shows an enlargement of a portion 2808 of the moiré shape image of FIG. 28A, which shows that a high intensity 2810 appears at positions where the base layer grating of cylindrical lenses concentrates the incoming light at the positions sampled by the revealing layer grating of cylindrical lenses, i.e. along the viewing direction.

FIGS. 29A, 29B, 29C and 29D show each the front lenslet 2920, respectively 2950 representative for the revealing layer grating of cylindrical lenslets in front of the eye 2900 and the back lenslet 2921, respectively 2951 representative for the base layer gratings of cylindrical lenslets behind the revealing layer grating.

For a point light source 2905 located perpendicularly behind the multi-lenslet setup 2910 formed of base and revealing layers of lenslet gratings and an observer 2900 viewing the multi-lenslet along its normal (FIG. 29A), the intensity is the highest (FIG. 28B, 2810) when the two gratings 2920 and 2921 are in phase 2901. A lower intensity (FIG. 28B 2811) appears at positions where the base 2950 and revealing 2951 layer gratings cylindrical lenses are shifted one in respect to another. At positions of the setup 2911 where the two gratings are out of phase, i.e. one grating is shifted 2902 by approximately half a period ($\varphi$) in respect to the other grating, the resulting intensity (FIG. 28B 2812) is the lowest.

Figure 29A:
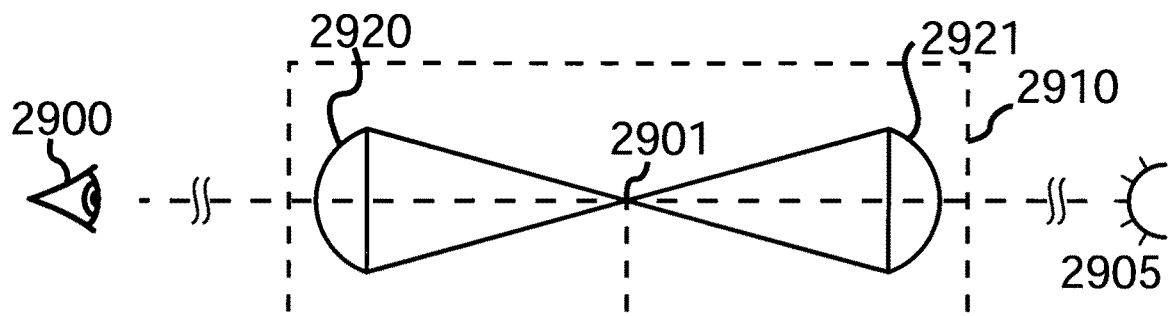
FIGS. 29A, 29B, 29C and 29D show how the relative positions and the tilt angle of the base and revealing lenslet gratings influence the light intensity reaching the observer.
Figure 29B:
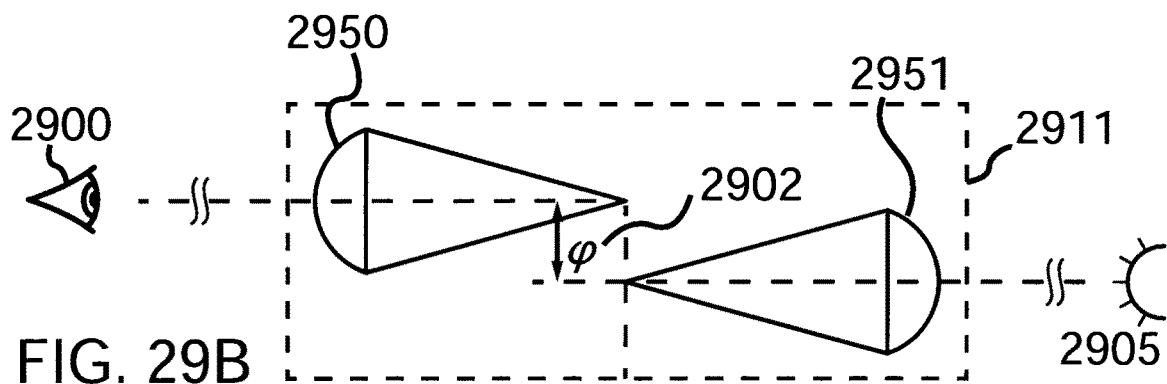
Figure 29C:
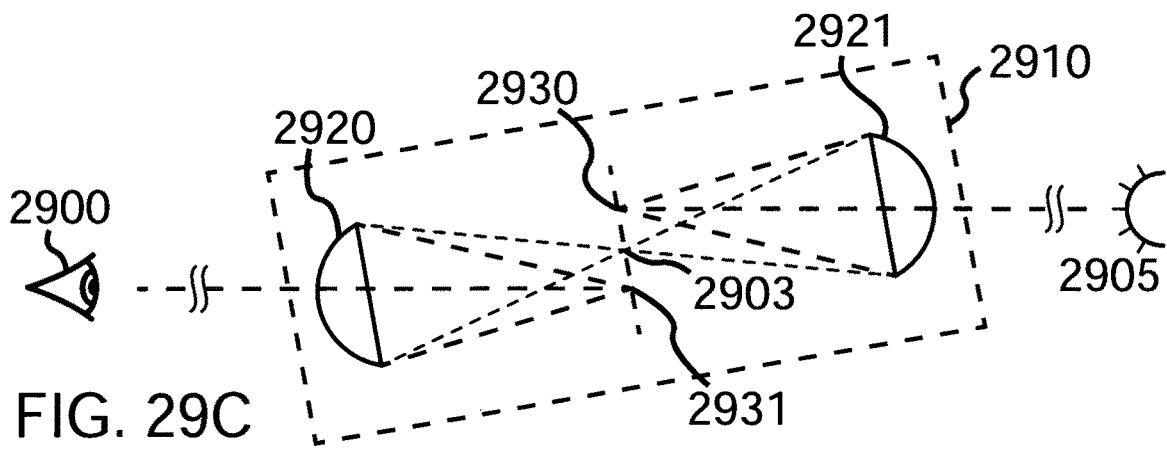
Figure 29D:
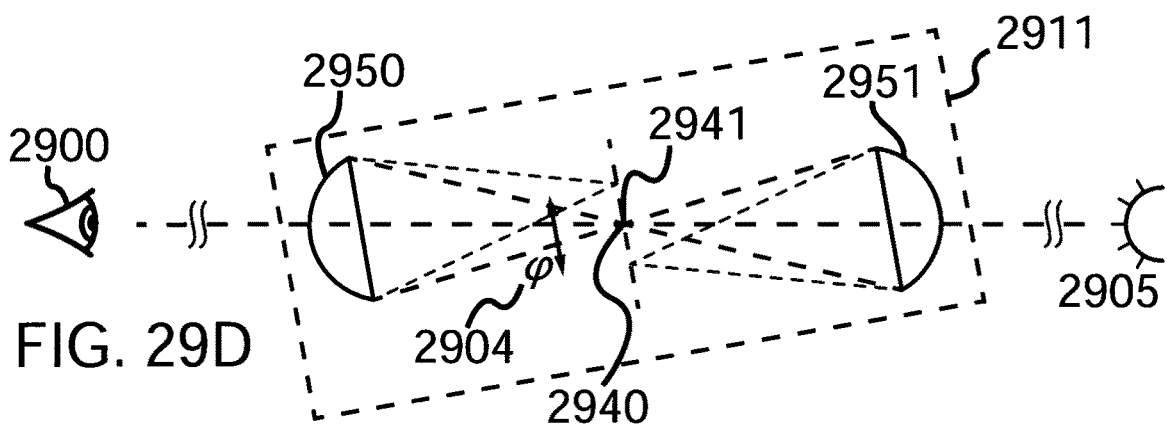

But, as shown in FIG. 29C, when the setup 2910 formed of the superposed gratings of cylindrical lenses is tilted in respect to the viewer and to the light source, when the two gratings are in phase 2903, the base layer lenslet concentrates the incoming light 2905 at a position 2930 different from the sampling positions 2931 of the revealing layer lenslet and the corresponding locations are dark. As shown in FIG. 29D, at positions where the two gratings are shifted 2904 by a certain fraction $\phi$ of the grating period, the light concentrated by the base layer lenslet 2940 is sampled by the revealing layer lenslet 2941 and provides a high intensity to the viewer 2900. These relative shifts between the two gratings of cylindrical lenslets are responsible for the different intensities of the different level lines in the level line moiré shapes shown in FIG. 28A.

Level Line Moiré with a Geometric Transformation of the Gratings

One may also apply a geometric transformation to both the base and revealing layer gratings, before shifting the base layer grating according to the elevation profile. As an example, consider the transformation y'=Q(x,y) mapping the geometrically transformed target plane locations (x,y) back into the non-transformed plane (x',y')

$$y' = Q(x,y) = y + c_1 \cos(2\pi(x + c_3)/c_2) \quad (40)$$

where $c_1$, $c_2$, and $c_3$ are parameters of the cosinusoidal transformation. By inserting the cosinusoidal transformation expressed by Equation (40) into the moiré fringe layout equation (10), we obtain the equation of the moiré line family $$\frac{y + c_1\cos(2\pi(x+c_3)/c_2)}{T} - \frac{y + c_1\cos(2\pi(x+c_3)/c_2) - G(x,y)}{T} = \quad (41)$$

$$k \Rightarrow G(x,y)/T = k$$

i.e., the moiré is formed by the level lines G(x,y)/T=k. This means that we obtain the same level line moiré as the one we would obtain without geometric transformation.

Figure 30A:
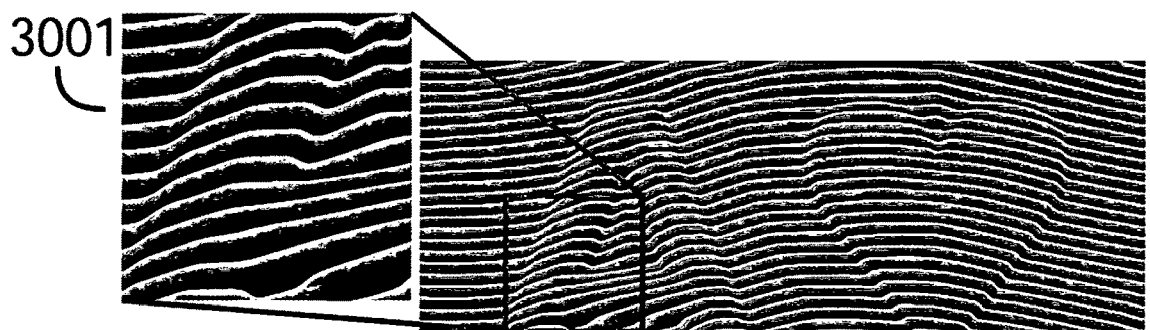
FIGS. 30A, 30B, 30C and 30D show a geometrically transformed base layer layout, a corresponding geometrically transformed revealing layer layout, the superposition of the two layers at a first sampling phase location and the superposition of the two layers at a second sampling phase location, respectively.
Figure 30B:
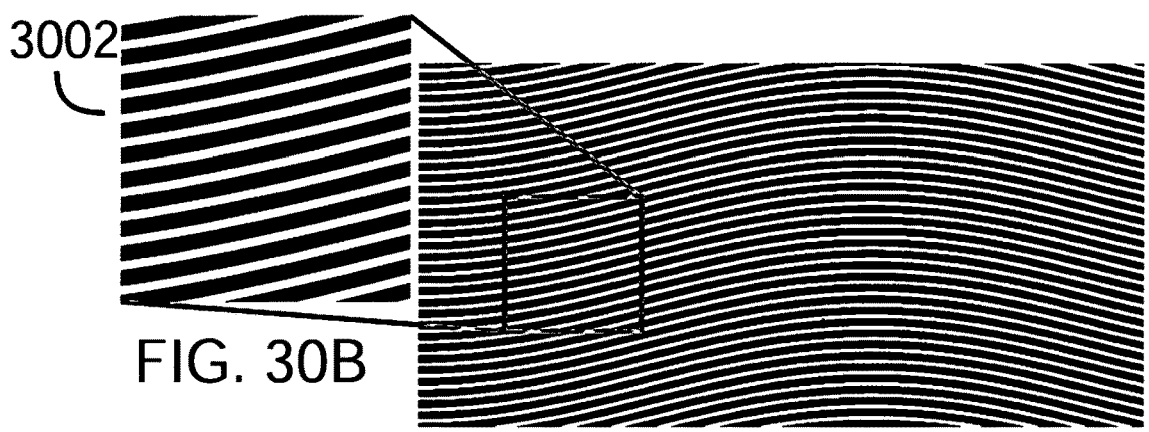
Figure 30C:
Figure 30D:
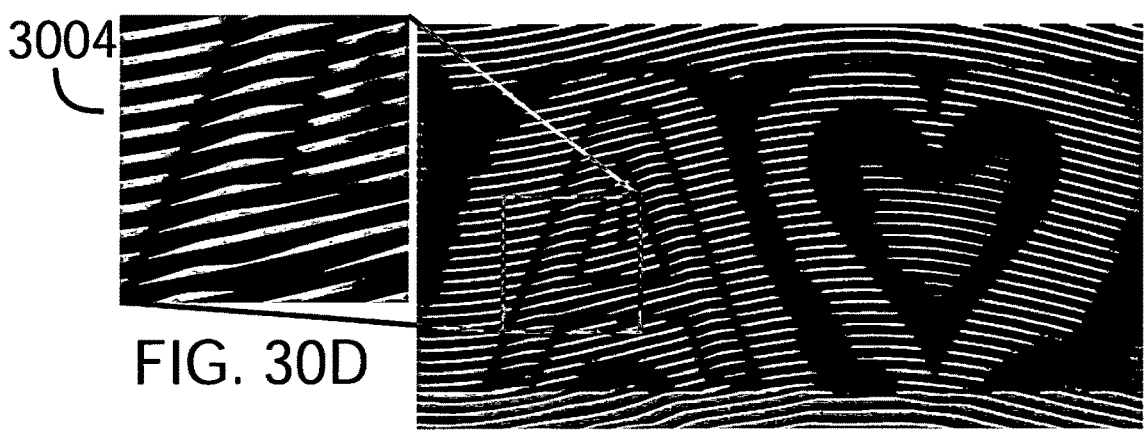

By being able to freely choose the transformation parameters $c_1$, $c_2$, and $c_3$, we can create a variety of different transformations. Only a revealing layer grating matching the set of parameters of the base layer grating will be able to correctly reveal the hidden level line moiré. As an example, FIG. 30A shows a geometrically transformed base layer grating formed of an array of base layer bands each one containing an intensity gradient having a triangular shape. The geometric transformation is a cosinusoidal transformation as defined by Eq. (40). The intensity gradient perpendicular to the band orientation (see enlargement 3001) is representative for the light concentrated by the base layer lenslet gratings on the focal plane of the revealing layer grating. This gradient intensity band is vertically shifted by an amount substantially proportional to the elevation profile of the motives to be revealed as moiré level line shapes, here the letter "A" and the "heart" motives, see the upper half of FIG. 26C. When superposed with a sampling grating of revealing layer cylindrical lenslets laid out along the center of the transparent lines (white lines in FIG. 30B), the corresponding level line moiré shape appears (FIG. 30C). By slightly displacing the sampling positions of the revealing layer lenslet grating on its focal plane, i.e. in respect to the base layer light concentrating lenslet gratings, a different instance of the same level line moiré shape appears (FIG. 30D). These sampling locations are displaced when viewing from a different angle the setup formed of the base and revealing layer lenslet gratings, see Section "Visible effect obtained by the level line moiré".

One may also apply a geometric transformation to both the base and revealing layer gratings, after having shifted the base layer grating according to the elevation profile. In this case, the level line moiré is also geometrically transformed and may become curvilinear. As an example, see U.S. Pat. No. 7,305,105 to Chosson and Hersch, column 14, lines 25 to 65. FIGS. 19 and 20 in U.S. Pat. No. 7,305,105 show the resulting geometrically transformed level line moiré. By replacing the curvilinear revealing layer lines of FIG. 18 in U.S. Pat. No. 7,305,105 by a curvilinear grating of cylindrical lenslets following the white lines and by filling the white shape areas of FIG. 19 in U.S. Pat. No. 7,305,105 with small obliquely oriented lenslet gratings as in FIG. 34A of the present application, one achieves a similar level line moiré as the one shown in FIGS. 19 and 20 of U.S. Pat. No. 7,305,105, but realized with a setup of base layer and revealing layer gratings made of lenslets.

Level Line Moiré Representing Grayscale Images

By using as elevation profile a grayscale image such as a human face, one may then reveal as level line moiré the level lines of the face. With a multi-lenslet setup made of a base layer grating of cylindrical lenslets which are shifted according to the face intensities and a revealing layer grating of unshifted cylindrical lenslets, one may view at a certain orientation of the setup the human face where the cheeks are bright (e.g. FIG. 31A, 3101) and the hair is dark 3102 or by slightly tilting the setup, the cheeks become dark (FIG. 31B, 3111) and the hair is bright 3112.

Figure 31A:
FIGS. 31A and 31B show at two different tilt angles an example of a level line moiré shape produced with superposed base and revealing layers of cylindrical lenslet gratings, the base layer lenslet gratings being shifted according to the intensity of the face that is to appear as level-line moiré.
Figure 31B:

The setup shown in the examples of FIGS. 31A and 31B is a concrete embodiment made with gratings of cylindrical lenslets having an individual lenslet period of 50 µm. Depending on the application, cylindrical lenslet periods of a few microns to centimeters are possible.

Figure 32A:
FIG. 32A shows an original grayscale image.
Figure 33A:
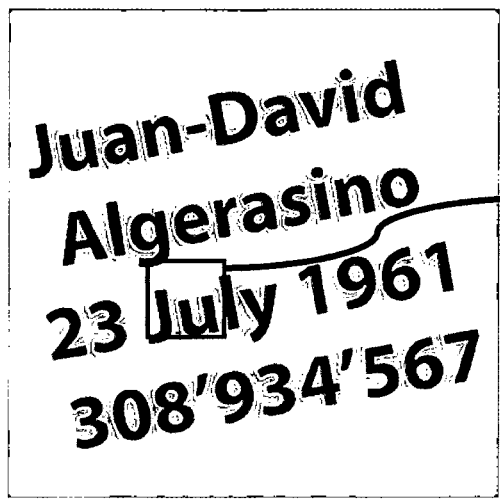
FIG. 33A shows a first elevation profile containing identifying information laid out along a small positive slope.
Figure 33B:
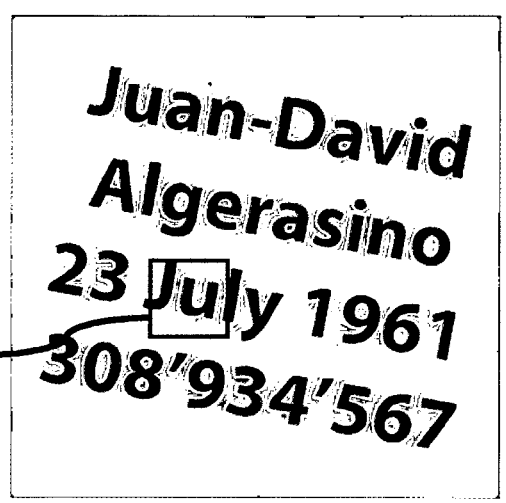
FIG. 33B shows a second elevation profile with identifying information laid out along a small negative slope.
Figure 33C:
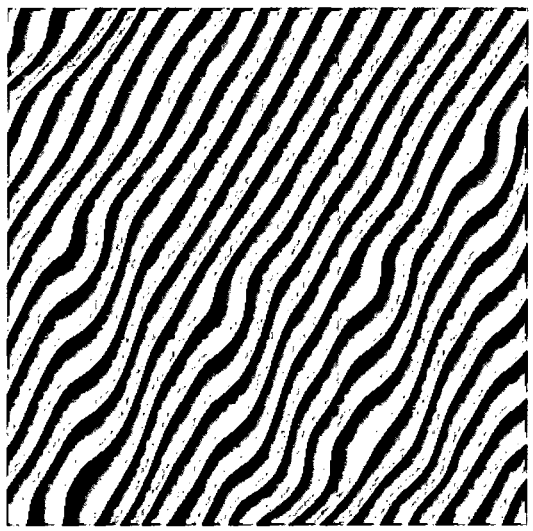
FIGS. 33C and 33D show an array of dither bands shifted perpendicularly to their orientation according to a small portion 3301 of the elevation profile of FIG. 33A and an array of dither bands shifted perpendicularly to their orientation according to a small portion 3302 of the elevation profile of FIG. 33B, respectively.

Level Line Moiré Produced with a Revealing Layer Lenslet Grating of Large Repetition Period and Base Layer Lenslet Gratings of Small Repetition Period Forming a Halftone Image A further variant of creating level line moirés by base layer lenslets forming a halftone image consists in creating from an original image (e.g. FIG. 32A) a halftone image (e.g. FIG. 32B) with substantially parallelogram shaped black halftone screen elements (enlargement of rectangular area 3201 in FIG. 33F) embedding the elevation profile(s) (e.g. FIGS. 33A and 33B) of the message to be revealed as level line moiré shape. This is carried out by creating the base layer halftone lenslet array as follows:

(A) Create a first array of dither bands oriented at a first angle $\theta_1$ (e.g. 60°) having a gray intensity gradient with values between 0 and 1, with the dither bands shifted according to a previously prepared first elevation profile (FIG. 33C).

Figure 33D:
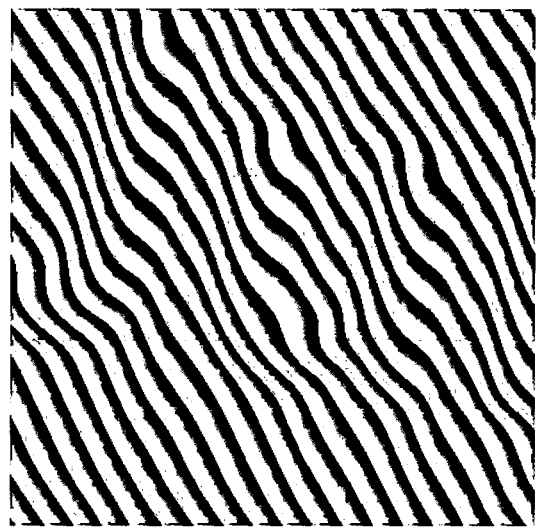

(B) Create a second array of dither bands oriented at a second angle $\theta_2$ (e.g.)–60° having a gray intensity gradient with values between 0 and 1, with the dither bands shifted according to a previously prepared second elevation profile (FIG. 33D).

Figure 33E:
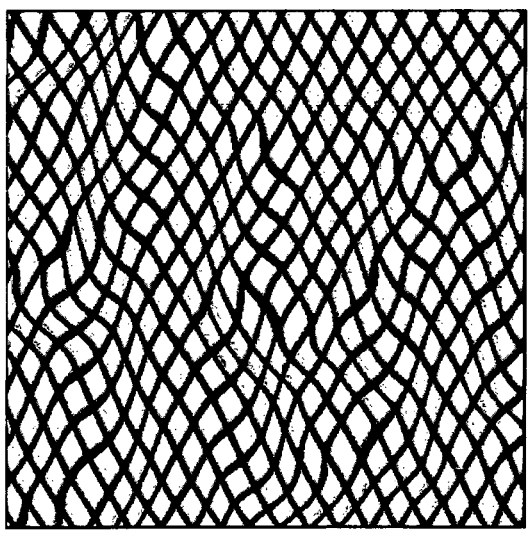
FIG. 33E shows an enlargement of the combination of the two elevation profiles, by selecting at each position the lowest intensity and by performing an histogram equalization.

(C) Combine the values of the first and the second dither arrays term by term by taking the minimum value, and apply a histogram equalization procedure. The resulting dual band dither array shows two intersecting gratings of bands (FIG. 33E).

Figure 32B:
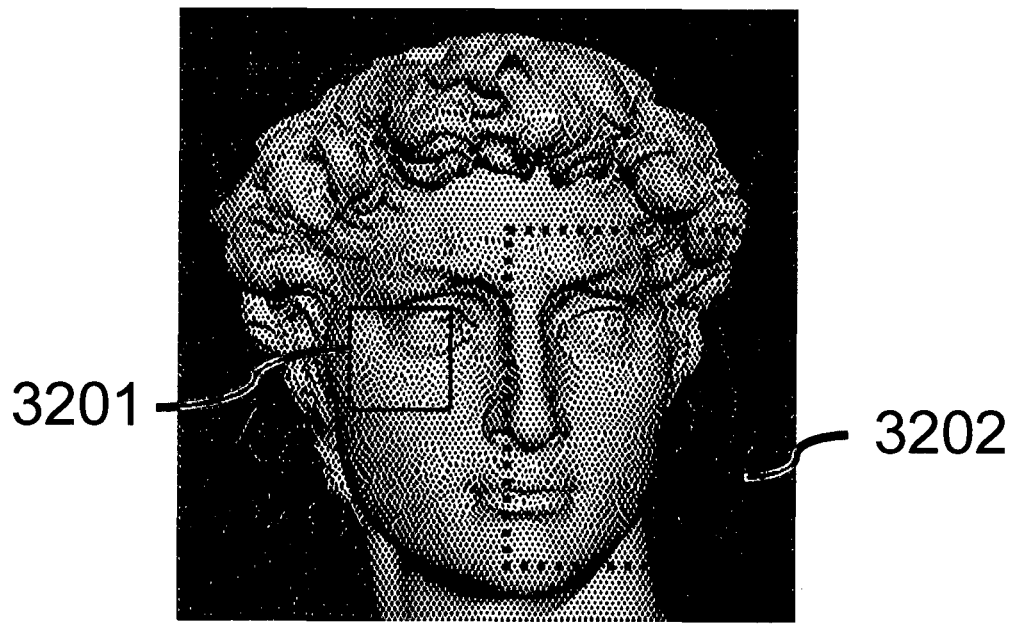
FIG. 32B shows the corresponding halftoned image with substantially parallelogram-shaped black halftone screen elements embedding the elevation profiles shown in FIGS. 33A and 33B.
Figure 33F:
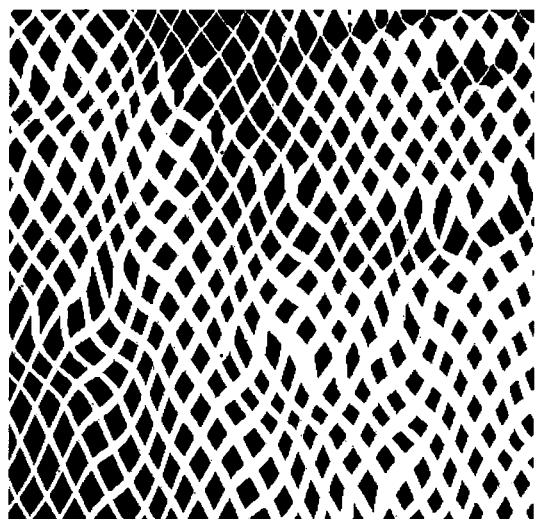
FIG. 33F shows an enlarged portion (square 3201) of the halftoned image shown in FIG. 32B, obtained by dithering the original image in FIG. 32A with the elevation profile shown in FIG. 33E.

(D) Halftone an input grayscale image (e.g. FIG. 32A) by dithering with the dual band dither array resulting from step (C). The resulting halftone elements will consist of black quadrilaterals and white areas (FIG. 32B with enlargement in FIG. 33F). The black quadrilateral halftone areas have a straight or slightly deformed parallelogram shape, well suited for the placement of the small period lenslet arrays.

Figure 34A:
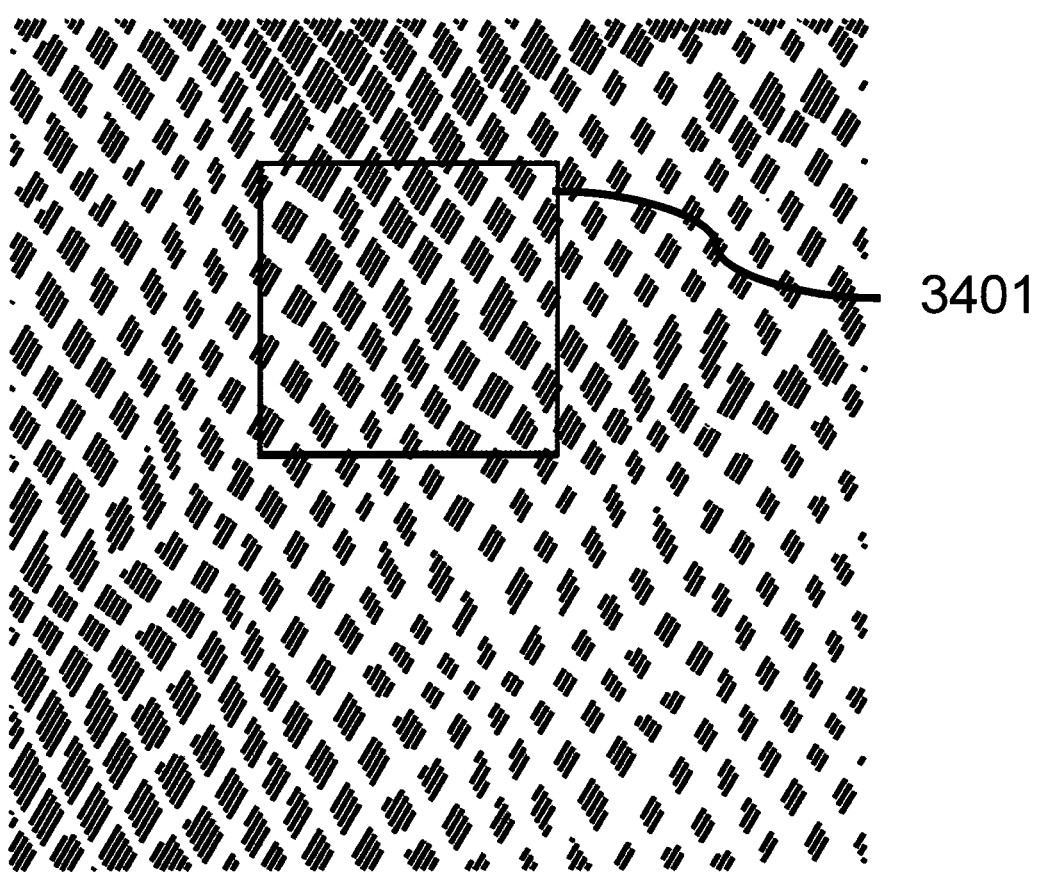
FIG. 34A shows the small rectangles specifying the layout of the cylindrical lenslet gratings within the surfaces of the black parallelograms in the halftoned image shown partly in FIG. 33F.
Figure 34B:
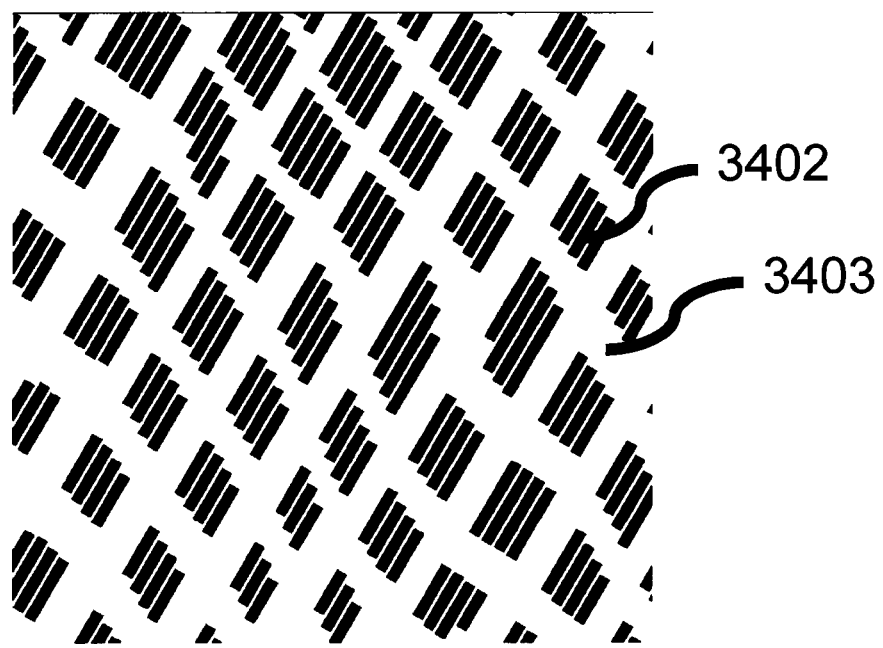
FIG. 34B shows an enlargement of FIG. 33A.

(E) Place the lenticular base layer lenslet gratings represented by arrays of longitudinal rectangles (FIG. 34B, 3402) within each quadrilateral black halftone element area (FIG. 33F), preferably according to the orientation of one of the dither bands (e.g. the dither band orientation of FIG. 33C, also present in FIGS. 33F and 34A). This can be done by intersecting a large array of rectangles representing the layout of the lenslets at the selected orientation with the black halftone areas ((black areas in FIG. 33F). Lenslet rectangle parts outside the black halftone area are eliminated.

(F) Use the longitudinal rectangles laid out in step E (FIG. 34A) to expose the resist used for fabricating the base layer comprising the lenslet gratings.

Figure 35B:
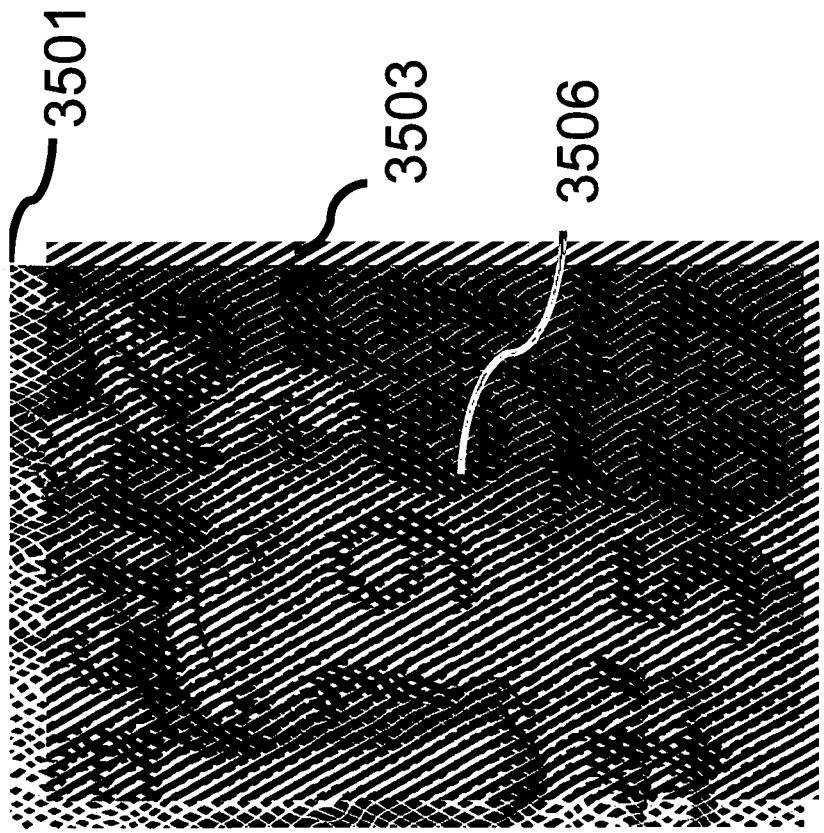
FIG. 35B shows a portion of the moiré identifying information appearing when superposing the same portion 3202 of the halftoned image 3501 as in FIG. 35A with a revealing sampling layer 3503 having the same base orientation as the array of dither bands shown in FIG. 33D.
Figure 35A:
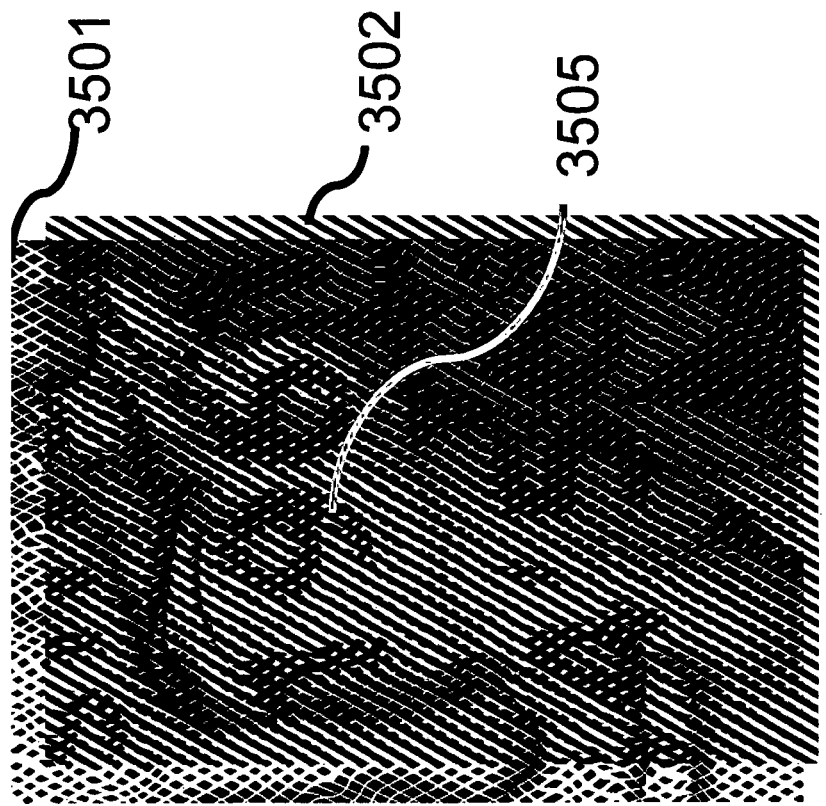
FIG. 35A shows a portion of the moiré identifying information appearing when superposing the halftoned image 3501 corresponding to the eye and nose 3202 in FIG. 32B with a revealing sampling layer 3502 having the same orientation as the array of dither bands shown in FIG. 33C.

In the present multi-lenslet grating embodiment of the level line moiré, the dither band repetition period is substantially larger than the repetition period of the lenslets forming the base layer lenslet gratings. The revealing layer lenslet grating period is the same as the dither band repetition period. The present embodiment enables creating, with base layer lenslet gratings, a halftone image such as the one shown in FIG. 32B. The quasi-parallelogram shape of the black halftone elements facilitates the placement of the base layer lenslets and enables, when superposing a revealing layer lenslet grating at a first orientation (3502), to reveal a first hidden message 3505 in one orientation (see FIG. 35A corresponding to the rectangular surface 3202 in FIG. 32B) and when superposing a second revealing layer 3503 at a second orientation, to reveal a similar or a different hidden message in the second orientation (FIG. 35B, 3506). The halftone layer 3501 shown in FIGS. 35A and 35B corresponds to rectangular area 3202 in FIG. 32B.

The solution shown above relies on small period lenslet gratings for the black screen element parts and no lenslets for the black screen element parts. The light through the lenslets gets diffused whereas light through the areas without lenslets has a strong intensity. Other variations are possible, for example by replacing the black parallelogram parts containing the cylindrical lenslet arrays with randomly placed light diffusing microlenses, as described in Section "Reinforcing the contrast of the base layer by diffusing microlenses".

Figure 46:
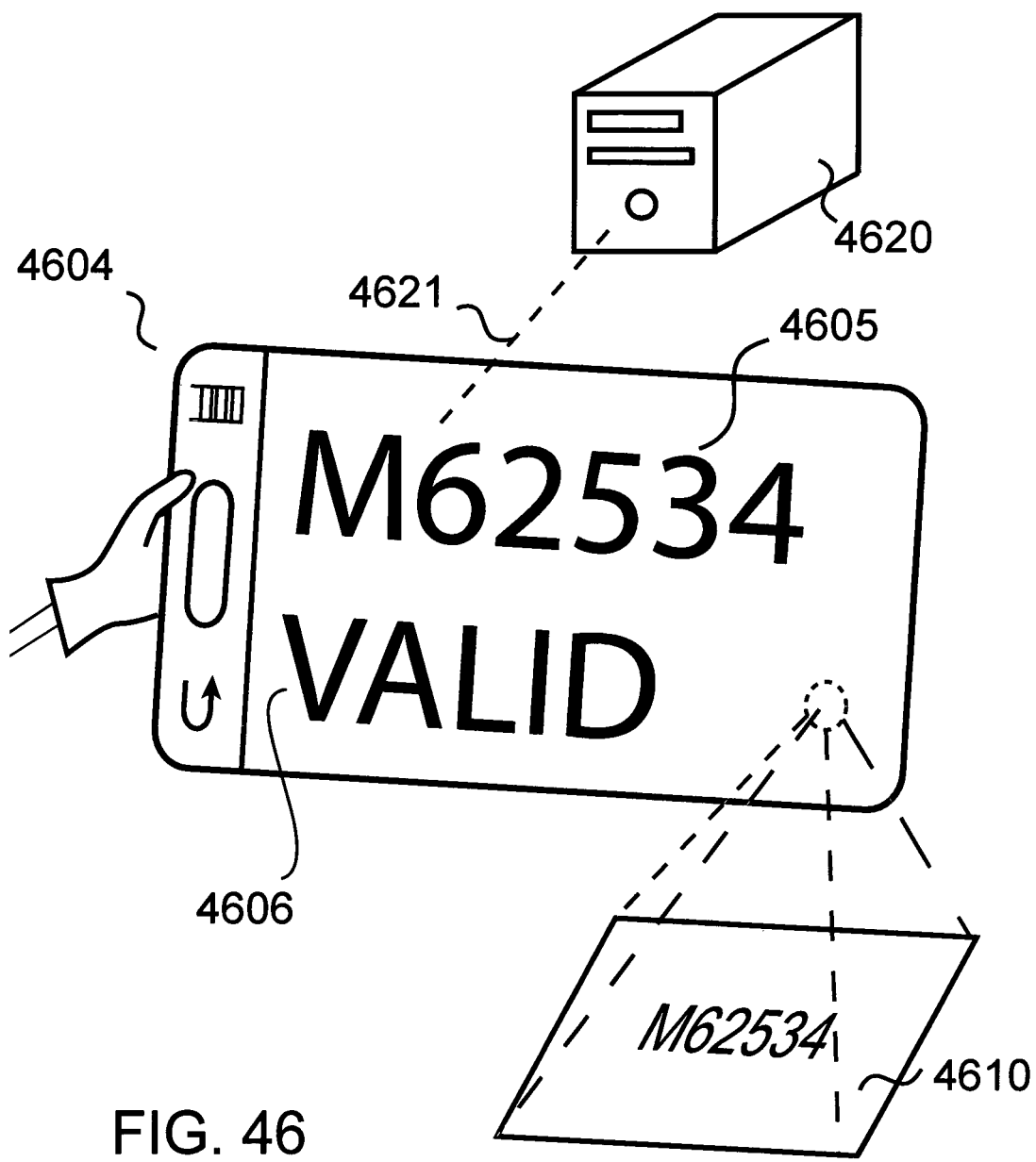
FIG. 46 shows a smartphone capturing a shape image from the setup comprising base and revealing layer lenslet gratings, recognizing the message in that shape image and possibly in connection with a remote host computer validating or not the message present in the captured shape image.

The present embodiment has the advantage of showing a halftone image, e.g. the face of a known person or the face of the document holder and at the same time being able to reveal, when superposed with the revealing layer lenslet grating, additional information, such as the name and birth date of the person whose face appears as halftone image. This solution is specially promising when using digital systems that are able to print personalized lenslet grating layouts. In addition, it is possible to replace the revealing layer sampling lenslet grating by a smartphone, tablet or laptop computer programmed to acquire the halftone image formed by the base layer lenslet gratings, to perform by software an "AND" operation between the acquired halftone base layer image and a corresponding revealing layer array of transparent lines located in memory, to show the resulting additional information on the display and/or to recognize the information content by optical recognition software and to send the resulting information content to a server for validation (similar to FIG. 46 and Section "Verification of the authenticity of a security feature relying on layers with superposed gratings of lenslets", third embodiment).

Visible Effect Obtained by the Level Line Moiré

When moving the revealing layer lenslet grating in respect to the base layer lenslet grating(s) or in the case of a fixed setup of base and revealing layer lenslet gratings, when tilting the setup in respect to the viewer, the constant intensity or color lines representing the level lines of the elevation profile incorporated into the base layer by shifts of its lenslet gratings appear to move between the elevation shape foreground skeleton and the shape boundaries and between the elevation shape boundaries and the shape background skeleton. In FIGS. 30C and 30D, the level lines are represented by constant gray values. The different sampling positions of the revealing layer in respect to the base layer shown in FIGS. 30C and 30D create a different mapping between the level lines of the elevation profile and their representation as constant intensity or constant color lines. The constant intensities or colors seen as level lines depend on the backside illumination that should vary according to the incident angle on the base layer lenslets (see incident light in FIG. 3, at angular orientations 354, 355, 356, 357).

Lenticular Image Synthesizing Techniques

Figure 36:
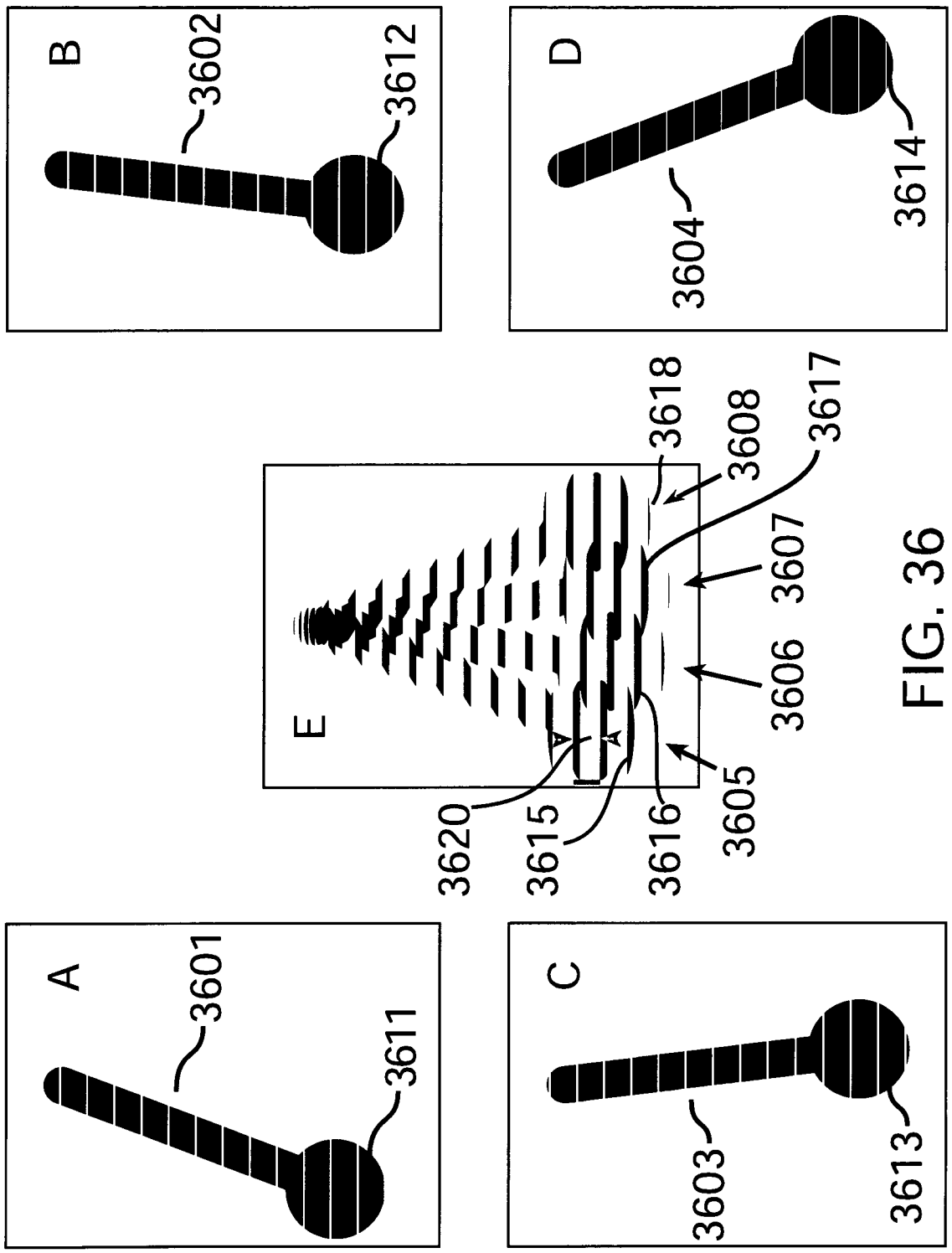
FIG. 36 shows how a lenticular base layer image is constructed from four different parts.
Figure 37A:
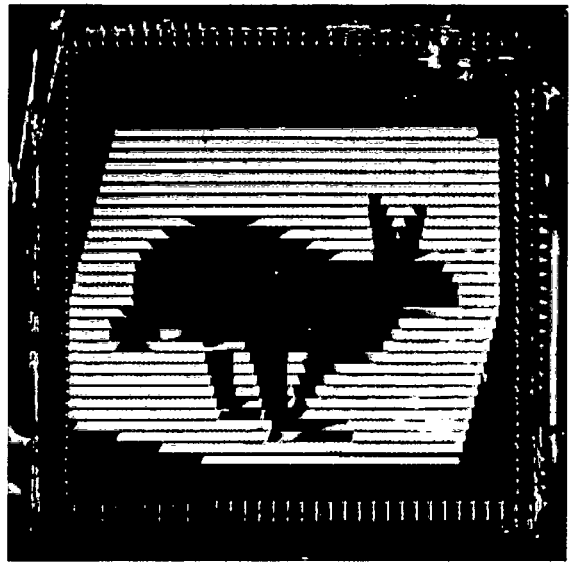
FIGS. 37A, 37B, 37C, 37D show photographs of a lenticular image setup comprising base and revealing layer lenslet gratings that displays a succession of four successive lenticular shape images upon vertical tilting of the setup.
Figure 37B:
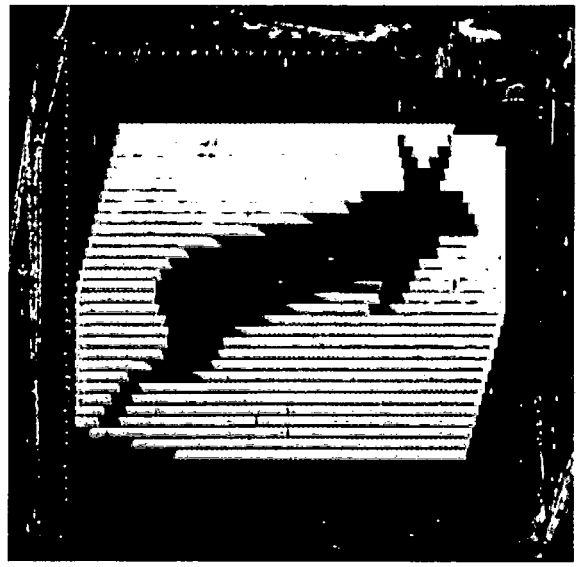
Figure 37C:
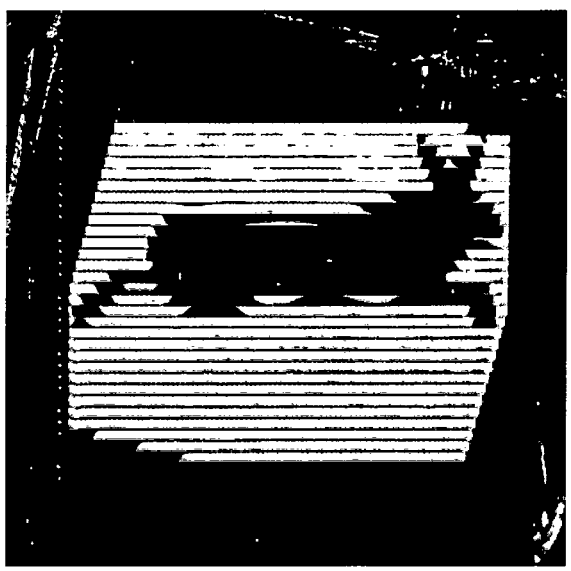
Figure 37D:

The lenticular image synthesizing techniques rely on base layer slicing, sampling, compression and re-assembling and on revealing layer sampling. A number of input images, e.g. the 4 images shown in FIG. 36, boxes A, B, C and D are sliced and compressed by a factor of 4, then superposed, yielding the base layer assembly shown in box E. Individual images 3601, 3602, 3603, 3604 become image parts 3605, 3606, 3607, 3608, respectively. Slices 3611, 3612, 3613 and 3614 become after compression (scaling down in one direction) slices 3615, 3616, 3617 and 3618, respectively. In order to realize a setup made of base layer and revealing layer gratings of lenslets, the black foreground slices shown in box E are embodied by gratings of oblique cylindrical lenslets. The background (white) is left empty or filled with small microlenses diffusing the light. The revealing layer grating of lenslets has lenslets with the same period as the distance 3620 between successive slices of a same image part.

As an example, the FIGS. 37A, 37B, 37C, and 37D show photographs of a setup made of base and revealing grating lenslets. This setup shows as superposition shapes four successive views representing a running rabbit that appear when tilting the setup vertically. The revealing layer cylindrical lenslets are horizontally oriented and have a period of 400 µm, with each cylindrical lens having a width of 385 µm followed by a gap of 15 µm. The base layer gratings covering the foreground of the base layer images are formed of cylindrical lenslets having a period of 16 µm, with each cylindrical lens element having a base width of 14 µm and a gap of 2 µm. The base layer gratings are rotated by 15 degrees in respect to the orientation of the revealing layer grating.

Further Superposition Images Created by Superposed Gratings of Lenslets

The lenslet grating synthesizing techniques described in detail above that create upon observation 1D moiré shapes, 2D moiré shapes, level line moiré shapes or lenticular image shapes are only a subset of the variety of superposition shapes that can be achieved with superposed layers of lenslet gratings. These lenslet grating synthesizing techniques can also be used to create in an analogous manner a pair of base and revealing layer random 2D lenslet gratings that show by superposition a single instance of a 2D moiré view, according to U.S. Pat. No. 7,058,202 to Amidror. They can also be used to create a pair of base and revealing layer random 1D lenslet gratings that show a single instance of a 1D moiré shape, according to U.S. Pat. No. 8,351,087 to Amidror and Hersch.

Fabrication of Gratings of Cylindrical Lenslets

The technologies developed to produce arrays of spherical microlenses are also applicable to produce gratings of cylindrical lenslets. The following list of publications gives an overview about possible technologies for fabricating microlenses.

a) Z. D. Popovic, R. A. Sprague, and G. A. N. Connell, "Technique for monolithic fabrication of microlens arrays," Applied Optics, vol. 27, no. 7, p. 1281, April 1988.

b) D. Daly, R. F. Stevens, M. C. Hutley, and N. Davies, "The manufacture of microlenses by melting photoresist," Measurement Science and Technology, Vol. 1, 759-766 (1990)

c) C. Y. Chang, S. Y. Yang, M.-H. Chu, Rapid fabrication of ultraviolet-cured polymer microlens arrays by soft roller stamping process, Microelectronic Engineering, Vol. 84, 355-361 (2007).

d) C. N. Hu, H. T. Hsieh, G. D. J. Su, Fabrication of microlens arrays by a rolling process with soft polydimethylsiloxane molds, J. of Micromechanics and Microengineering, Vol. 21, paper 065013, 7 pp. (2011).

e) S. J. Liu, C. C. Huang, C. T. Liao, Continuous Infrared-Assisted Double-Sided Roll-toRoll Embossing of Flexible Polymer Substrates, Polymer Engineering and Science, Vo. 52, Issue 7, 1395-1401, (2012).

Figure 38:
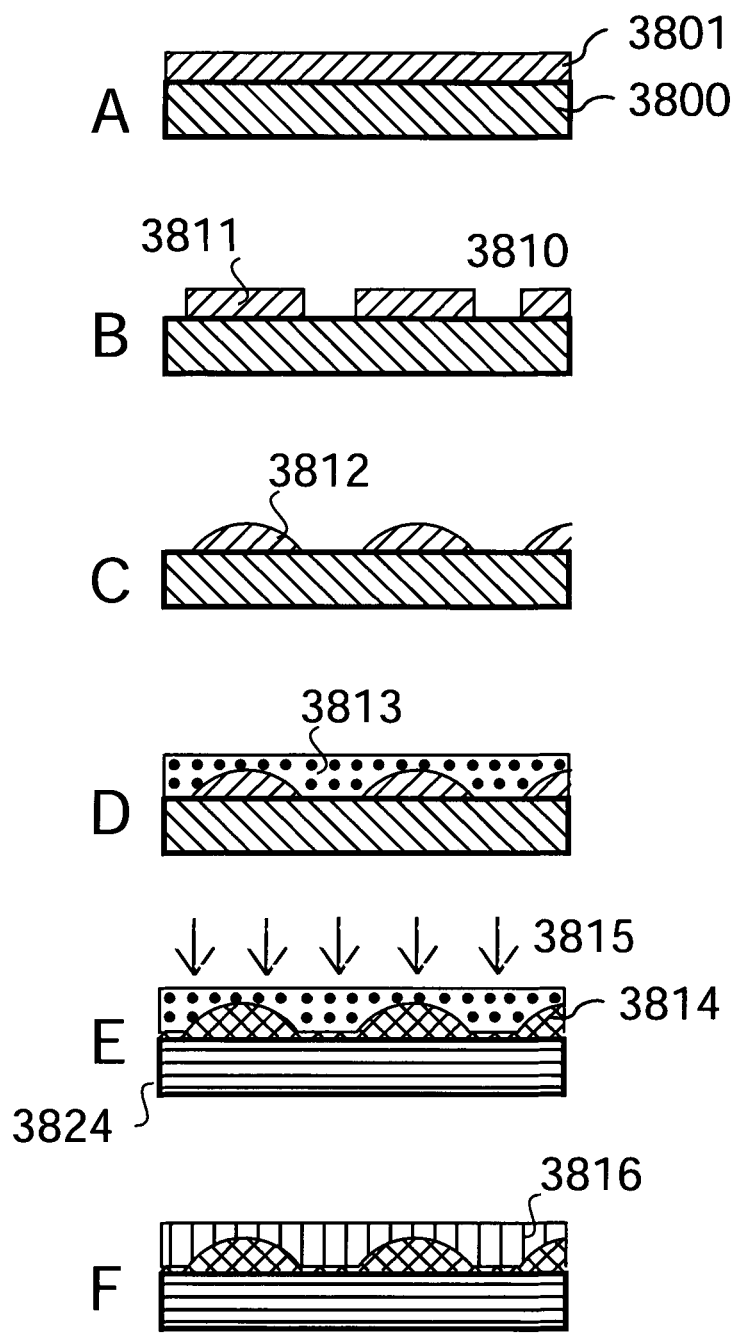
FIG. 38 shows fabrication steps for realizing gratings of lenslets.

Let us first present one embodiment based on the reflow of positive resist. The gratings of cylindrical lenslets are fabricated by direct laser writing and reflow of positive resists spin coated on silicon. The arrays are replicated in PDMS and finally used for UV imprint with photocurable polymer. At the end of the process, a sixth step can be executed for the encapsulation of the device. The different steps are shown as cross-sections in FIG. 38.

A. Positive resist 3801 is spin coated on a silicon wafer (3800).

B. The resist is exposed and developed (3810) so as to yield longitudinal stripes 3811 following the centerlines of the cylindrical lenslets.

C. The structured resist is heated and becomes liquid. This reflow process tends to create, due to surface tension, cylindrical lenslets whose cross sections are circular segments (3812).

D. In order to create the molds, Polydimethylsiloxane (PDMS, e.g. Sylgard 184) 3813 mixed with a curing agent is placed on top of the reflowed resist structures. It is heated to around 80° C. during at least one hour so as to fully polymerize. The PDMS is removed from the silicon substrate and now holds the negative shape of the cylindrical lenslets.

E. The PDMS is then placed on top of a suitable transparent substrate (glass or plastic sheet 3824) on which UV curable material 3814 such as Ormocomp was deposited. The UV curable material spreads out under the PDMS. It is then exposed from below or from the top by a UV light source 3815. The PDMS mold is released and the grating of cylindrical lenslets is available, bound to its transparent substrate.

F. Option: In order to provide a higher resistance and a longer lifetime, the grating of cylindrical lenslets can be encapsulated by a transparent material such as a polymer 3816 having a lower index of refraction than the index of refraction of the lenslets. For example, one may achieve this with a lenslet material of index n=1.52 and an encapsulating polymer of index n=1.4. The radius of the cylindrical lenslets is computed according to formula (12) to yield the desired focal length.

Let us now describe embodiments enabling the mass production of gratings of cylindrical lenslets. A first embodiment relies on a roll-to-roll setup with a single PDMS carrying wheel.

Figure 39:
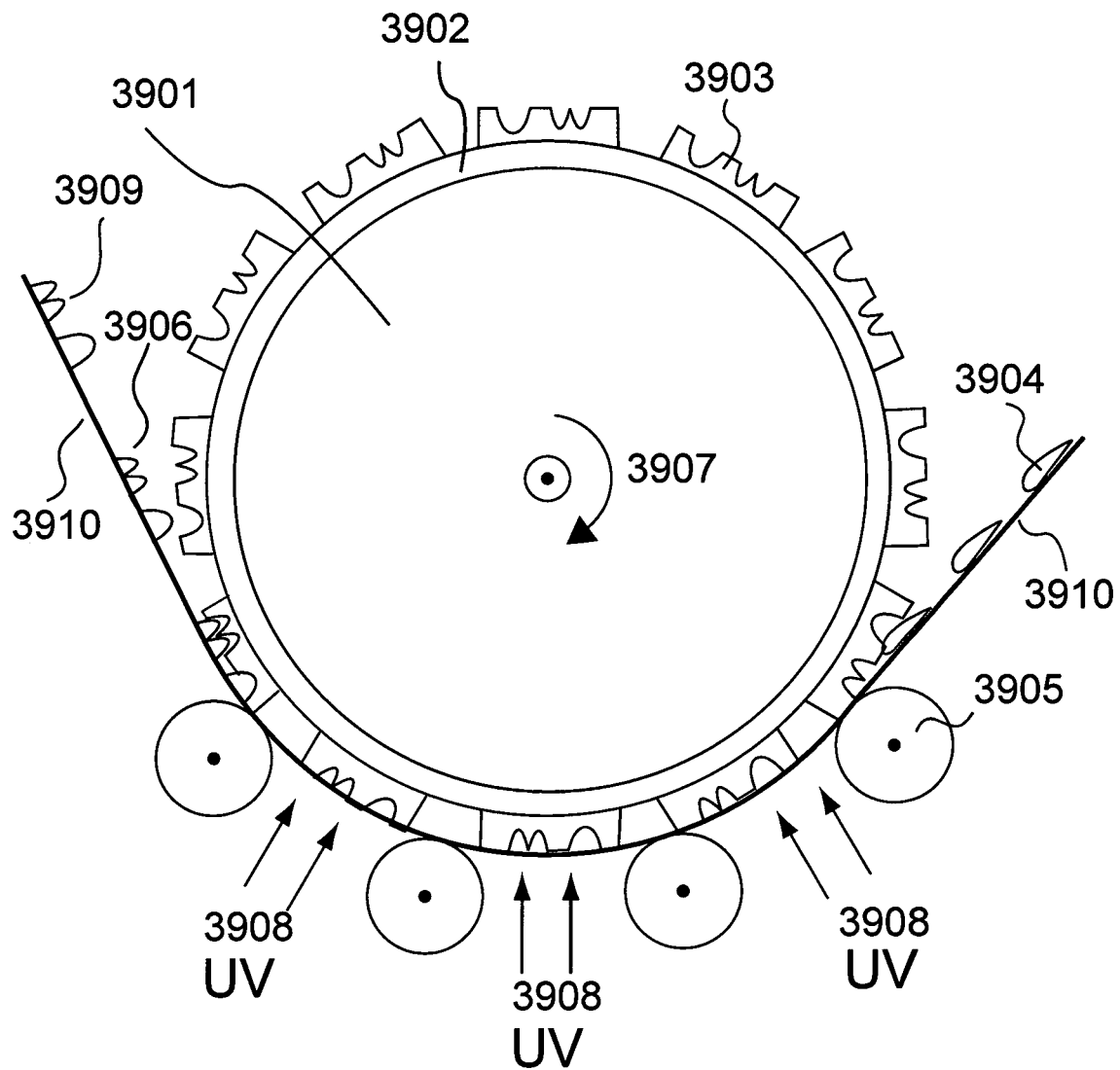
FIG. 39 shows a roll-to-roll mechanism enabling producing lenslet gratings efficiently.

Points A to D are the same as above, but carried out on a lengthy surface comprising several parts (areas) each one having its gratings of cylindrical lenslets. In addition, according to FIGS. 38 and 39, the following steps are carried out.

E'. The PDMS molds (FIG. 39, 3903) are attached to a belt 3902 encircling the rolling wheel. The substrate 3910 formed e.g. of plastic is pressed against the PDMS encircling the rolling wheel 3901 by a secondary pressing wheel 3905. UV curable material such as Ormocomp is continuously deposited 3904 onto the substrate before passing through the two wheels.

F. Then, both the PDMS mold and the pressed curable material travel with the rotation 3907 of the main wheel 3901. During this travel, the curable material is pressed into the PDMS mold and at the same time it is cured by UV illumination 3908.

G. When the molded cured material exits 3906 the rotation of the main wheel, the PDMS follows the surface of the main wheel and the molded cured material separates from it. The molded cured material is available as gratings of lenslets 3909 on the substrate 3910.

Either steps A to E or alternately, steps A to G can be performed both for the base layer gratings of cylindrical lenslets and for the revealing layer gratings of cylindrical lenslets. In order to enhance the contrast in the base layer (see Section "Reinforcing the contrast of the base layer by diffusing microlenses"), microlenses can be formed in a similar manner as cylindrical lenslets, by also exposing in step B circular disks, as known in the art.

The final multi-lenslet setup containing the base and revealing layer gratings of lenslets can be obtained by pasting the base layer grating and revealing layer grating together. Registration marks formed of a cross made of 2 cylindrical lenslets located between the separate parts may be helpful for bringing the two layers into registration before pasting them together.

Figure 40:
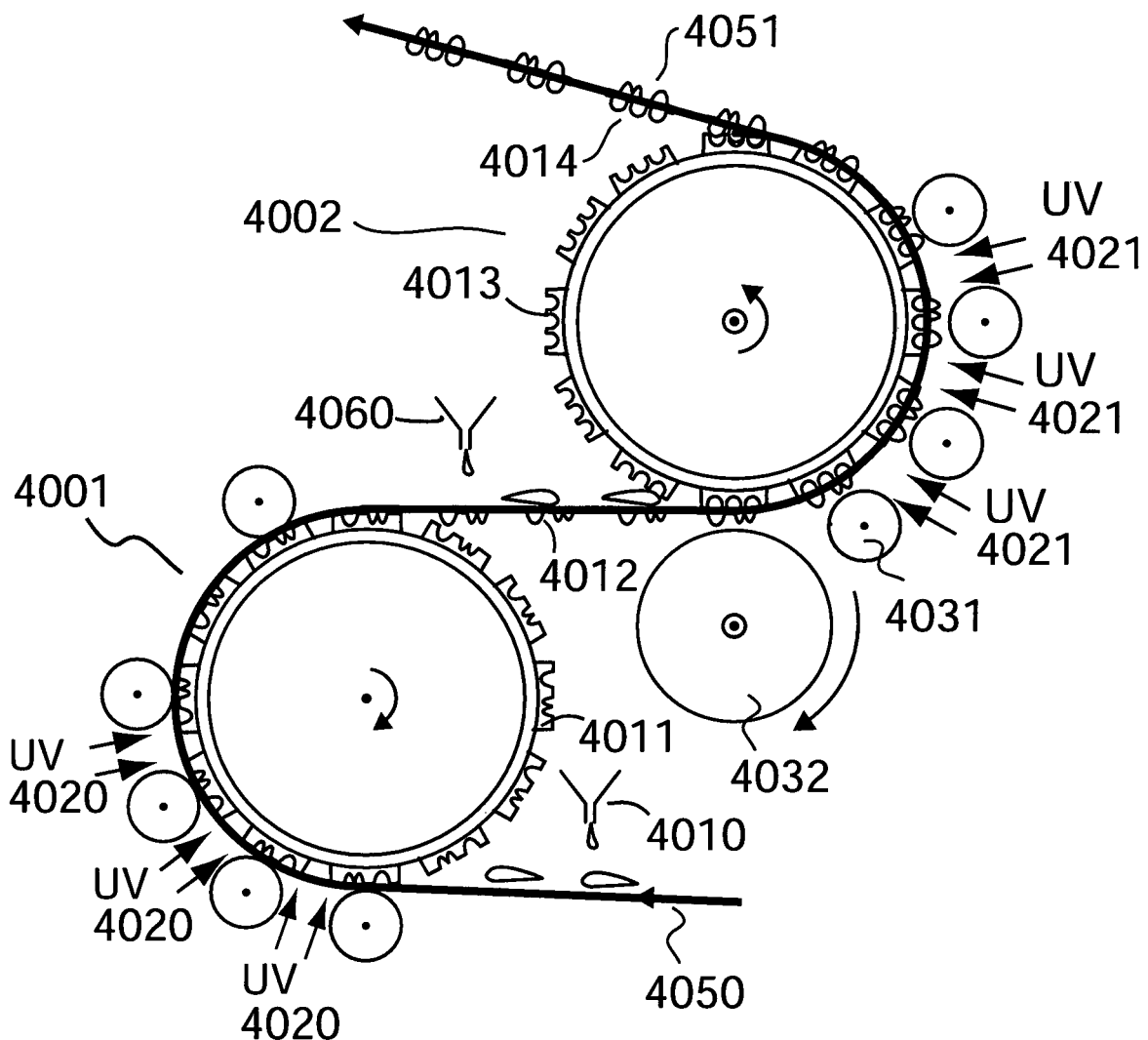
FIG. 40 shows a second roll-to-roll mechanism enabling producing lenslet gratings on two sides of a substrate.

A second roll-to-roll embodiment consists in imprinting both layers of the substrate on the same installation, as shown in FIG. 40. This system relies on one wheel 4001 carrying a first PDMS mold 4011 for imprinting the base layer lenslets and on a second wheel 4002 carrying a second PDMS mold 4013 for imprinting the revealing layer lenslets. On each side of the substrate the system works in the same manner as described for the single PDMS carrying wheel embodiment described previously. Note that optionally, after being imprinted by passing along the first wheel, the material can be encapsulated by a transparent layer of a lower index of refraction, yielding a flat surface. In step G, after the molded cured material 4012 separates from the PDMS, curable material is poored 4060 on the other side of the substrate and is pressed against the second PDMS mold 4013 while rotating along the second wheel 4002. The material is cured by UV light 4021, hardened and finally detached from the PDMS 4014. As a result of this process, the base layer grating of lenslets 4051 on one side of the substrate is available simultaneously with the revealing layer grating of lenslets on the other side of the substrate 4014. In order to ensure a good spatial registration of the two layers of lenslets, registration marks formed of a cross made of 2 small cylindrical lenslets are placed at regular intervals between the separate areas of the gratings. When setting up this process, the second wheel 4002 can be slightly moved in respect to the first wheel 4001 so as to ensure that the hardened "cross" registration marks made of lenslets are brought into registration at the output of the second wheel.

Other embodiments are possible, for example, an embodiment relying on double side roll-to-roll embossing of flexible polymer substrates by rollers bearing the negative of the desired lenslet gratings. One roller bears the negative of the base layer grating of lenslets and the other metallic roller bears the negative of the revealing layer grating of lenslets. The two metallic rollers are pressed together and the curable material is poored on both sides of a glass or plastic substrate. By pressure between the two wheels, the curable material takes the desired shape and by UV illumination the material is cured. In case of transparent rollers, the UV light sources may illuminate the curable material from inside the wheels.

Fabrication of Personalized Gratings of Lenslets

Figure 41:
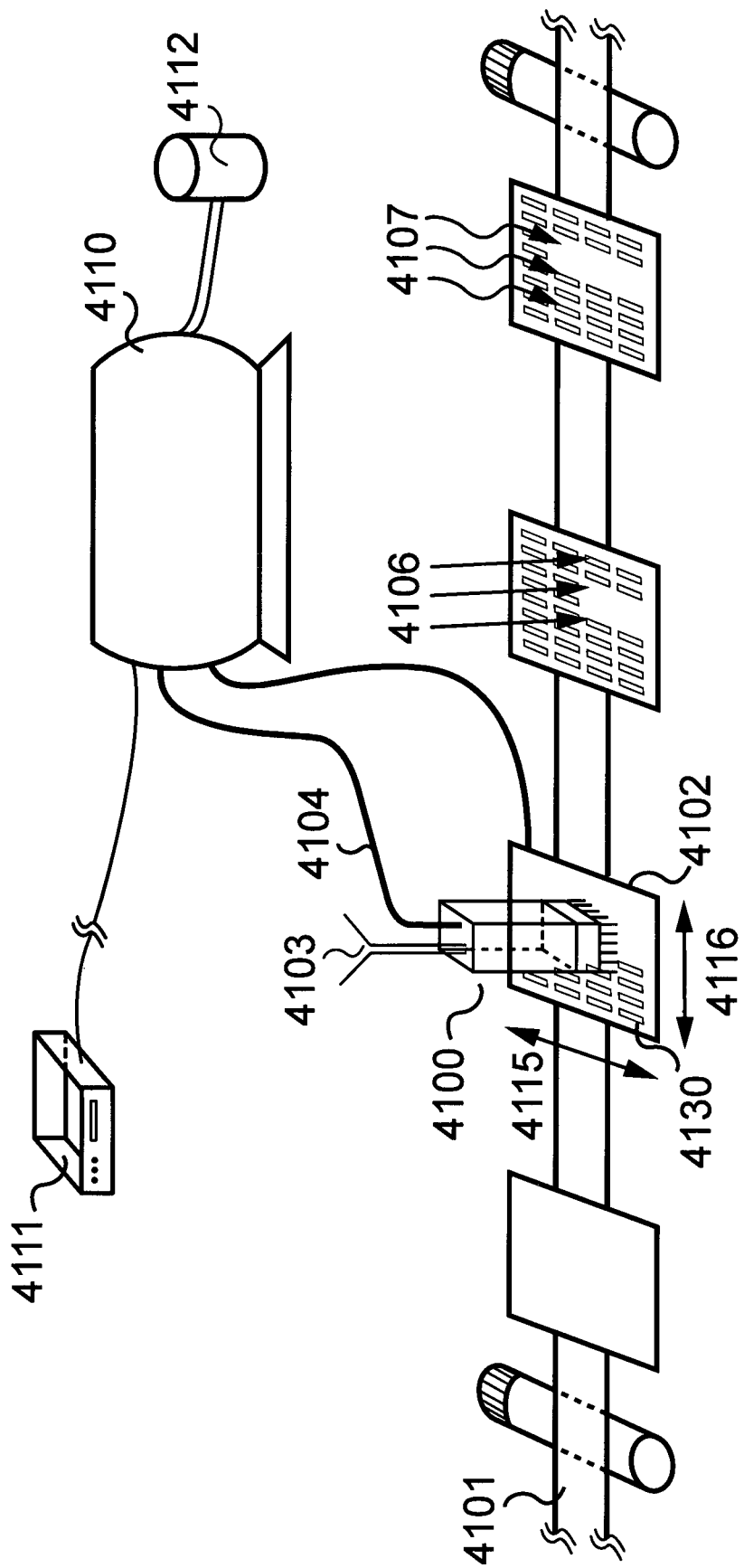
FIG. 41 shows a production line for producing personalized gratings of lenslets with a polymer jetting print engine.

High anti-counterfeiting security is provided by individualized gratings of lenslets that comprise an information related to the specific document or valuable article that is to be protected. For example, the revealing and base layer gratings of lenslets may be affixed on a box containing valuable drugs, where the superposition image shows as level-line moiré the number characterizing the production series of that drug or its specific identification number. As a further example, an ID card may show as base layer lenslet gratings the halftone image of the card holder and as superposition moiré shape, either as a 1D moving moiré shape or as a level line moiré shape, representing the birth date of the card holder. The production of such personalized gratings of lenslets can be obtained by printing with a polymer jetting printer (FIG. 41, 4100) working in a similar manner as an inkjet printer. The thin polymer stripes, rectangles 4130 or circular disks are printed and then, due to surface tension, possibly upon heating 4106 and/or UV curing 4107, form the cylindrical or circular lenslet gratings, respectively. For more details about possible polymer jetting processes, see the following articles, herein incorporated by reference:

Fakhfouri et al., "Inkjet printing of SU-8 polymer based mems, a case study for microlenses", Proc. IEEE 21st International Conference on Micro Electro Mechanical Systems, 2008;

Vilmi et al., "Inkjet printed micro lens array on patterned substrate", SPIE Vol. 8613, article no. 861317, 2013;

Chen et al., Fabrication of inkjet-printed SU-8 photoresist microlenses using hydrophilic confinement, J. Micromech. Microeng. Vol. 23, article 065008, 8 pages (2013).

The recently developed 3D printers may also print such lenses with polymer material that at a certain temperature form, due to surface tension, the desired cylindrical or circular lenslet gratings. The polymerization can then proceed by irradiating the resulting lenslet gratings with UV light and/or by heating them.

Large size lenslet gratings, e.g. lenslet gratings with a repetition period larger than 1 mm, may be manufactured by classical 3D printing with a transparent plastic material. The 3D shape of the one sided or in case of a fixed setup of the two-sided lenslet gratings is described by a surface model such as the STL file format for stereolithography. The STL description is then entered into the software converting the surface model to printer commands specifying the x-y horizontal displacements and the z vertical displacements of the print head. The resulting printed 3D plastic element forms either the base layer lenslet gratings or the revealing layer lenslet grating on top of a flat layer of plastic. In case that both the base and revealing layer gratings are printed at the same time on the two side of a flat layer of plastic, the resulting printed 3D volume is the fixed multi-lenslet setup directly usable to view the resulting superposition shape image. Such a fixed setup of large size, from a few centimeters to several meters, can be used for advertisement and decoration, in exhibitions, for the decoration of walls or in amusement parks.

A digital fabrication line producing personalized security devices such as identity cards ("ID cards") comprises a computer (FIG. 41, 4110) running a computer program that automatically produces the layout of the 1D arrays of rectangular areas and 2D arrays of circular areas on which the corresponding cylindrical and spherical lenslet gratings are formed.

In the case of a level line moiré showing as base layer the halftone image e.g. of the document holder and as level line moiré his name and birth date, the computer program may carry out the following steps:

A) Read the record from disk 4112 or from a network server 4111 containing the variable intensity (or grayscale) face image and the name and birth date of the document holder;
B) Create the elevation profile(s) (e.g. FIGS. 33A and 33B) from the bitmap image of the birth date;
C) Create the dither array (e.g. FIG. 33E) with the band arrays (FIGS. 33C and 33D) incorporating by appropriate shifts the elevation profile(s) created in point B above;
D) Halftone the variable intensity face image (e.g. 32A) by dithering with the dither array created in point C above, thereby yielding a halftone image with black polygonal halftone element surfaces (e.g. FIGS. 32B and 33F);
E) Fill the quadrilateral black halftone surfaces with arrays of small rectangles (FIG. 34A and enlargement in FIG. 34B) defining the layout of the cylindrical lenslet gratings;
F) With the array of small base layer rectangles, form the commands (4104 print head commands and table displacement commands 4115 and 4116) for the polymer jetting printer that prints the polymer material 4103 on the selected substrate 4102 (e.g. plastic). These commands may directly be commands to print successive droplets along these rectangles or the raster-scan printing of polymer droplets according to the rasterized rectangle array file. The produced substrate with the polymer droplets is then heated 4106 and/or UV cured 4107.

If the revealing layer lenslet grating is not individually personalized, it may be fabricated as described in Section "Production of gratings of cylindrical lenslets". If it is personalized, for example by having for personalized security items cosinusoidal revealing layer layouts of different amplitudes, periods and orientations, it may be produced in a manner analogous to the procedure described above for creating personalized base layer lenslet gratings.

Figure 42:
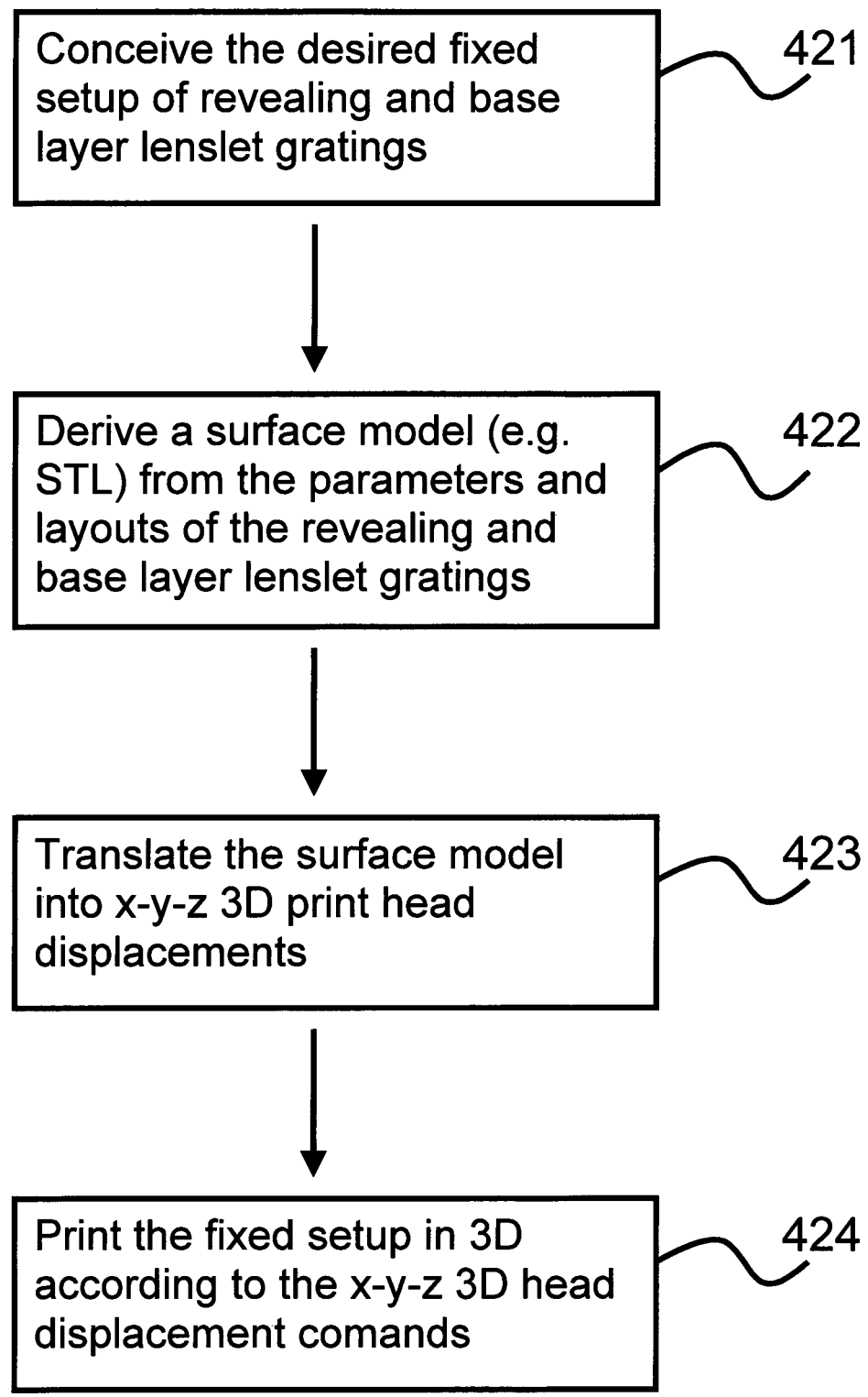
FIG. 42 shows the steps for producing with a 3D printer personalized superposable base and revealing layer gratings.

The fabrication of large sized fixed setups of lenslet gratings would comprise the step of conceiving the fixed setup of base and revealing layer lenslet gratings (FIG. 42, 4201), of deriving 4202 from the parameters and layout of the lenslet gratings a 3D surface description (e.g. STL), of translating the 3D surface description into 3D printing head displacement commands 4203 and of printing 4204 the fixed setup in 3D according to the computed head displacement commands.

Conceiving a Security Feature

Figure 43:
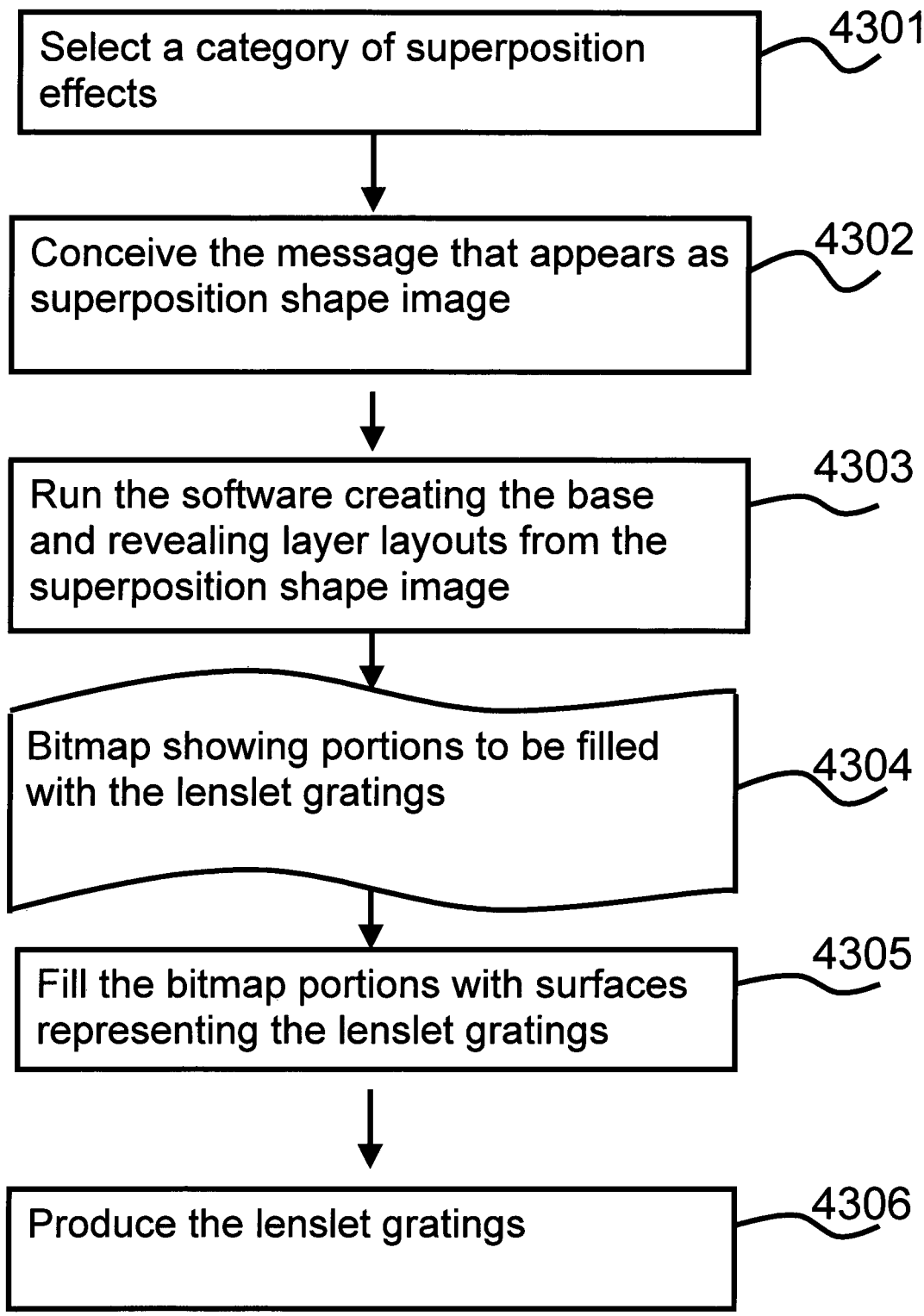
FIG. 43 shows the preparation steps necessary before fabricating the superposed base and revealing layers of gratings.

The method for conceiving a security feature (FIG. 43) that is to be incorporated into a document or an article to be secured comprises the following steps.

a) Select a category of superposition effects 4301, such as lenticular image effect, 1D moirés, 2D moirés, random moiré, level line moirés, shift effects or lenticular imaging effects.
b) Conceive the message 4302 that should appear as superposition shape image.
c) Run the layer synthesizing software 4303 operable for creating the selected category of superposition effects and give as input the message, as well as appropriate parameters (see the relevant sections describing the different superposition effects).
d) Obtain as output (i) the base layer grating layout in the form of a bitmap 4304 showing the portions (foreground) that are to be filled with the base layer gratings of lenslets and (ii) the revealing layer layout in the form of a bitmap with transparent lines or tiny holes specifying the layout of the revealing layer grating of lenslets.
e) Verify that the superposition of the base and revealing layers yields the desired superposition shape image incorporating the initially conceived message.
f) Apply a further processing step in order to fill the foreground portions of the base layer with surfaces representing the layout of the base layer gratings of lenslets 4305. Choose an appropriate orientation and period of the base layer lenslet gratings.
g) Depending on the input files required by the equipment operable for exposing the resist in step A of section "Production of gratings of cylindrical lenslets", an additional processing step may be required to produce the files defining the path of an exposing laser. For example, the stripes that form the surfaces of the resist which are later treated by the reflow process are converted into sequences of small CIF (Caltech Intermediate Form) rectangles. The exposing laser then exposes the successive rectangles. The output of the present step is the CIF file acting as input to the laser exposure software.
h) Finally, fabricate the lenslet gratings 4306.

Placement of the Recto-Verso Gratings of Lenslets onto Valuable Documents and Products The multi-lenslet setup incorporating on its recto the revealing layer grating of lenslets and on its verso the base layer gratings of lenslets provides the clearest superposition shape image when viewed in transmission mode, when light arrives from the back of the setup, e.g. light from a window, light from an artificial light source, light from an array of LEDs or light from a wall. The best effects are achieved when the incoming light varies in intensity according to its incident angle. The setup with the recto-verso gratings of lenslets can be incorporated into any document window, e.g. the window reserved for transmissive effects on opaque paper banknotes, the non-opacified portion of a polymer banknote or a transparent polymer area within a plastic card. The recto-verso gratings of lenslets can also be placed on a transparent portion of the polymeric data page of a passport. Recto-verso gratings of lenslets can also be easily incorporated into transparent or semi-transparent areas of plastic indentity cards (ID cards) by placing them on both sides of the card. They can be encapsulated by a transparent material such as a polymer with a lower index of refraction than the index of refraction of the lenslets. The resulting ID card may for example show the face of the ID card holder. By tilting the ID card, the face parts change smoothly their intensities from highlight to dark and vice versa, as shown in FIGS. 31A and 31B.

Figure 44A:
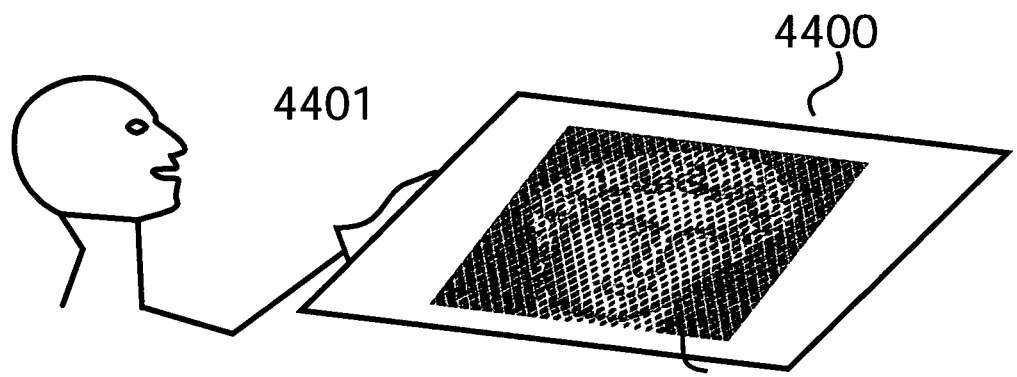
FIGS. 44A and 44B show a setup 4400 with base layer lenslet gratings on top of a semi-transparent substrate and a revealing layer lenslet grating behind that substrate, that, when viewed in reflecting mode shows a halftone image (FIG. 44A) and when viewed in transmissive mode reveals a hidden information (FIG. 44B)
Figure 44B:
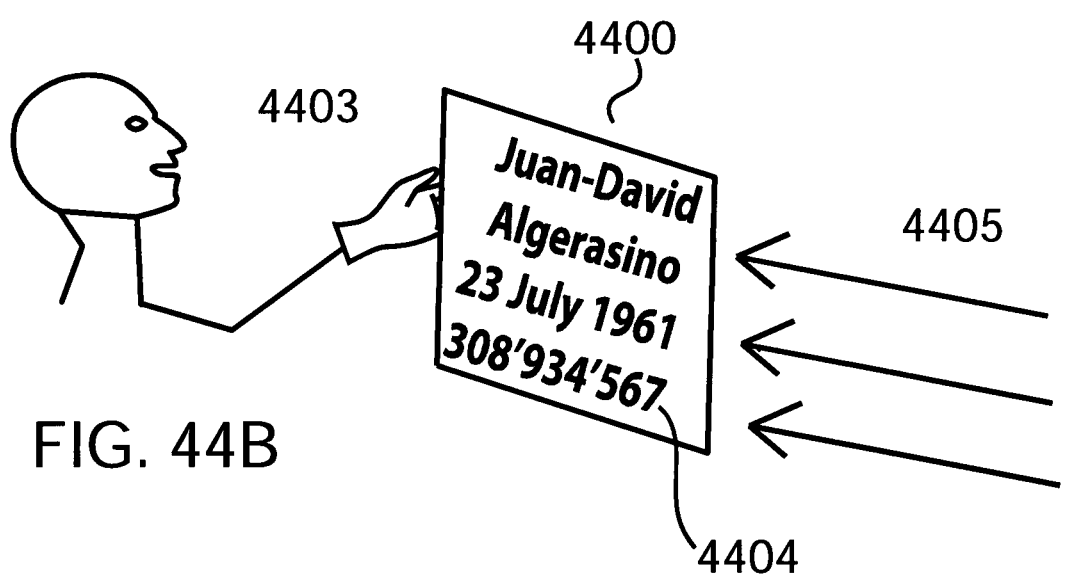

According to Section "Level line moiré produced with a revealing layer lenslet grating of large repetition period and base layer lenslet gratings of a small repetition period forming a halftone image", it is also possible to print the base layer lenslet gratings forming the halftone image on one side of a semi-transparent substrate and the revealing layer lenslet grating on the other side of the semi-transparent substrate. Then, when viewed in reflective mode on a dark background (FIG. 44A, 4401), the halftone image 4402 is visible, e.g. an image resembling the photograph of the document holder, and when viewed in transmissive mode 4403, illuminated from behind 4405, the transmissive superposition image formed of the superposition of the base and revealing layer gratings becomes visible. This transmissive superposition image contains a message such as the name, birth date and ID number of the document holder 4404.

The setup with the recto-verso gratings of lenslets can also be applied on any package reserving a transparent window for this authentication feature. For example, a package containing drugs may incorporate a small transparent window located in its pivoting lid. This transparent window may incorporate on one side the revealing layer grating of lenslets and on the other side the light concentrating gratings of lenslets forming the base layer. When opening the box, the lid shows as moiré superposition image the dynamically moving "ORIGINAL DRUG" message.

Packages that include a transparent part or a transparent window are very often used for selling a large variety of products, including, for example, CDs, DVDs, etc., where the transparent part of the package enables customers to see the product inside the package. The transparent parts of such packages may also be used advantageously for authentication and anti-counterfeiting of the products, by using a part of the transparent window for the placement of the recto-verso gratings of lenslets. The setup made of the recto-verso gratings of lenslets may also be printed on separate security labels or stickers that are affixed or otherwise attached to the product itself or to the package.

Figure 45A:
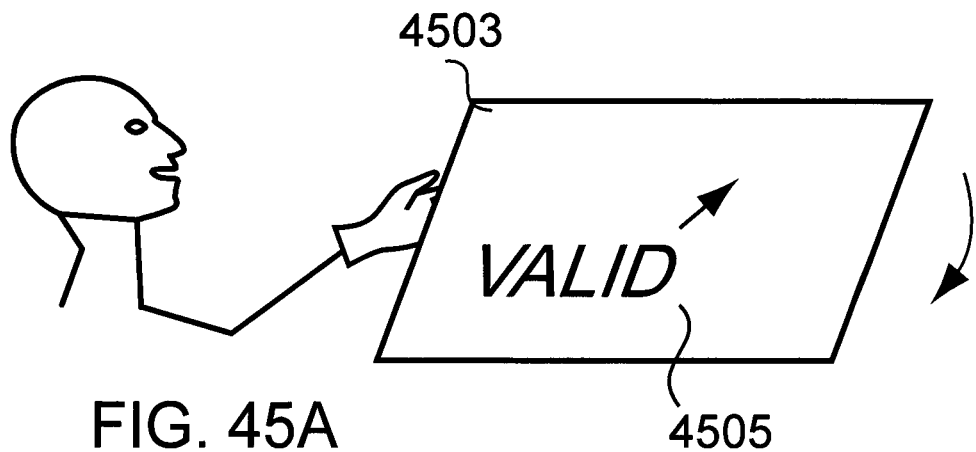
FIGS. 45A and 45B show a setup formed of base and revealing layer lenslet gratings that upon tilting yields a displacement of the appearing moiré shapes.
Figure 45B:
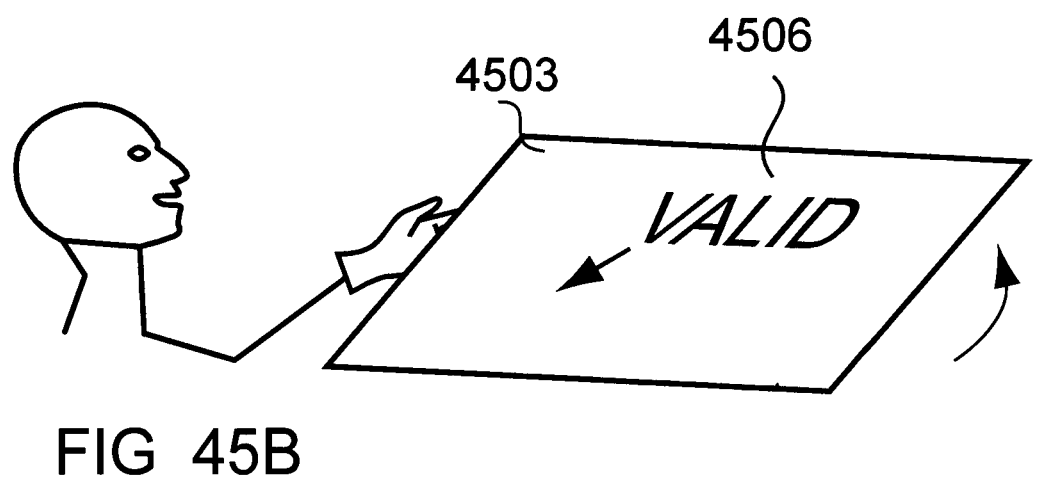

Verification of the Authenticity of a Security Feature Relying on Layers with Superposed Gratings of Lenslets In one embodiment of the present invention, the shape image resulting from the superposition of the base and revealing layer gratings of lenslets can be visualized by simply looking at the setup incorporating the layers of lenslets. This superposition shape image may represent a graphic motif, a symbol or a piece of text that is known to characterize the item that is to be authenticated. By modifying the relative sampling position of the revealing layer grating of lenslets in respect to the base layer grating of lenslets concentrating the incoming light, the superposition shape image becomes animated. The relative sampling position of the revealing layer grating can be modified e.g. by a relative translation or a relative rotation of the layers or by tilting horizontally, vertically, or diagonally a fixed setup (e.g. FIG. 45A and FIG. 45B, 4503) formed of the two layers. In case of a 1D or 2D moiré, the superposition shape image moves (e.g. from 4505 to 4506) across the setup (see also evolution of the moiré shape image from FIG. 12 to FIG. 13). In case of a level line moiré, the superposition shape image shows beatings from the foreground and background centers to the borders of that shape and vice-versa (see FIGS. 30C and 30D for two different sampling positions; the constant gray levels follow the shape level lines). In case of a lenticular image, several shape instances give the impression of a dynamically moving shape (see FIGS. 37A, 37B, 37C and 37D).

In a second embodiment, several superposition image messages may be incorporated into the same setup of base and revealing gratings of lenslets. For example, FIGS. 19A and 19B show the 1D moiré messages "VALID" and "OK" that appear at different depth levels and move in opposite directions. A person can immediately verify with the naked eye the authenticity of the security item by tilting the fixed setup and verifying that the two messages move in opposite directions and that the "VALID" message appears more distant than the "OK" message.

In a third embodiment, the shape image (FIG. 46, 4610) resulting from the superposition of the base and revealing layer gratings of lenslets can be photographed by a smartphone 4604. The software of the smartphone can analyze that shape image, e.g. in case of a text message comprising characters and/or numbers, it can recognize the message 4605 by optical character recognition software and possibly interact 4621 with a Web server 4620 in order to verify whether this identifying text message is valid. If the identifying text message is valid, a message 4606 appears on the smartphone telling the observer that the security item incorporating the superposed base and revealing grating of lenslets is authentic.

Anti-Counterfeiting Features

Without appropriate sophisticated equipment capable of performing the lithography (or laser exposure) and the reflow operations, it is not possible to replicate the base and revealing layer gratings of lenslets. Even if such an equipment is available to the potential counterfeiter, attempts to falsify a secure item produced in accordance with the present invention by taking microscope images of the grating of lenslets will slightly change the size of the corresponding lenslets. The moiré shapes that are obtained with the 1D moiré, 2D moiré and the level line moirés are very sensitive to the ratio between revealing layer and base layer lenslet periods. Small changes of these ratios may create very large distortions of the resulting superposition shape images. In addition, the cylindrical revealing layer grating of lenslets may have a curved layout such as a cosinusoidal layout. Without knowing the parameters of the corresponding geometric transformation, such curved revealing layer gratings would be very difficult to counterfeit. Finally, either one or both the base layer gratings of lenslets and the revealing layer grating of lenslets may be encapsulated by a transparent material such as a polymer having a lower index of refraction than the lenslets. Such an encapsulation makes it very difficult for a counterfeiter to recover by imaging means the orientation, size and layout of the lenslet gratings.

Decorative Aspects

In addition to security, the presented setups of revealing and base layer lenslet gratings have a high esthetical value and may also be attractive in luxury products such as watches, smartphones, perfumes, expensive drinks, in clothes such as dress, skirt, blouse, jacket, shawls and pants as well as in bikes and cars (see also U.S. Pat. No. 7,295,717, incorporated by reference, where one of the inventors is the same as in the present invention). In addition, due to their unexpected appearance and the dynamicity of the resulting superposition shape image, these setups may also be created at a large scale for exhibitions or for amusement parks. They also may find applications for the decoration of buildings. At these large scales, base and revealing layer gratings of lenslets may be created by filling plastic cylinders or spherical elements with a liquid such as water to obtain cylindrical lenslets or spherical lenslets.

The invention claimed is:

1. An apparatus setup comprising a superposition of a revealing layer lenslet grating and of base layer lenslet gratings showing superposition shapes forming a recognizable message, where said superposition shapes are formed by the sampling action of the revealing layer lenslet grating on a plane, being the focal plane of the revealing layer lenslet grating, on which the base layer lenslet gratings concentrate the incoming light, where said recognizable message moves dynamically when changing the observation angle in respect to the superposed lenslet gratings and where said superposition shapes use a superposition technique selected from the set of 1D moiré, 2D moiré, random moiré, level line moiré, lenticular image, phase shift and stereoscopic depth superposition synthesizing techniques.

2. The setup comprising the superposed revealing and base layer lenslet gratings of claim 1, where said recognizable message is selected from the set of text, numbers, graphical symbols, typographical characters, numerals, logos, and spatial codes.

3. The setup comprising the superposed revealing and base layer lenslet gratings of claim 1, where the setup is fixed, and where said dynamically moving message is visible when tilting the setup in front of an illuminated background.

4. The setup comprising the superposed revealing and base layer lenslet gratings of claim 1, where in case of the stereoscopic depth superposition synthesizing technique, a stereoscopic depth effect is achieved by having the revealing layer lenslet grating sampling the plane on which the base layer lenslet gratings concentrates the incoming light at different positions in respect to the left and right eyes of an observer.

5. The setup comprising the superposed revealing and base layer lenslet gratings of claim 4, where due to the stereoscopic effect, the observer sees the superposition shapes that move dynamically at different depth levels.

6. The setup comprising the superposed revealing and base layer lenslet gratings of claim 5, where in case of a 1D moiré, due to the stereoscopic effect, the observer sees the superposition shapes forming two different messages that move dynamically at different depth levels and along different orientations.

7. The setup comprising the superposed revealing and base layer lenslet gratings of claim 1, where the base layer lenslet gratings form a halftone image viewable by an observer and where said base layer lenslet gratings are authenticated by superposing on them the revealing layer lenslet grating and by checking the appearing recognizable message.

8. The setup comprising the superposed revealing and base layer lenslet gratings of claim 7, where said halftone image is selected from the set of landscape, flag, vehicle, face, person, dress, luxury article, watch, fruit, tree, logo, instrument, utility object, plane, rocket, and weapon images.

9. The setup comprising the superposed revealing and base layer lenslet gratings of claim 1, where an image acquisition and computing device such as a smartphone captures the superposition shapes forming the recognizable message and verifies its authenticity by running authentication software.

10. The setup comprising the superposed revealing and base layer lenslet gratings of claim 9, where the authentication software recognizes the captured recognizable message, and where the signature of the captured message is compared with authentic message signatures.

11. The setup comprising the superposed revealing and base layer lenslet gratings of claim 10, where the comparison of message signatures for authentication is performed on a computing device selected from the set comprising the smartphone having captured the message and a remote server to which the message content has been transferred.

12. The setup comprising the superposed revealing and base layer lenslet gratings of claim 1, where the setup is fixed and where the superposition shapes forming said recognizable message dynamically evolve in synchronization with the movement of an observer, said evolution attracting the attention of said observer.

13. The setup comprising the superposed revealing and base layer lenslet gratings of claim 12 providing a recognizable message with a high decorative value, said setup being placed at locations selected from the set of building walls, exhibition walls, advertisement surfaces, and amusement parks.

14. An apparatus setup comprising a revealing layer having a revealing layer lenslet array and a base layer having base layer lenslet arrays, wherein the revealing layer lenslet array and the base layer lenslet arrays are superposed, forming superposition shapes which together form a superposition shape image, where said superposition shapes are formed by the sampling action of the revealing layer lenslet array on a plane, being the focal plane of the revealing layer lenslet array, on which the base layer lenslet arrays concentrate incoming light, where said superposition shape image moves dynamically when changing the observation angle in respect to the superposed revealing layer lenslet array and/or base layer lenslet arrays.

15. An apparatus setup of claim 14, where said superposition shapes use a superposition technique selected from the set of 1D moiré, 2D moiré, random moiré, level line moiré, lenticular image, phase shift and stereoscopic depth superposition synthesizing techniques.

16. An apparatus setup of claim 14, the revealing layer lenslet array and/or the base layer lenslet arrays comprise at least one additional encapsulating layer, wherein said encapsulating layer has an index of refraction lower than the index of refraction of the lenslet array(s),and where said encapsulating layer has a flat interface with air hiding the structure of the lenslet arrays, thereby preventing its replication for counterfeiting purposes.

17. An apparatus setup of claim 14, where base layer lenslet arrays relate to foreground imagery of the superposition shape image and background imagery of the superposition shape image is created by randomly positioned non-overlapping microlenses of sizes that are randomly selected within a given size interval and are substantially smaller than the period of the revealing layer lenslet array.

18. An apparatus setup of claim 14, wherein the superposed base and revealing layer form a fixed arrangement, where the revealing layer lenslet array has a substantially vertical orientation, thereby providing to the eyes of an observer different views of the base layer lenslet arrays, said different views creating a parallax effect allowing to perceive the superposition shape image as an image composed of shapes having different apparent depths.

19. An apparatus setup of claim 14, wherein the superposition shape image is composed of a first message and of a second message, where when tilting the setup, the first message moves at a given apparent depth level and the second message moves in inverse direction at a different apparent depth level.

20. A document and/or valuable article comprising the apparatus setup of claim 14 for protection against counterfeits.

* * * * *